United States Patent
Erturk et al.

(10) Patent No.: US 12,492,973 B2
(45) Date of Patent: Dec. 9, 2025

(54) METHODS FOR LARGE TISSUE LABELING, CLEARING AND IMAGING

(71) Applicant: Deep Piction GmbH, Munich (DE)

(72) Inventors: Ali Erturk, Munich (DE); Ruiyao Cai, Palo Alto, CA (US); Chenchen Pan, Planegg/Martinsried (DE); Shan Zhao, Planegg (DE); Arnaldo Parra-Damas, Barcelona (ES)

(73) Assignee: DEEP PICTION GMBH, Munich (DE)

( * ) Notice: Subject to any disclaimer, the term of this patent is extended or adjusted under 35 U.S.C. 154(b) by 1398 days.

(21) Appl. No.: 16/620,293

(22) PCT Filed: May 18, 2018

(86) PCT No.: PCT/EP2018/063098
§ 371 (c)(1),
(2) Date: Dec. 6, 2019

(87) PCT Pub. No.: WO2018/224289
PCT Pub. Date: Dec. 13, 2018

(65) Prior Publication Data
US 2020/0209118 A1    Jul. 2, 2020

(30) Foreign Application Priority Data

Jun. 7, 2017 (GB) ..................... 1709089

(51) Int. Cl.
| | |
|---|---|
| *G01N 1/30* | (2006.01) |
| *G01N 1/28* | (2006.01) |
| *G01N 21/64* | (2006.01) |
| *G01N 33/50* | (2006.01) |
| *G01N 33/574* | (2006.01) |
| *G01N 33/58* | (2006.01) |
| *G01N 33/68* | (2006.01) |

(52) U.S. Cl.
CPC ............ *G01N 1/30* (2013.01); *G01N 1/286* (2013.01); *G01N 21/6458* (2013.01); *G01N 33/5005* (2013.01); *G01N 33/5088* (2013.01); *G01N 33/57496* (2013.01); *G01N 33/582* (2013.01); *G01N 33/6893* (2013.01); *G01N 2001/2873* (2013.01); *G01N 2001/302* (2013.01); *G01N 2800/28* (2013.01)

(58) Field of Classification Search
None
See application file for complete search history.

(56) References Cited

U.S. PATENT DOCUMENTS

| | | |
|---|---|---|
| 2016/0003716 A1 | 1/2016 | Torres et al. |
| 2017/0108414 A1 | 4/2017 | MacLellan et al. |

FOREIGN PATENT DOCUMENTS

| | | |
|---|---|---|
| EP | 3249382 A1 | 11/2017 |
| JP | 2010-002213 A | 1/2010 |
| JP | 2016-538569 A | 12/2016 |
| WO | 2015/041755 A1 | 3/2015 |
| WO | 2015/053039 A1 | 4/2015 |
| WO | 2016/004367 A1 | 1/2016 |
| WO | 2016/117614 A1 | 7/2016 |

OTHER PUBLICATIONS

Qiu et al. Small molecular peptide-ScFv alpha-v-beta-3 conjugates specifically inhibit lung cancer cell growth in vitro and in vivo. 2016 Am. J. Cancer Res. 6: 2846-2858. Epub Dec. 1, 2016. (Year: 2016).*
Zheng et al. FITC-Conjugated Cyclic RGD Peptides as Fluorescent Probes for Staining Integrin $\alpha v\beta 3/\alpha v\beta 5$ in Tumor Tissues. 2015 Bioconjugate Chem. 25: 1925-1941. (Year: 2015).*
Japan Patent Office, Office Action (Notice of Reasons for Rejection) issued in corresponding Application No. JP 2020-518127, mailed Feb. 20, 2023.
China National Intellectual Property Administration, Notification of the First Office Action issued in corresponding Application No. CN 2018800503399, mailed Dec. 17, 2021.
Pan, C., et al. "Shrinkage-mediated imaging of entire organs and organisms using uDISCO," Nature Methods, vol. 13 (10), pp. 859-867, Epub Aug. 22, 2016.
Susaki, E.A., et al. "Whole-Brain Imaging with Single-Cell Resolution Using Chemical Cocktails and Computational Analysis," Cell, vol. 157(3), pp. 726-739, Epub Apr. 17, 2014.
Japan Patent Office, Notice of Reasons for Rejection issued in corresponding Application No. JP 2020-518127, dated Apr. 11, 2022.
Renier, N., et al. "iDISCO: A Simple, Rapid Method to Immunolabel Large Tissue Samples for Volume Imaging," Cell vol. 159, 2014, pp. 896-910.
Tainaka, K., et al. "Whole-Body Imaging with Single-Cell Resolution by Tissue Decolorization," Cell vol. 159, 2014, pp. 911-924.
Becker, K., et al. "Chemical Clearing and Dehydration of GFP Expressing Mouse Brains," PloS One, 2012, vol. 7, Issue 3, e33916.

(Continued)

*Primary Examiner* — Jennifer Chin
(74) *Attorney, Agent, or Firm* — Stites & Harbison, PLLC; Terry L. Wright

(57) ABSTRACT

The present invention relates to methods for preparing an animal tissue for fluorescence microscopy, to an animal tissue obtainable by the methods, to methods for analyzing the animal tissues, and to methods for the detection of metastases, for analyzing the biodistribution of a biopharmaceutical drug, and for analyzing the biodistribution of nanoparticles. The methods for preparing an animal tissue according to the present invention encompass whole-body labeling, clearing and imaging methods. The methods of the invention are advantageous in that they, for instance, allow the visualization of single cells within mammalian tissues including pig and human brains, tumor metastases at the single cell level and of the distribution of biopharmaceutical drugs (e.g. the distribution of cancer-targeting therapeutic antibodies in whole animals such as intact mice) at single cell level in whole mouse.

30 Claims, 38 Drawing Sheets

(56) References Cited

OTHER PUBLICATIONS

"New Technology for Making a Mouse Entirely Transparent and Observing it with Single-Cell Resolution," RIKEN Science and Technology Agency (JST) Tokyo University, 2014 (translation not available).

China National Intellectual Property Administration, Notification of the Second Office Action issued in corresponding Application No. 2018800503399, mailed May 27, 2022.

Suqing, Z., et al. "Status Quo and Application Prospects of Life Science and Biotechnology," Guangdong Economy Publishing House, May 31, 2015, pp. 93-98.

Miyawaki, A., et al. "Deep Imaging of Cleared Brain by Confocal Laser-Scanning Microscopy," Nature Protocols, Mar. 24, 2016, https://doi.org/10.1038/protex.2016.019.

Kubota, S.I., et al. (2017). Whole-Body Profiling of Cancer Metastasis with Single-Cell Resolution. Cell Reports 20, 236-250.

Li, J., et al. (2015). Fast immuno-labeling by electrophoretically driven infiltration for intact tissue imaging. Scientific Reports 5:10640, DOI: 10.1038/srep10640.

Beach, T.G., et al. (1987). Perfusion-fixation of the human brain for immunohistochemistry: comparison with immersion-fixation. Journal of Neuroscience Methods, 19: 183-192.

Greenbaum, A., et al. (2017). Bone CLARITY: Clearing, imaging, and computational analysis of osteoprogenitors within intact bone marrow. Sci. Transl. Med. 9, eaah6518.

Dobosz, M., et al. (2014). Multispecial Fluorescence Ultramicroscopy: Three-Dimensional Visualization and AUtomatic Quantification of Tumor Morphology, Drug Penetration, and Antiangiogenic Treatment Response. Neoplasia vol. 16, No. 1.

Dodt, H., et al. (2015) Ultramicroscopy: development and outlook. Neurophotonics 2(4), 041407.

Lee, E., et al. (2016). ACT-PRESTO: Rapid and consistent tissue clearing and labeling method for 3-dimensional (3D) imaging. Scientific Reports: 6-18631, DOI: 10.1038/srep 18631.

Richardson, D.S., et al. (2015). Clarifying Tissue Clearing. Cell 162, 246-257.

Sindhwani, S., et al. (2016). Three-Dimensional Optical Mapping of Nanoparticle Distribution in Intact Tissues. ACS Nano, 10, 5468-5478.

Susaki, E.A., et al. (2016). Whole-body and Whole-Organ Clearing and Imaging Techniques with Single-Cell Resolution: Toward Organism-Level Systems Biology in Mammals. Cell Chemical Biology 23.

Tainaka, K., et al. (2016). Chemical Principles in Tissue Clearing and Staining Protocols for Whole-Body Cell Profiling. Annu. Rev. Cell Dev. Biol. 32:9.1-9.29.

Treweek, J.B., et al. (2016). Extracting structural and functional features of widely distributed biological circuits with single cell resolution via tissue clearing and delivery vectors. Science Direct Current Opinion in Biotechnology, 40: 193-207.

Yang, G., et al. (2015). Genetic targeting of chemical indicators in vivo. Nature Methods vol. 12. No. 2.

European Patent Office, International Search Report and Written Opinion issued in corresponding Application No. PCT/EP2018/063098, mailed Nov. 20, 2018.

Intellectual Property Office, Search Report issued in corresponding Application No. GB1709089.5, dated Mar. 5, 2018.

The International Bureau of WIPO, International Preliminary Report on Patentability issued in corresponding Application No. PCT/EP2018/063098, issued Dec. 10, 2019.

Becker, K. et al.: "Chemical Clearing and Dehydration of GFP Expressing Mouse Brains". Plos One, vol. 7, No. 3, Mar. 30, 2012, p. e33916.

Battke, C., et al. (2011). Generation and Characterization of the First Inhibitory Antibody Targeting Tumour-Associated Carbonic Anhydrase XII. Cancer Immunol Immunother 60, 649-658.

Belle, M., et al. (2017). Tridimensional Visualization and Analysis of Early Human Development. Cell 169, 161-173 E112.

Belle, M., et al. (2014). A Simple Method for 3D Analysis of Immunolabeled Axonal Tracts in a Transparent Nervous System. Cell Rep 9, 1191-1201.

Butler, J.M., et al. (2010). Instructive Role of the Vascular Niche in Promoting Tumour Growth and Tissue Repair By Angiocrine Factors. Nat Rev Cancer 10, 138-146.

Calvo, C.F., et al. (2011). Vascular Endothelial Growth Factor Receptor 3 Directly Regulates Murine Neurogenesis. Genes Dev 25, 831-844.

Chung, K., et al. (2013). Structural and Molecular Interrogation of Intact Biological Systems. Nature 497, 332-337.

Condeelis, J., et al. (2010). In Vivo Imaging In Cancer. Cold Spring Harb Perspect Biol 2, A003848.

De Jong, M., et al. (2014). Imaging Preclinical Tumour Models: Improving Translational Power. Nat Rev Cancer 14, 481-493.

Erturk, A., et al. (2016). Interfering With The Chronic Immune Response Rescues Chronic Degeneration After Traumatic Brain Injury. J Neurosci 36, 9962-9975.

Erturk, A., et al. (2012). Three-Dimensional Imaging of Solvent-Cleared Organs Using 3DISCO. Nat Protoc 7, 1983-1995.

Erturk, A., et al. (2011). Three-Dimensional Imaging of the Unsectioned Adult Spinal Cord to Assess Axon Regeneration and Glial Responses After Injury. Nat Med 18, 166-171.

Gabanyi, I., et al. (2016). Neuro-Immune Interactions Drive Tissue Programming In Intestinal Macrophages. Cell 164, 378-391.

Gage, G.J., et al. (2012). Whole Animal Perfusion Fixation for Rodents. J Vis Exp.

Ghanavati, S., et al. (2014). A Perfusion Procedure for Imaging of the Mouse Cerebral Vasculature by X-Ray Micro-CT. J Neurosci Methods 221, 70-77.

Gondi, G., et al. (2013). Antitumor Efficacy of a Monoclonal Antibody That Inhibits the Activity of Cancer—Associated Carbonic Anhydrase XII. Cancer Res 73, 6494-6503.

Hama, H., et al. (2015). Scales: An Optical Clearing Palette for Biological Imaging. Nat Neurosci 18, 1518-1529.

Hama, H., et al. (2011). Scale: A Chemical Approach for Fluorescence Imaging and Reconstruction of Transparent Mouse Brain. Nat Neurosci 14, 1481-1488.

Holliger, P., et al. (2005). Engineered Antibody Fragments and the Rise Of Single Domains. Nat Biotechnol 23, 1126-1136.

Hong, G., et al. (2017). Near-Infrared Fluorophores for Biomedical Imaging. Nature Biomedical Engineering 1, 0010.

Iorns, E., et al. (2012). A New Mouse Model for the Study of Human Breast Cancer Metastasis. Plos One 7, E47995.

Ke, M.T., et al. (2013). Seedb: A Simple and Morphology-Preserving Optical Clearing Agent for Neuronal Circuit Reconstruction. Nat Neurosci 16, 1154-1161.

Lambert, A.W., et al. (2017). Emerging Biological Principles of Metastasis. Cell 168, 670-691.

Louveau, A., et al. (2015). Structural and Functional Features of Central Nervous System Lymphatic Vessels. Nature 523, 337-341.

Massague, J., et al. (2016). Metastatic Colonization by Circulating Tumour Cells. Nature 529, 298-306.

Massoud, T.F., et al.(2003). Molecular Imaging In Living Subjects: Seeing Fundamental Biological Processes in a New Light. Genes Dev 17, 545-580.

Massoud, T.F., et al. (2007). Integrating Noninvasive Molecular Imaging Into Molecular Medicine: An Evolving Paradigm. Trends Mol Med 13, 183-191.

Murray, E., et al. (2015). Simple, Scalable Proteomic Imaging for High-Dimensional Profiling of Intact Systems. Cell 163, 1500-1514.

Muyldermans, S. (2013). Nanobodies: Natural Single-Domain Antibodies. Annu Rev Biochem 82, 775-797.

Ntziachristos, V. (2010). Going Deeper Than Microscopy: The Optical Imaging Frontier In Biology. Nat Methods 7, 603-614.

Pan, C., et al. (2016). Shrinkage-Mediated Imaging of Entire Organs and Organisms Using Udisco. Nat Methods.

Pandey, M., et al. (2014). Monoclonal Antibodies as Therapeutics in Human Malignancies. Future Oncol 10, 609-636.

Pichler, B.J., et al. (2008). Latest Advances In Molecular Imaging Instrumentation. J Nucl Med 49 Suppl 2, 5S-23S.

(56) References Cited

OTHER PUBLICATIONS

Ransohoff, R.M., et al. (2012). The Anatomical and Cellular Basis of Immune Surveillance in the Central Nervous System. Nat Rev Immunol 12, 623-635.
Renier, N., et al. (2016). Mapping of Brain Activity by Automated Volume Analysis of Immediate Early Genes. Cell 165, 1789-1802.
Renier, N., et al. (2014). Idisco: A Simple, Rapid Method to Immunolabel Large Tissue Samples for Volume Imaging. Cell 159, 896-910.
Susaki, E.A., et al. (2014). Whole-Brain Imaging With Single-Cell Resolution Using Chemical Cocktails and Computational Analysis. Cell 157, 726-739.
Tainaka, K., et al. (2014). Whole-Body Imaging With Single-Cell Resolution by Tissue Decolorization. Cell 159, 911-924.
Timpson, P., et al. (2011). Imaging Molecular Dynamics In Vivo-From Cell Biology to Animal Models. J Cell Sci 124, 2877-2890.
Tuchin, V.V. (2016). Editor's Introduction: Optical Methods for Biomedical Diagnosis.
Vick, B., et al. (2015). An Advanced Preclinical Mouse Model for Acute Myeloid Leukemia Using Patients' Cells of Various Genetic Subgroups and In Vivo Bioluminescence Imaging. Plos One 10, E0120925.
Welti, J., et al. (2013). Recent Molecular Discoveries in Angiogenesis and Antiangiogenic Therapies in Cancer. J Clin Invest 123, 3190-3200.
Wilson, E.H., et al. (2010). Trafficking of Immune Cells in the Central Nervous System. J Clin Invest 120, 1368-1379.
Yang, B., et al. (2014). Single-Cell Phenotyping Within Transparent Intact Tissue Through Whole-Body Clearing. Cell 158, 945-958.
Ye, L., et al. (2016). Wiring and Molecular Features of Prefrontal Ensembles Representing Distinct Experiences. Cell 165, 1776-1788.
Yoneda, T., et al. Seeking Clone Exhibits Different Biological Properties From the MDA-MB-231 Parental Human Breast Cancer Cells and a Brain-Seeking Clone In Vivo and In Vitro. J Bone Miner Res 16, 1486-1495, Doi:10.1359/Jbmr.2001.16.8.1486 (2001).
Zipfel, W.R., et al. (2003). Live Tissue Intrinsic Emission Microscopy Using Multiphoton-Excited Native Fluorescence and Second Harmonic Generation. Proc Natl Acad Sci U S A 100, 7075-7080.
Japan Patent Office, Office Action (Decision to Reject the Amendments) issued in corresponding Application No. JP 2023-191864 mailed Jul. 29, 2025.
Ito, Akihiko, Graduate School of Medicine Series, Handling a sample for research derived from human—from the position of pathology-, Kinki University Medical Journal, Dec. 25, 2014, 20141225, p. 155-161 (Publication showing well-known technology; newly cited publication) [No. English version available].

* cited by examiner

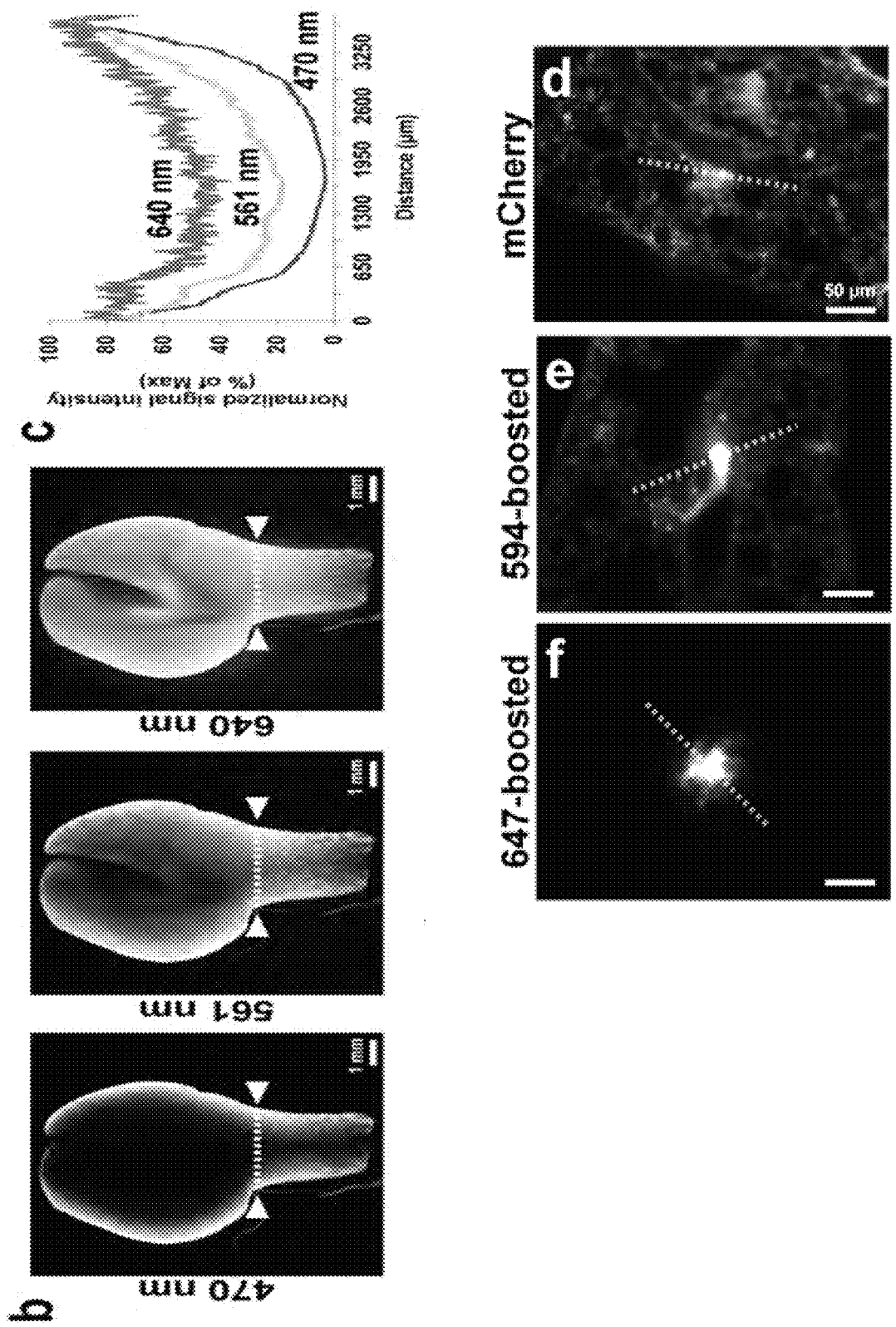
FIG. 1, continued

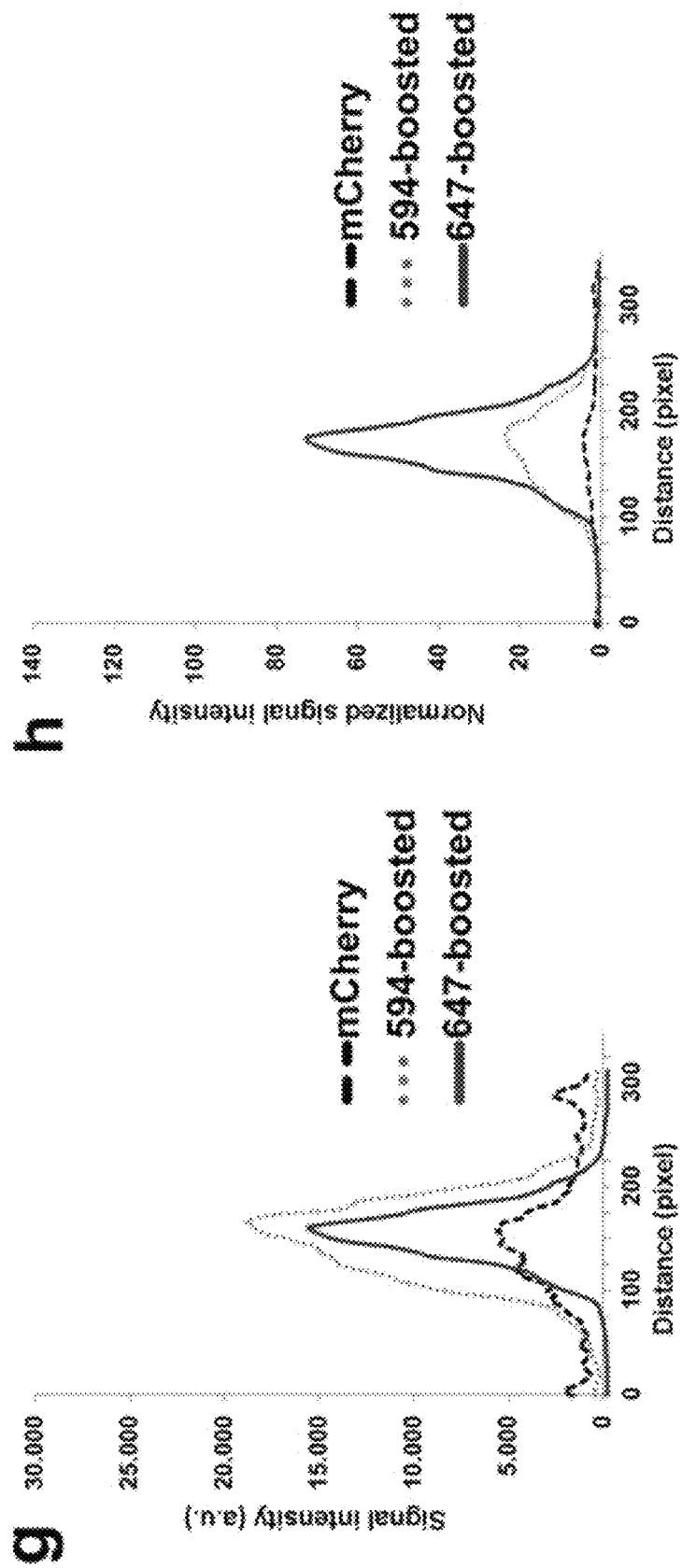
FIG. 1, continued

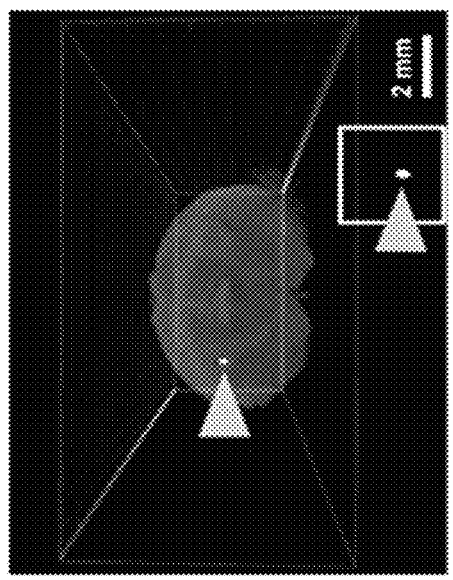
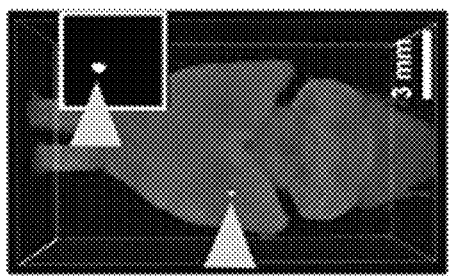
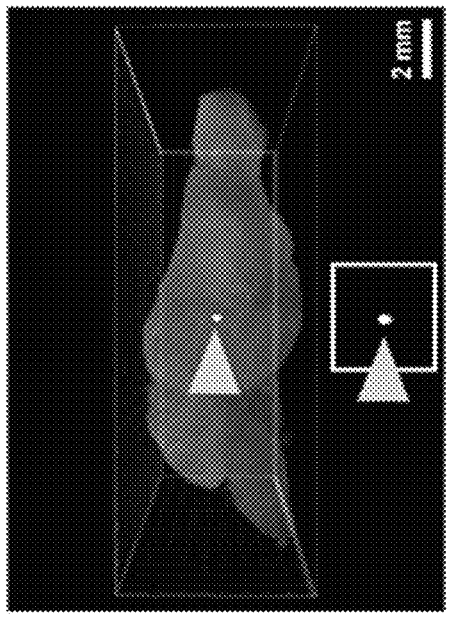
FIG. 1, continued

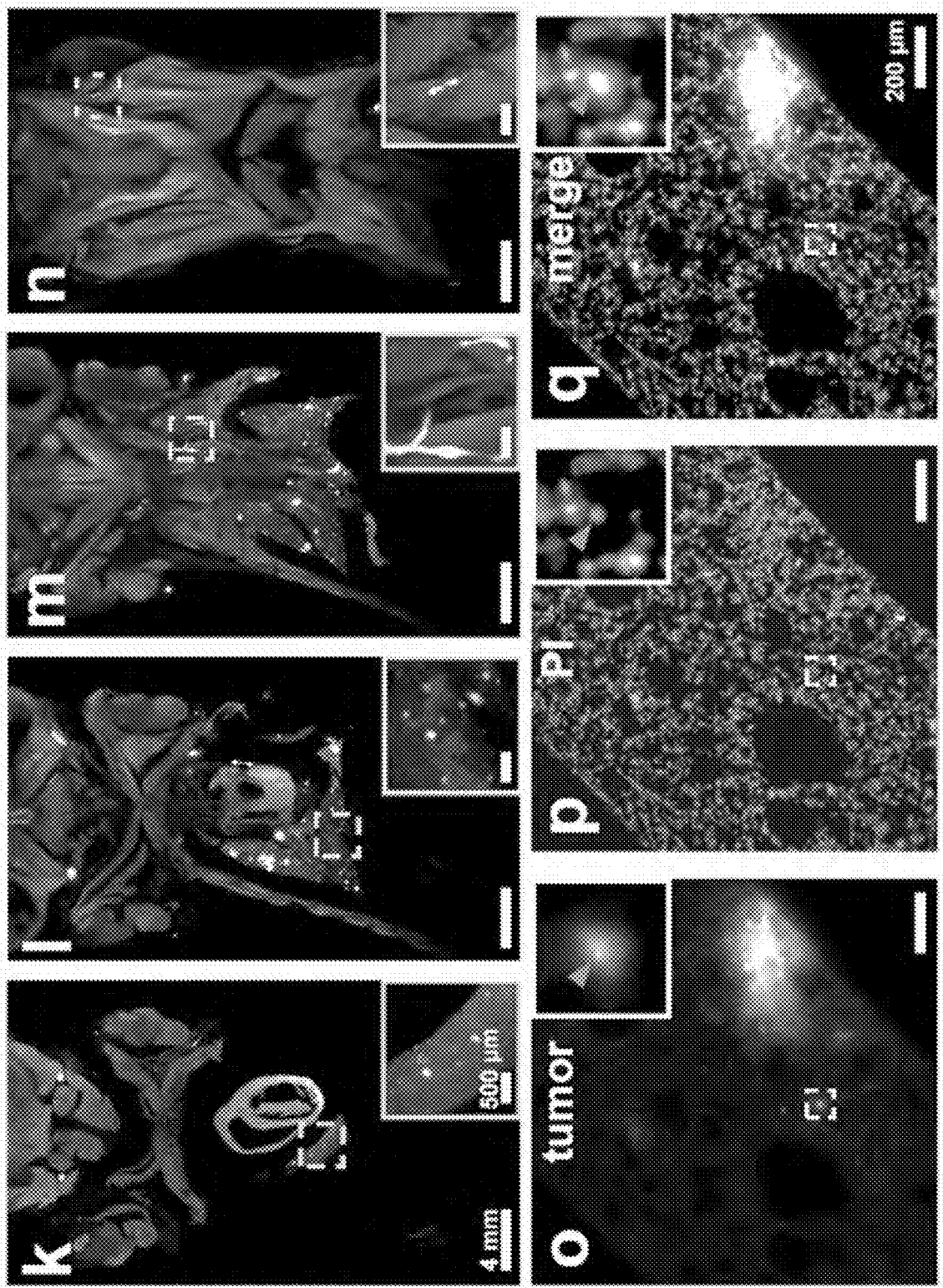
FIG. 2, continued

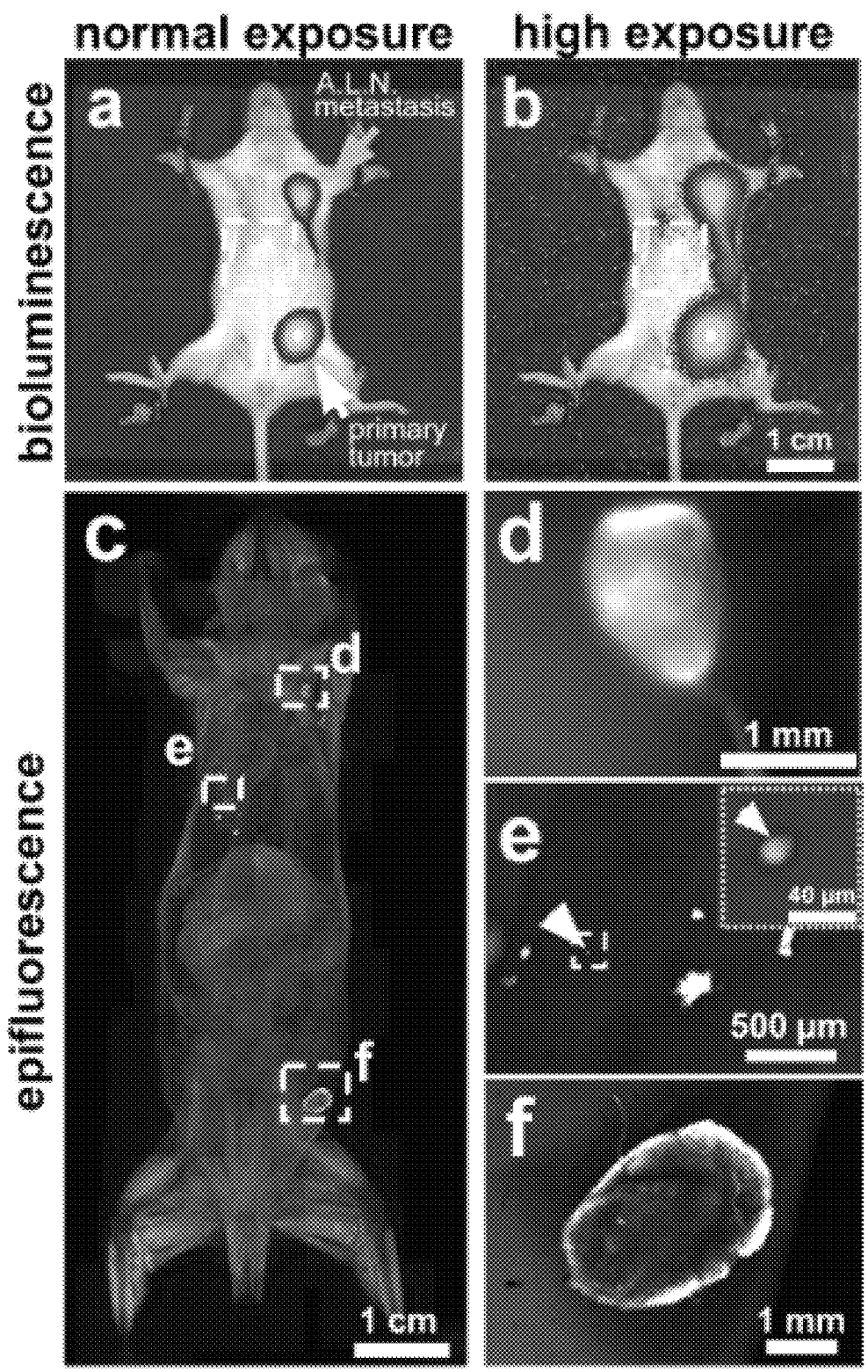

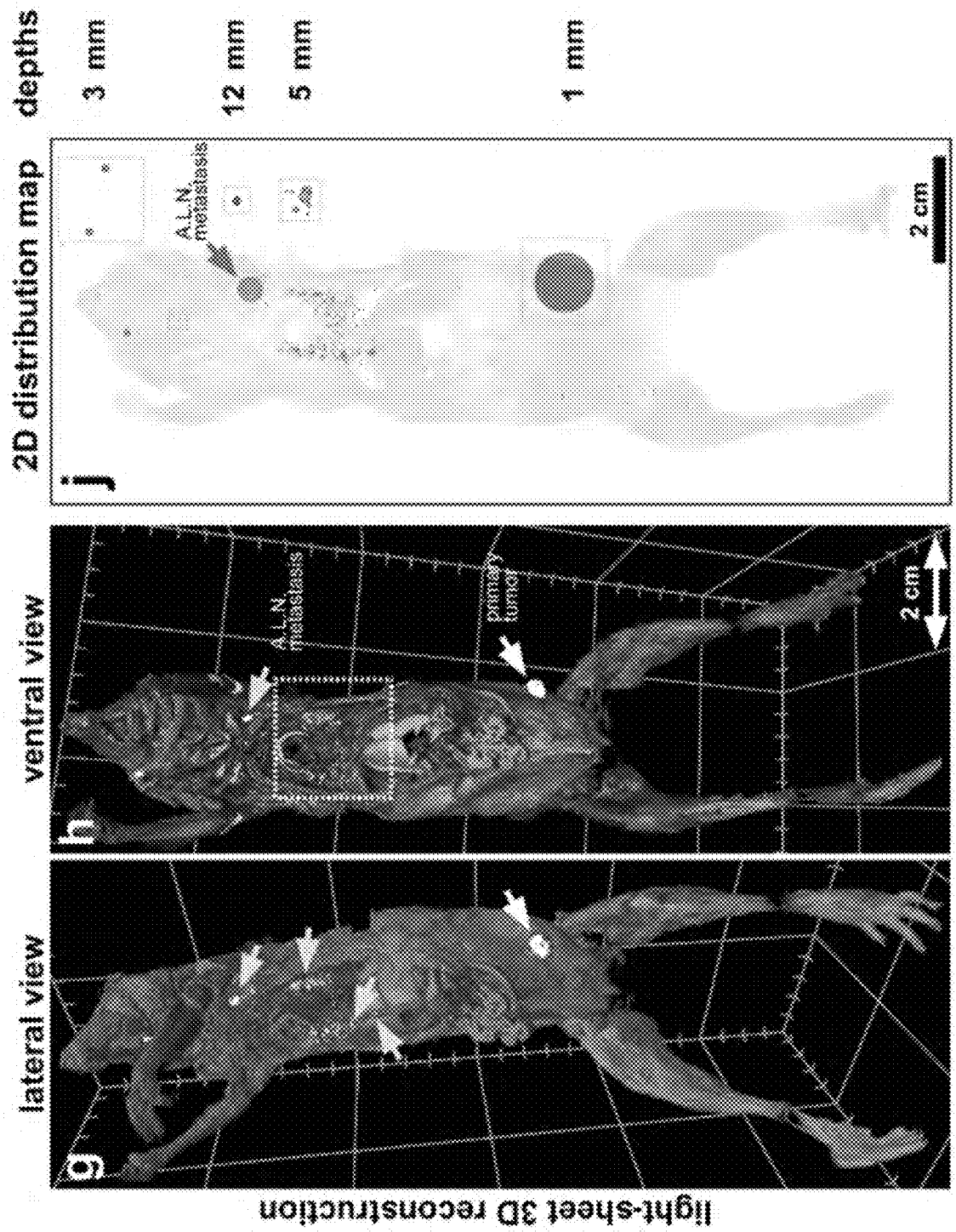
FIG. 3, continued

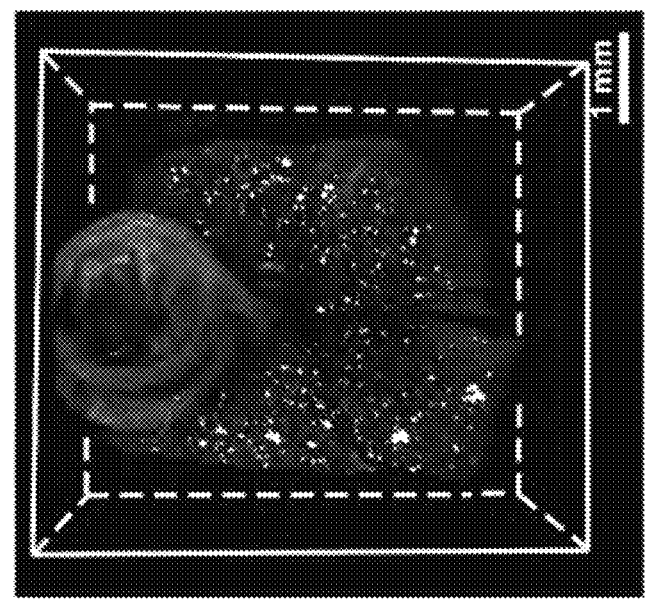
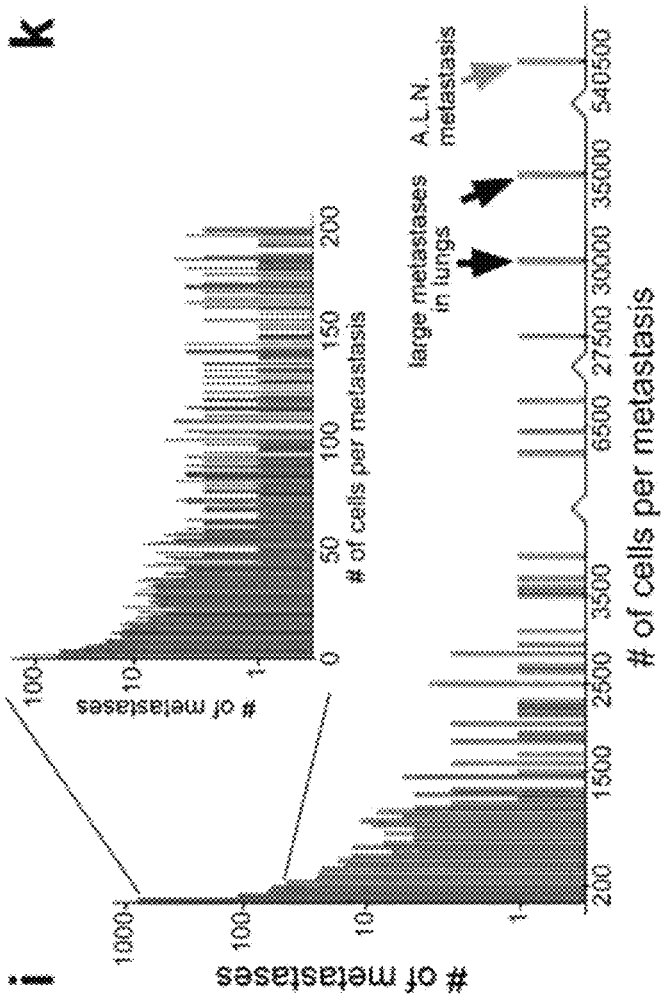
FIG. 3, continued

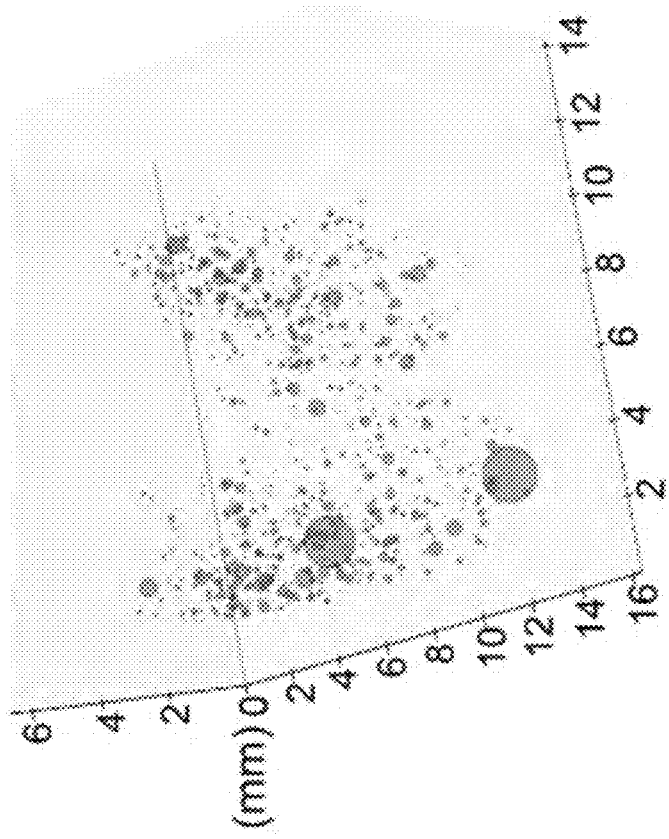
FIG. 3, continued

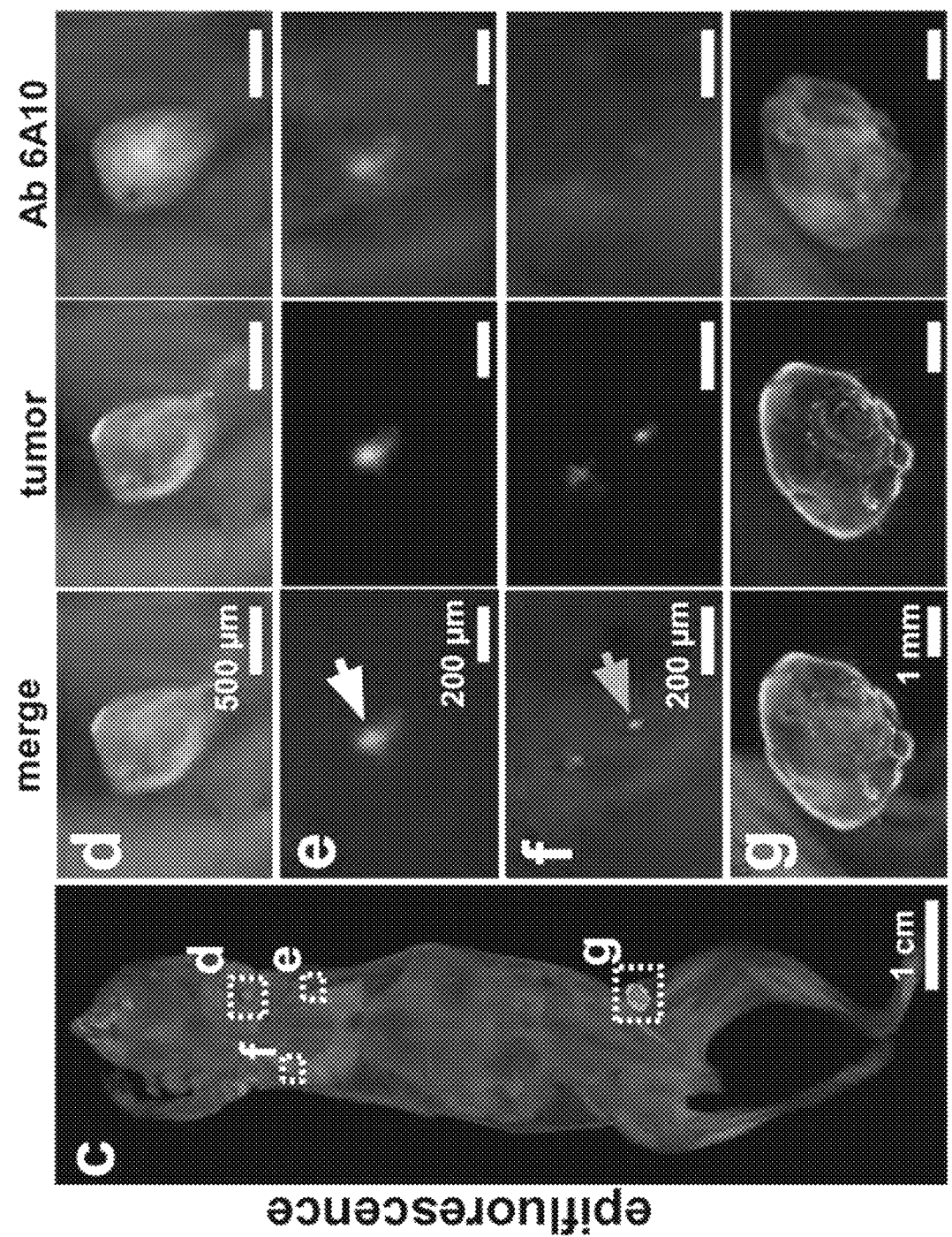
FIG. 4, continued

FIG. 4, continued
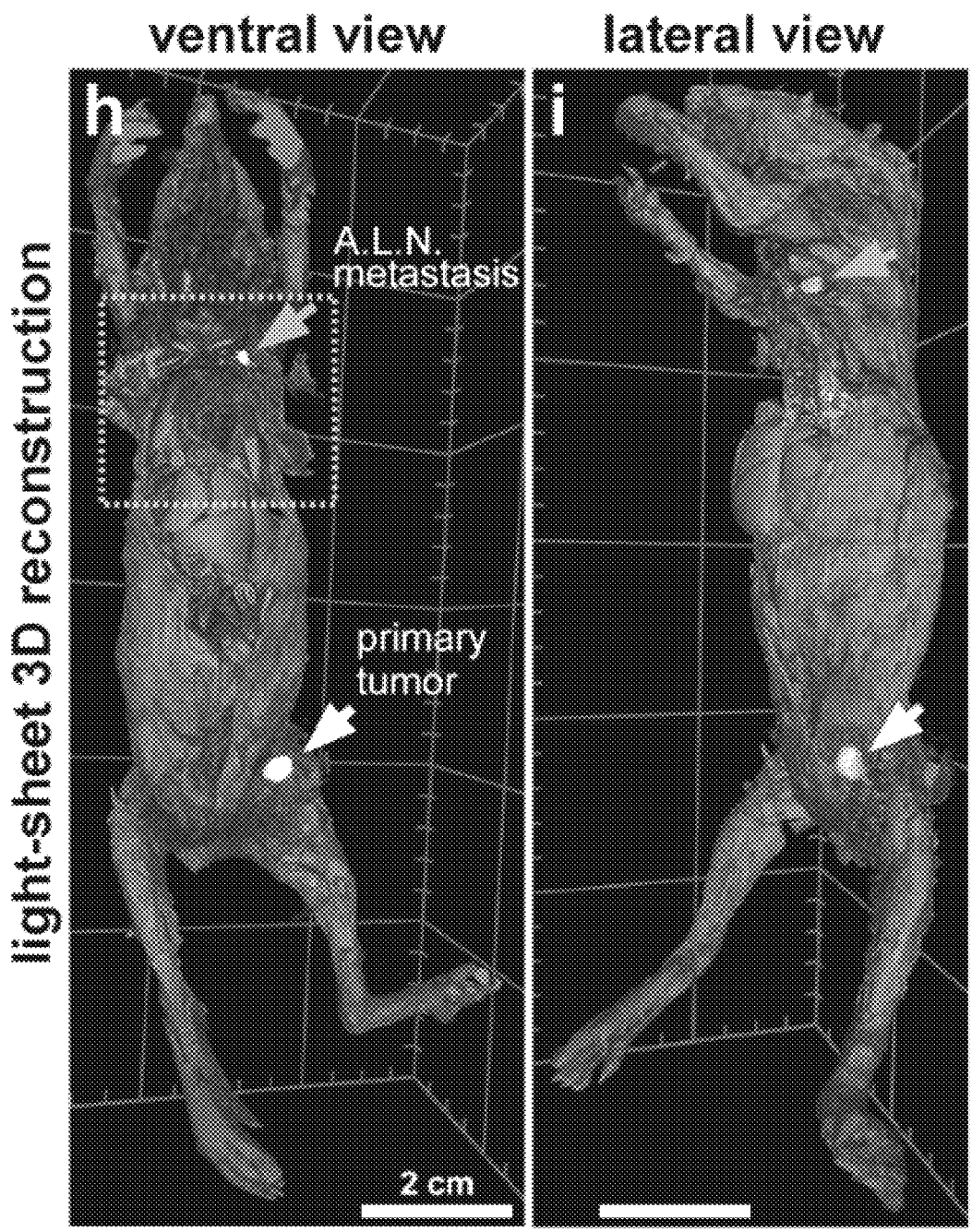

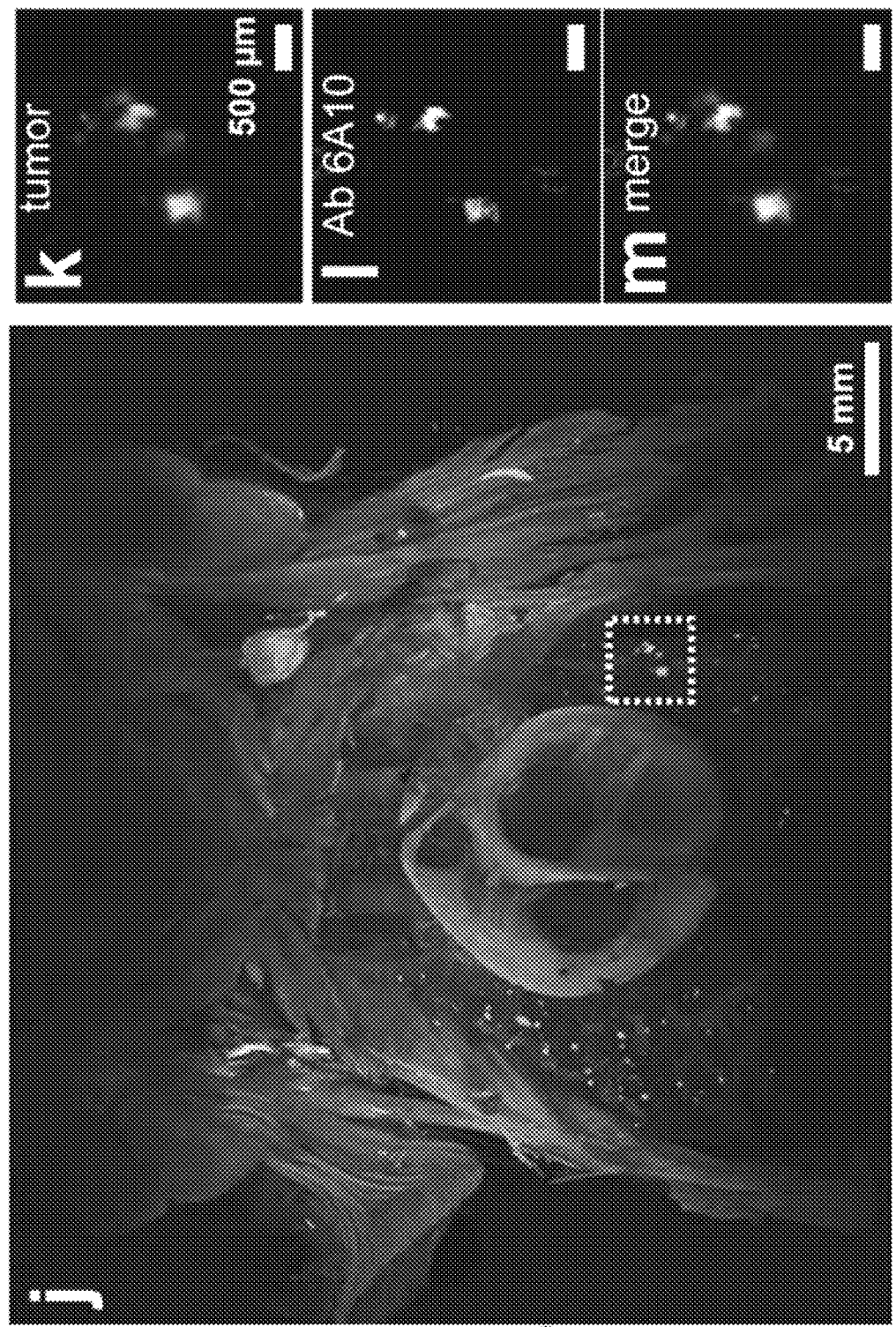
FIG. 4, continued

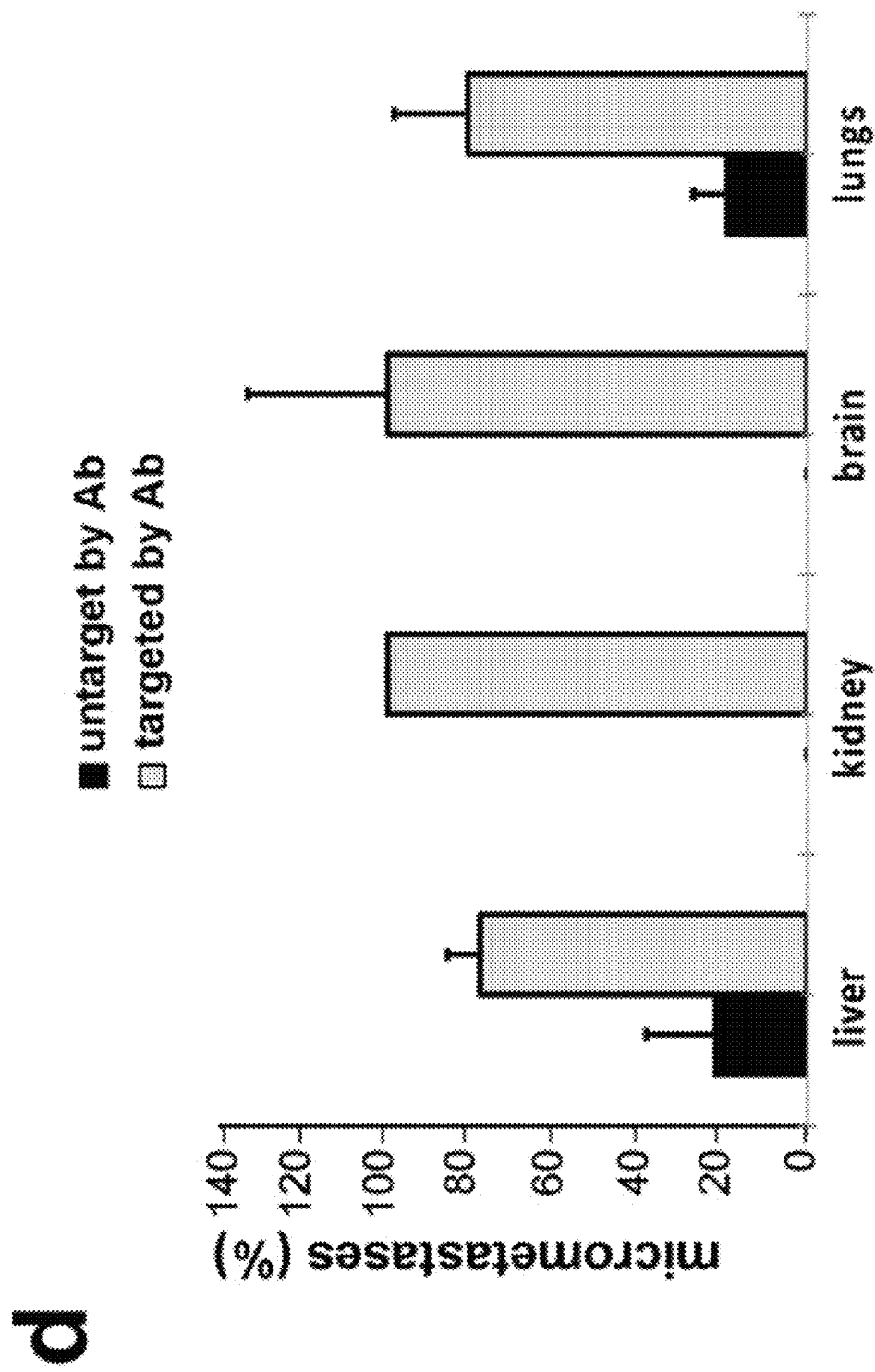
FIG. 5, continued

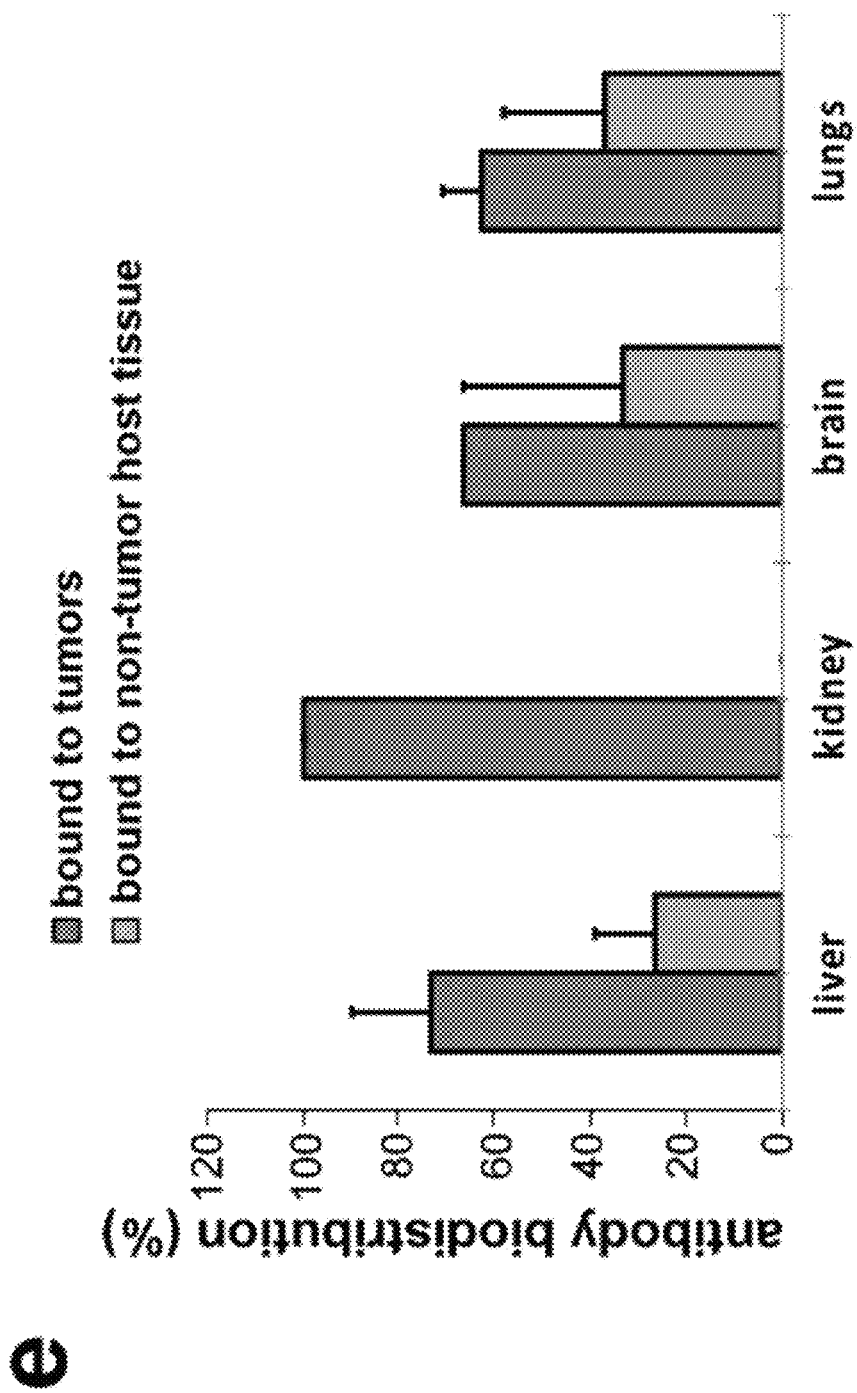
FIG. 5, continued

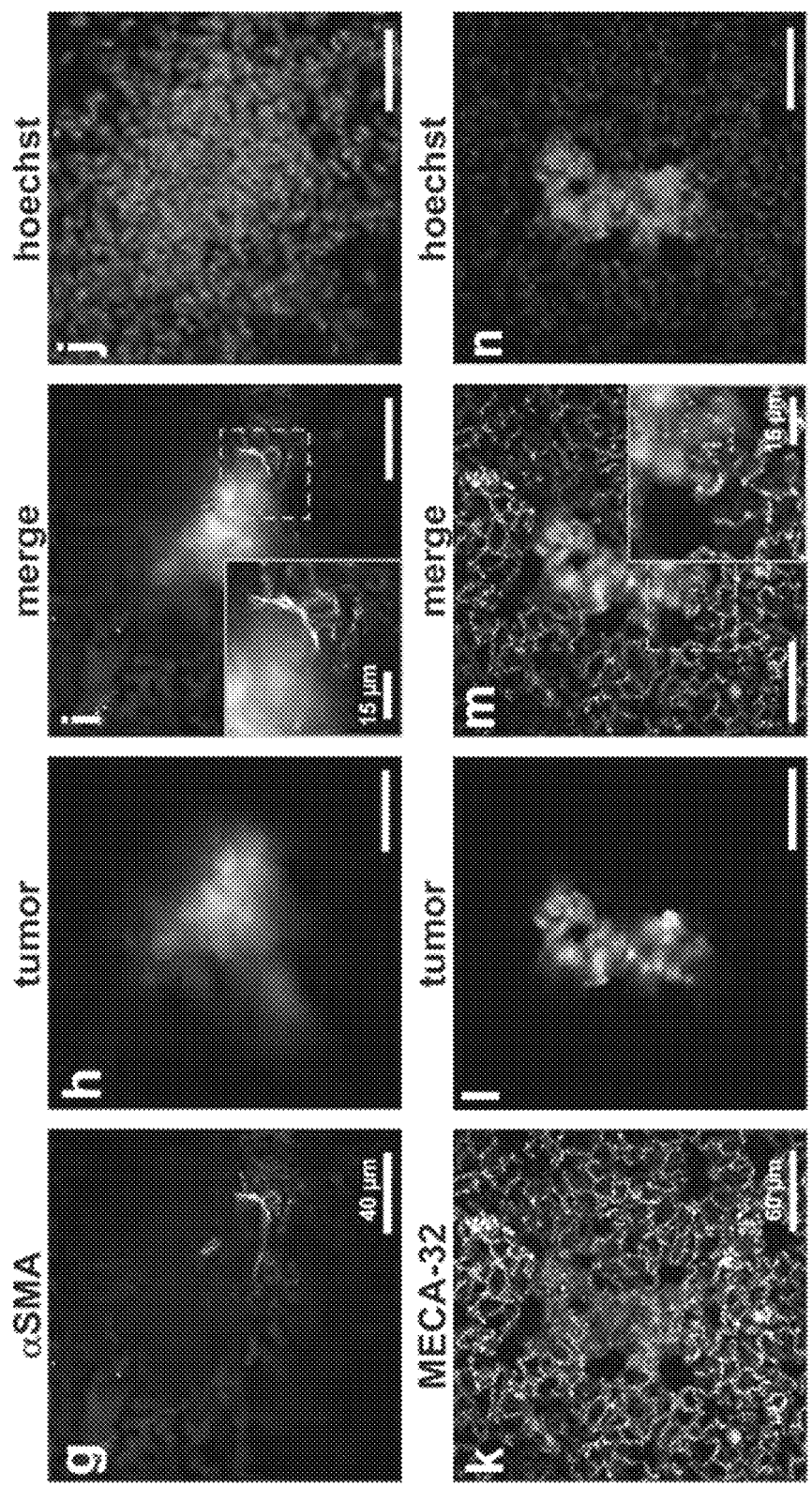
FIG. 6, continued

FIG. 7, continued

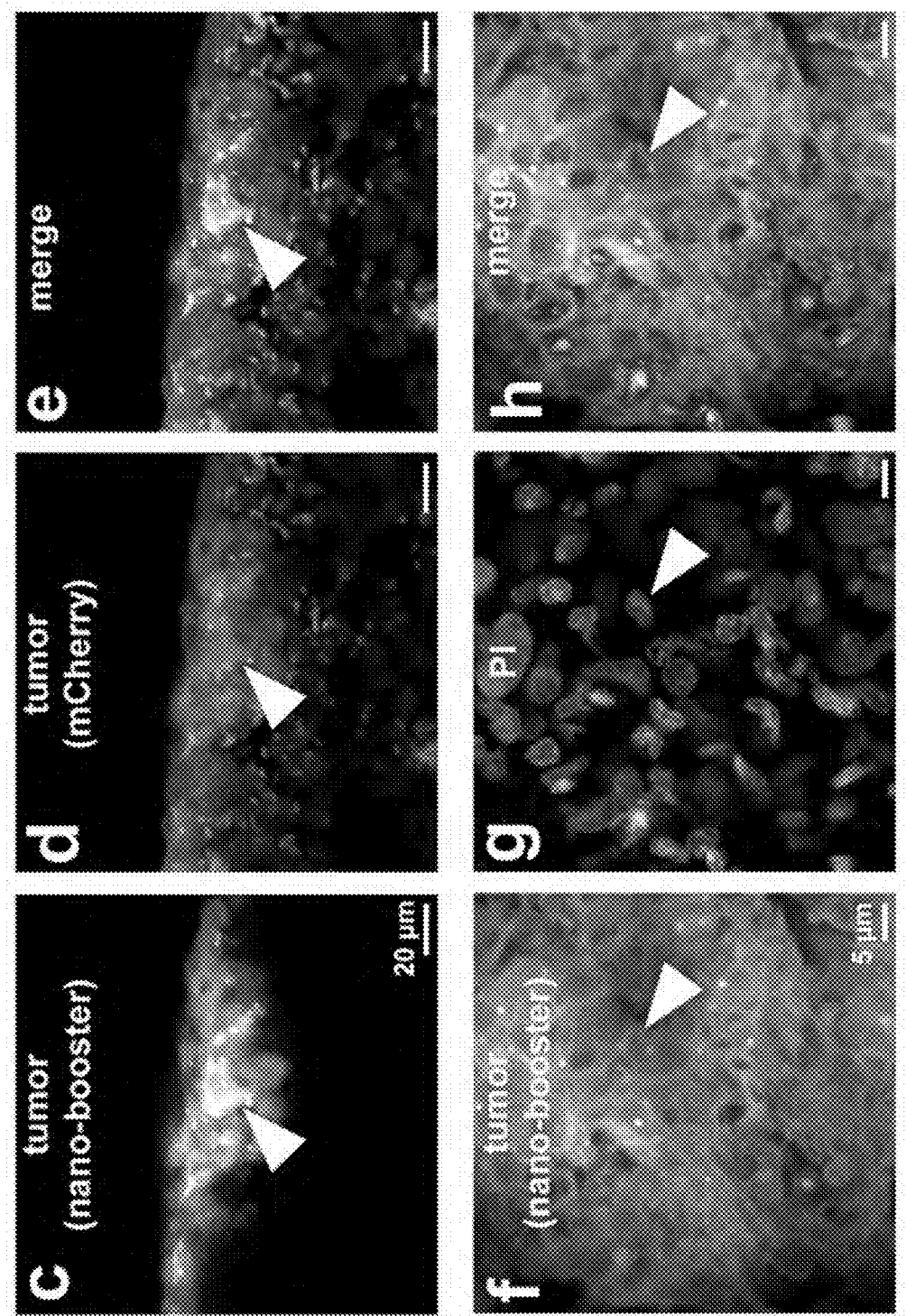
FIG. 7, continued

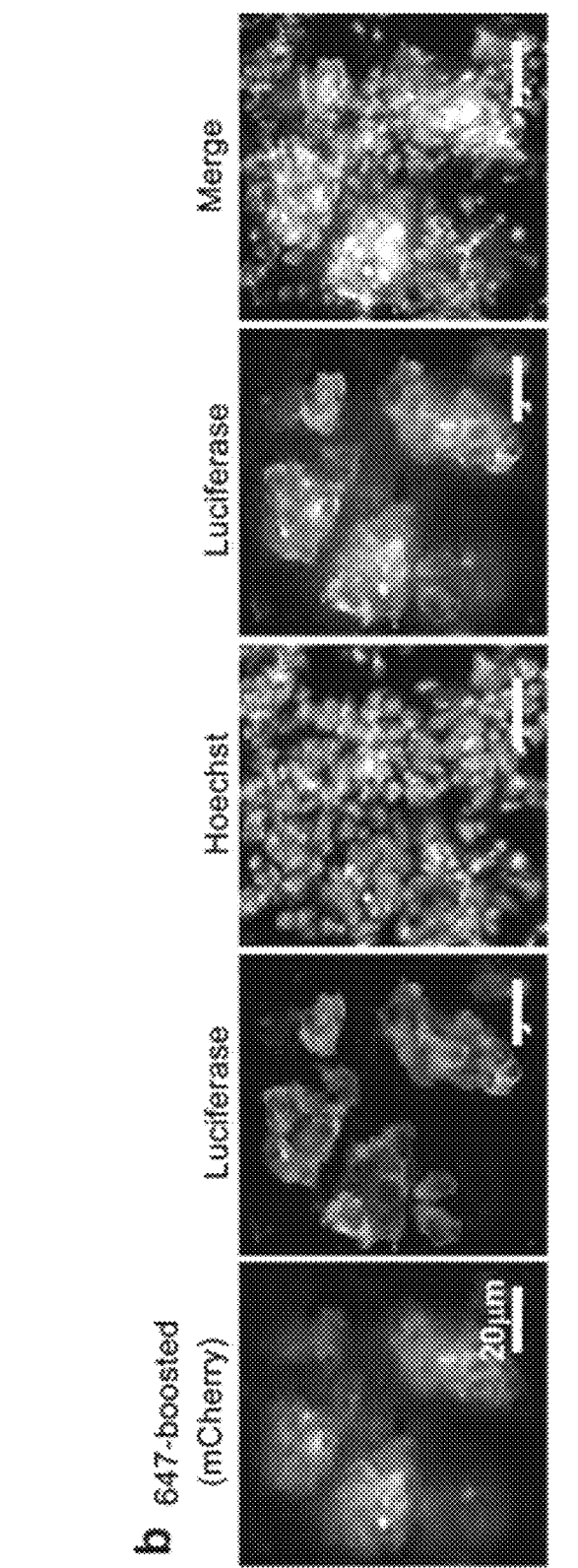
FIG. 8, continued

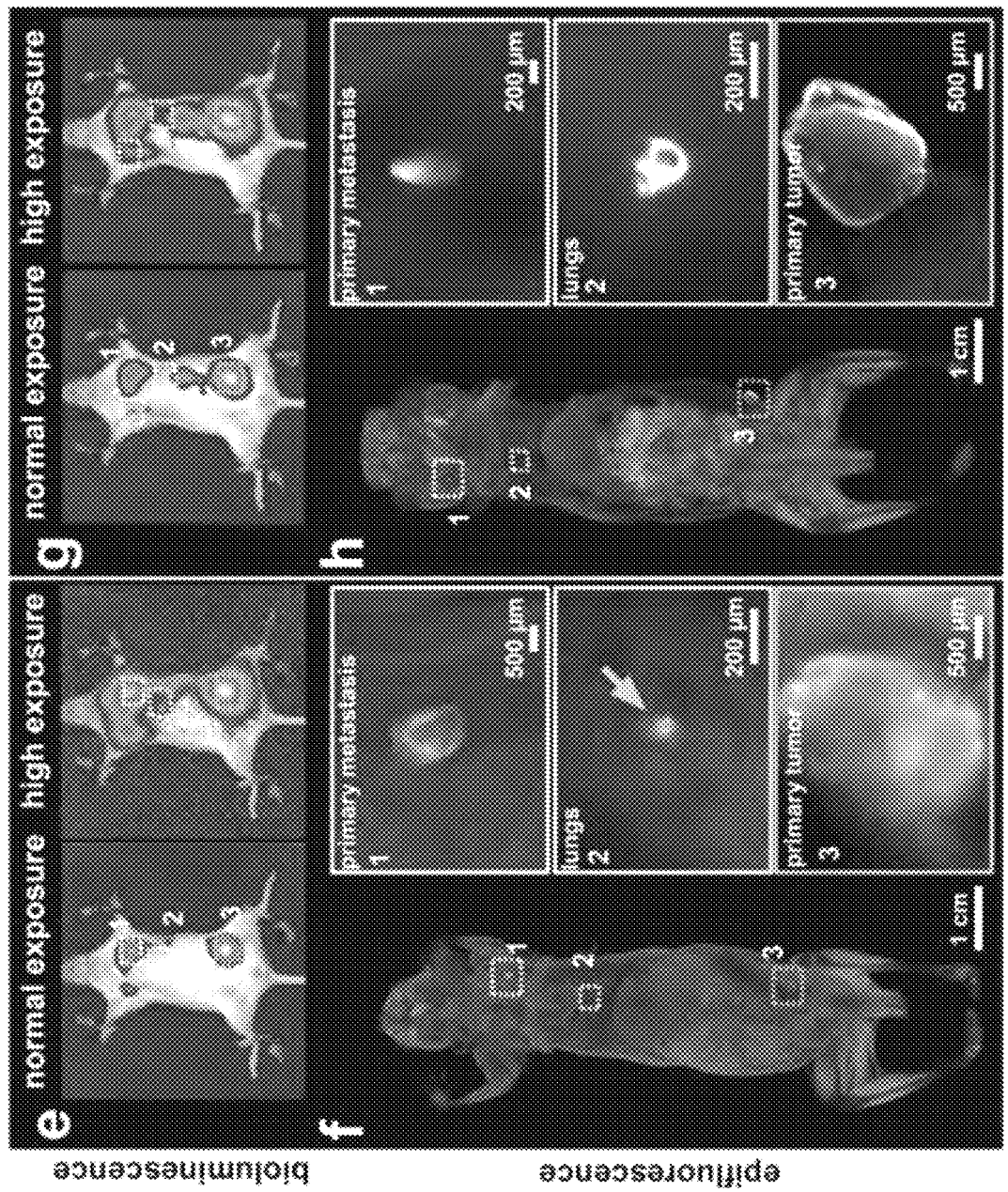
FIG. 9, continued

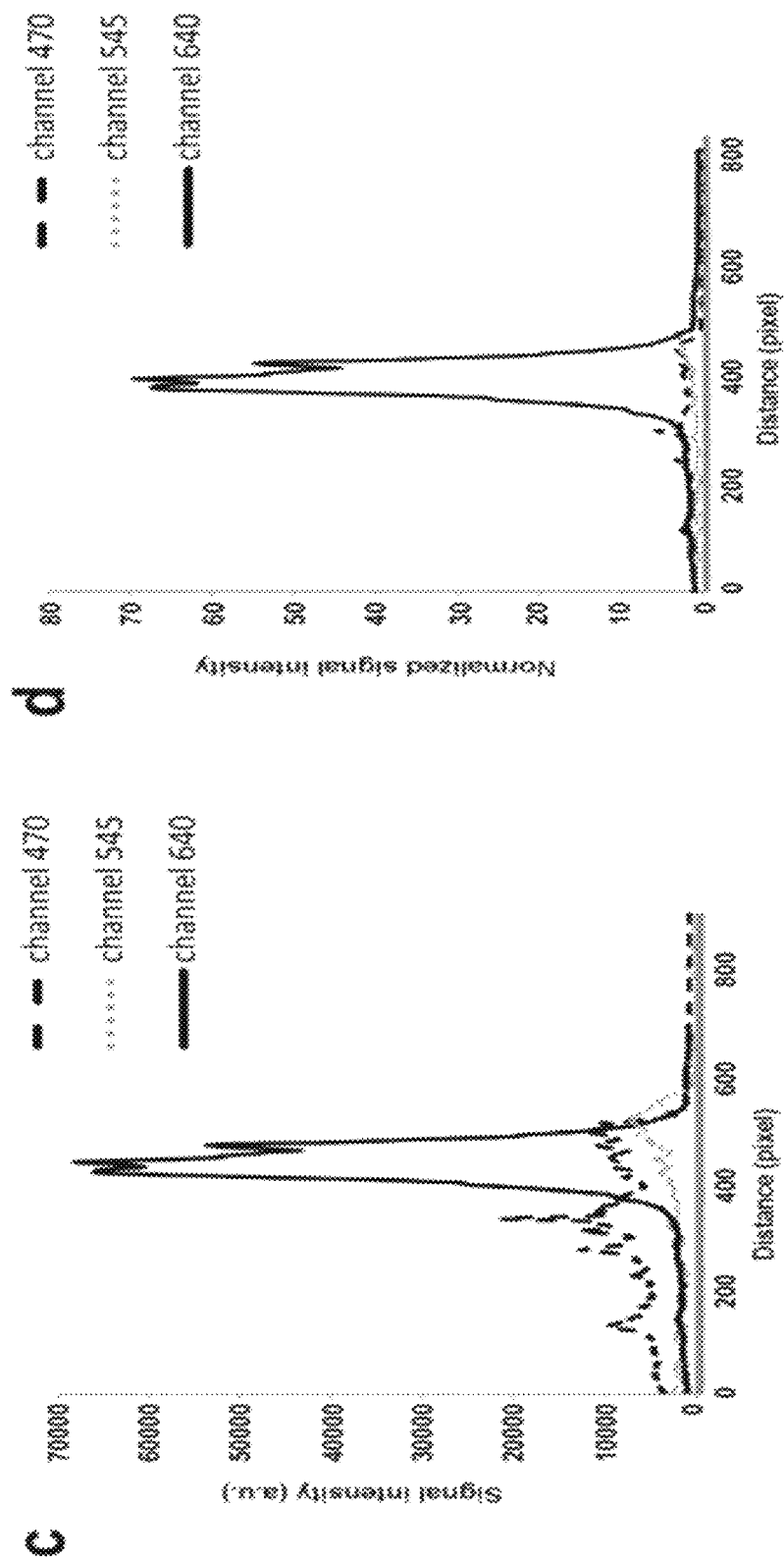
FIG. 10, continued

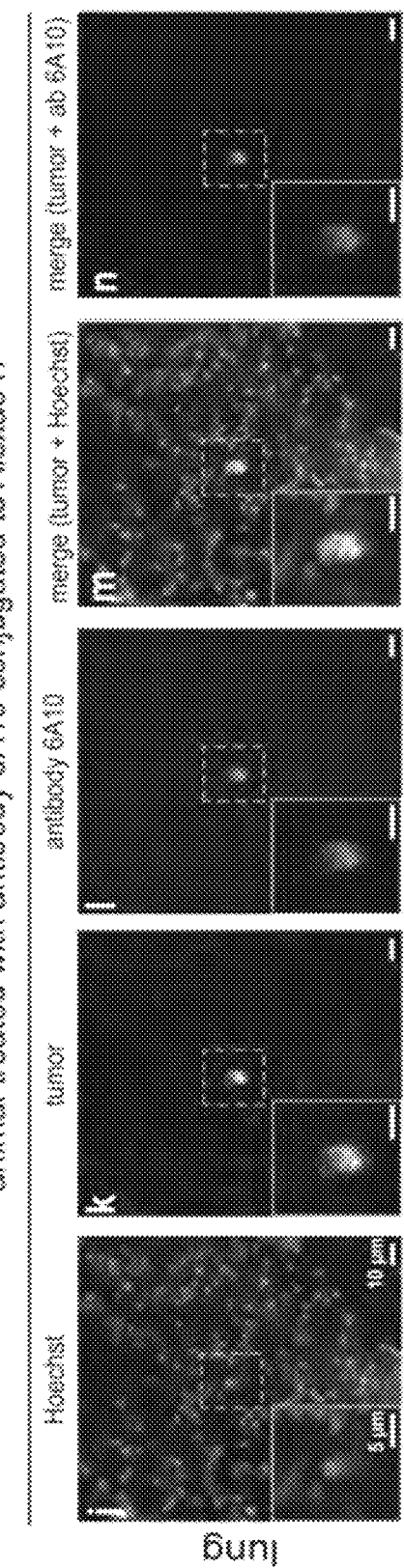
FIG. 11, continued

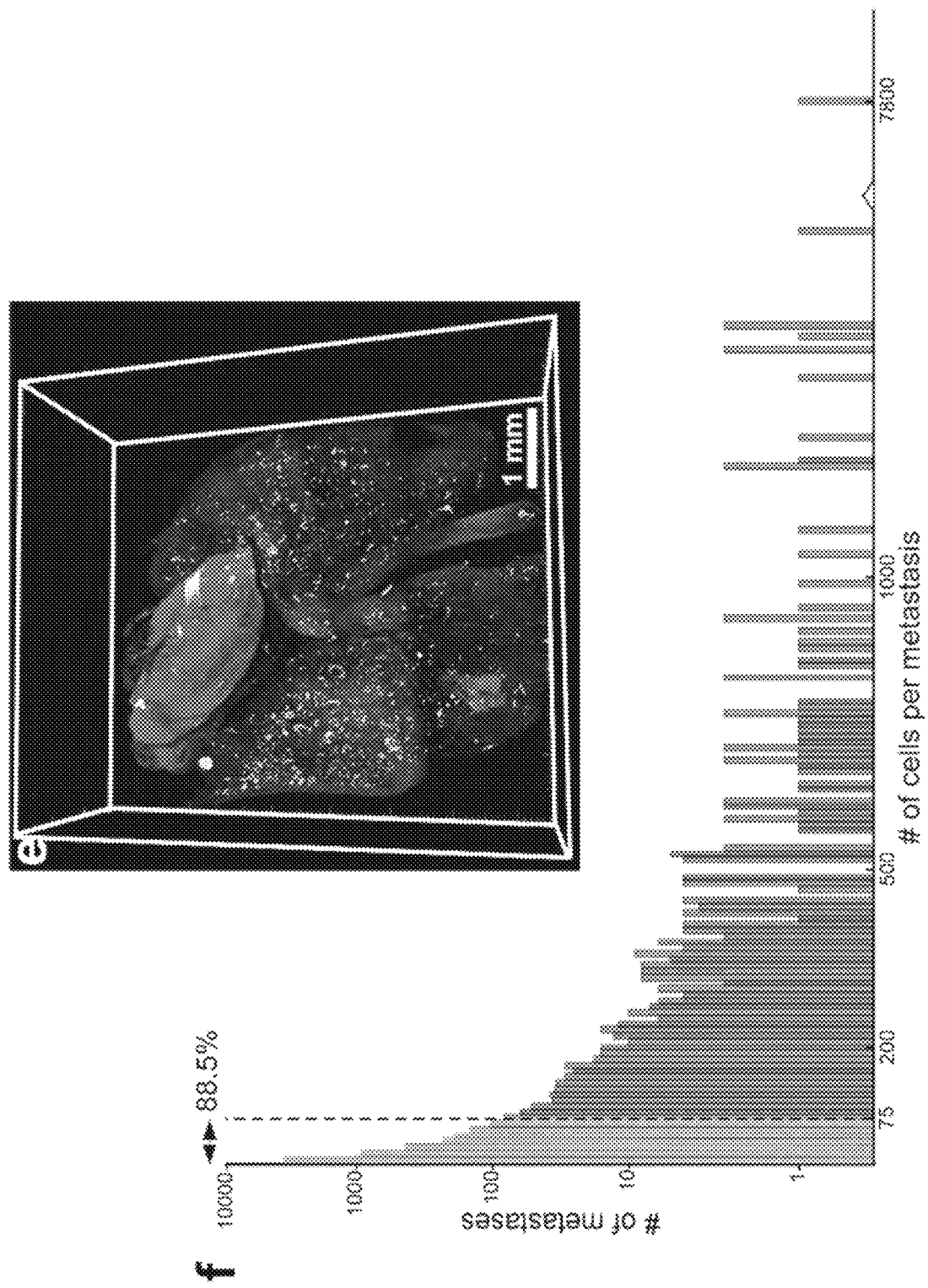
FIG. 12, continued

METHODS FOR LARGE TISSUE LABELING, CLEARING AND IMAGING

FIELD OF THE INVENTION

The present invention relates to methods for preparing an animal tissue for fluorescence microscopy, to an animal tissue obtainable by said methods, to methods for analyzing said animal tissues, and to methods for the detection of metastases, for analyzing the biodistribution of a biopharmaceutical drug, and for analyzing the biodistribution of nanoparticles. The methods for preparing an animal tissue according to the present invention encompass whole-body labeling, clearing and imaging methods. The methods of the invention are advantageous in that they, for instance, allow the visualization of single cells within mammalian tissues including pig and human brains, tumor metastases at the single cell level and of the distribution of biopharmaceutical drugs (e.g. the distribution of cancer-targeting therapeutic antibodies in whole animals such as intact mice) at single cell level in whole mouse.

BACKGROUND

Understanding the cellular details of tumor invasion and metastasis is crucial in cancer research, as most cancer patients die from metastases that develop in sites distant from the primary tumor. Metastasis is a complex process affecting different organs (Lambert et al., 2017; Massague and Obenauf, 2016), which is why comprehensive tracing and visualization of single metastases at the whole-body scale remains a major challenge to this day. The methods that are currently available either provide a biased and incomplete picture of the metastatic load (e.g. by examination of tissue sections or of superficially detectable metastatic nodules in preselected organs) or have very poor spatial resolution, little three-dimensional information and limited penetration in deeper parts of the body (e.g., bioluminescence-based imaging) (de Jong et al., 2014).

Mammalian tissues are naturally opaque, hindering high-resolution imaging in any tissue deeper than a few hundred micrometers (Tuchin and Tuchin, 2007). Recently developed tissue clearing methods have paved the way to study intact organs (Belle et al., 2014; Chung et al., 2013; Erturk et al., 2012; Erturk et al., 2011; Hama et al., 2011; Ke et al., 2013; Murray et al., 2015; Renier et al., 2014; Susaki et al., 2014; Yang et al., 2014), such as the neuronal projections in whole mouse brains (Renier et al., 2016; Ye et al., 2016) and inflammatory processes in the gut (Gabanyi et al., 2016). A few studies even rendered human embryos (Belle et al., 2017) and entire adult mouse bodies transparent (Pan et al., 2016; Tainaka et al., 2014; Yang et al., 2014). In particular, the ultimate DISCO (uDISCO) clearing method that were previously developed by the inventor allows both clearing and imaging of whole rodent bodies by shrinking tissues to one-third of their original size (Pan et al., 2016). This permitted for the first-time 3D imaging and reconstruction of entire adult mouse bodies using light-sheet microscopy.

However, to date, no method that allows the visualization of target molecules (e.g. proteins present in cancer cells) in a complete mouse body at single-cell resolution without prior dissection of the mouse has yet been available. For example, the known methods of Yang et al., 2014 and Tainaka et al., 2014 purported that they achieved whole-body clearing of mice. However, these methods did not actually analyze the whole body by fluorescence microscopy but only dissected parts of the body. Therefore, in these prior publications, there has been no demonstration/proof of a complete intact adult mouse being imaged at single cells resolution.

In addition, to date, there is no technology that can render tissues as large as pig brains transparent. This would be critical to study diseases and treatment options in mammalian brain using a holistic approach, which would show entire pathology in an unbiased way.

Thus, improved methods for the preparation and analysis of tissues including whole animals and large mammalian brains are needed.

DESCRIPTION OF THE INVENTION

The inventor reasoned that imaging optically transparent tissues including mice could be useful as a powerful preclinical approach, e.g. to detect fluorescently labeled cancer cells and/or therapeutic antibodies at cellular resolution in the intact body.

Typically, fluorescent labeling of cancer cells in vitro or in vivo is achieved by endogenous expression of fluorescent proteins such as GFP, YFP and mCherry, which emit light in the visible spectrum. However, many tissues in the body also show high autofluorescence in this range (Tuchin, 2016; Zipfel et al., 2003), which can hinder reliable detection of single cancer cells through centimeters-thick intact mouse body. According to preferred embodiments of the invention, labeling cells such as cancer cells using antibodies that are tagged with fluorescent dyes with emission peaks particularly in the far-red range is advantageous in order to overcome such autofluorescence signals by providing higher signal-to-background ratios for reliable detection of single cells.

Towards this goal, the inventor developed a method for preparing an animal tissue for fluorescence microscopy. Preferably, the method uses whole-body labeling (e.g. immunolabeling) technology based on antibody fragments such as nanobodies, to specifically label endogenously expressed common fluorescent proteins (e.g., EGFP, mCherry), or endogenous cellular proteins with fluorochromes such as Alexa and Atto dyes, preferably in the far-red spectrum. The inventor then included organic solvent-based clearing methods such as whole-body DISCO clearing methods (see Pan et al., 2016, which is incorporated by reference in its entirety for all purposes) in the methods of the invention. The methods of the invention are advantageous in that they allow to visualize cells such as cancer cells in intact see-through mice even in tissues with high autofluorescence.

This new pipeline according to the invention was named LuCiD (whole-body labeling, u/3Disco clearing, imaging, data visualization). The methods of the invention can, for instance, be used to assess tumor metastasis and the biodistribution of a cancer cell-targeting antibody, e.g. in mice. This finding has been exemplified by the inventor, for instance, by using mice transplanted with human mammary carcinoma cells and injected with the therapeutic monoclonal antibody 6A10 directed against carbonic anhydrase XII (CA12) (see Battke et al., 2011; and Gondi et al., 2013, for a reference to this antibody, which are incorporated by reference in their entirety for all purposes). The methods of the invention offer various key advantages over other imaging approaches, including but not limited to the capacity to detect spontaneous metastases and monitor tumor drug-target interactions at the single-cell level in intact mice and further phenotyping of defined tumor microenvironments via rehydration of cleared tissues and subsequent antibody labeling.

Unbiased detection of cancer metastasis and biodistribution of tumor-targeting therapeutics at a single cell level has been a long-standing challenge in pre-clinical research.

Here, the inventor used an organic-solvent based whole-body clearing method and developed methods that can be used, for instance, for the analysis of micrometastases and therapeutic anti-tumor antibody distribution in tissues such as whole mouse bodies at cellular resolution. The methods of the invention are unbiased, because they allow to label and detect target molecules in animal tissues (such as, for instance, whole mice) at single-cell resolution without dissection of the animal tissue prior to analyzing the animal tissue. Advantageously, the animal tissues that can be prepared and analyzed at single-cell resolution according to the invention without prior dissection are larger than in previously known methods. Thus, biases introduced by the dissection of the tissue (and by a subsequent separate analysis of the different dissected parts of said animal tissues) are minimized by the methods of the present invention. For example, a bias that may be introduced by analyzing only selected organs, or parts of such organs, can be minimized by the methods of the present invention. In non-limiting embodiments, the organic solvent used by the methods according to the invention contributes to this advantageous effect, because allows to shrink the animal tissue to a smaller size and makes the animal tissue more accessible to fluorescence microscopy with microscope objectives at their given maximum working distance.

The methods of the invention are also advantageous compared to previous methods in that they allow to clear tissues including skin, e.g. whole adult mice including skin.

The methods of the invention are also advantageous in that they can readily be applied in diverse labs without the need for highly specialized equipment, since imaging even with commonly used epifluorescence microscopes enables detection of greater detail in intact see-through mice than can be visualized through bioluminescence imaging.

The methods of the invention can, for instance, also reduce the time and cost needed for investigation of tumor micrometastases at the cellular level in whole mouse bodies. In addition, because researchers can readily evaluate a whole mouse body instead of selected tissues/organs, and because of the high sensitivity of the methods (being able to identify and quantify single cells throughout the body) the number of mice used in research can also be reduced significantly with the methods of the invention.

Thus, the methods of the invention presented here can foster the translation of new therapies into the clinic much more efficiently than traditional methods.

Furthermore, unlike known tissue clearing methods such as CUBIC and PACT methods which make the tissue fragile, the method for preparing an animal tissue for fluorescence microscopy according to the invention renders the animal tissue hard. Thus, advantageously, the animal tissue obtainable by the methods of the invention is suitable for dissection into different parts and further analysis of the parts after dissection by fluorescence microscopy. It will be understood that according to the invention, dissection of the animal tissue that is obtainable by the methods of the invention is oftentimes not needed, because the animal tissues that can be prepared and analyzed at single-cell resolution according to the invention without prior dissection are larger than in previously known methods. However, if dissection is desired, the animal tissue that is obtainable by the methods of the invention can advantageously be used. This would be particularly useful to further characterize micrometastases which have been identified by the methods of the invention, and their microenvironments after isolation.

Tissue Labeling Such as Whole-Body Immunostaining Using Nanobodies

Imaging endogenous proteins such as endogenous fluorescent proteins in thick biological tissues presents major challenges, including the autofluorescence in the blue-green spectra and bleaching during lengthy imaging and storage. In exemplary embodiments of the invention, to achieve the highest signal quality for single tumor cell detection in the whole adult mice, it is advantageous to label (e.g. immunolabel) endogenous fluorescent proteins, e.g. endogenous fluorescent proteins within cancer cells, with stable far-red fluorochromes, such as Atto or Alexa dyes. This approach is advantageous in that it increases the signal-to-background ratio up to 20 times and allows the visualization of single cells in tissues, in particular even in centimeters-thick mouse bodies. According to the invention, it will be understood that the use of fluorochromes even further in the longer wavelength spectrum, such as near-infrared fluorochromes, can be used to further increase the imaging quality and potentially allow studying sub-cellular structures/molecules in whole mouse bodies (see Hong et al., 2017, which is incorporated by reference in its entirety for all purposes, for examples of suitable fluorochromes).

The method of the invention uses labeling with fluorochrome-containing labeling agents (e.g. antibody fragments conjugated to a fluorochrome) that have a molecular weight of equal to or less than 100 kDa. While currently there is a limited number of nanobodies that are commercially available as examples of such labeling agents, the nano-boosters (ChromoTek) that can be used in the methods of the invention can stain a broad selection of 21 different fluorescent proteins, such as EGFP, YFP, Venus, mCherry, and mRFP. Alternatively, the methods of the invention may also use other nanobodies or small fragments of conventional antibodies (e.g., scFv) (see, for instance, Holliger and Hudson, 2005, which is incorporated by reference in its entirety for all purposes, for examples of such labeling agents). Alternatively, new nanobodies can be generated for the methods of the invention to study pathologies that are affecting the whole body. For example, a labeling agent (e.g. a nanobody), which could be used as an inflammation or infection marker, would help to collect unbiased readouts in whole mice for inflammatory disorders, such as multiple sclerosis or rheumatoid arthritis, or infectious diseases, affecting the entire body. Further, the examples of the invention demonstrate that tissues from animals imaged by the LuCiD method of the invention can be subsequently rehydrated and stained by conventional antibodies using standard protocols, which allows complete phenotyping characterization of the tumors/metastases and their microenvironment.

Detection of Micrometastases According to the Invention

Unbiased high-throughput mapping of tumor micrometastases at cellular resolution, e.g. in entire rodent bodies, can be a valuable tool to uncover the biology behind the dissemination of tumor cells. In exemplary embodiments, the invention encompasses the LuCiD method which can be used for volumetric imaging of tumor micrometastases in the entire mouse body. While the usage of a single plane laser-scanning light-sheet microscope is the most preferred embodiment of the method for analyzing according to the invention, e.g. to detect cancer cells in see-through mice, utilization of even standard fluorescence microscopes can also provide novel insights. For example, the inventor detected micrometastases as small as 20 μm in diameter using epifluorescence microscopy. In addition, epifluorescence imaging helps to perform a straightforward scan of cleared mouse bodies within minutes to determine regions of interests before collecting large datasets with light-sheet microscopes. Subsequent light-sheet microscopy imaging could focus only on organs/regions of interest based on epifluorescence data. This approach would significantly speed up the conducted studies and reduce the amount of data to be analyzed. In the illustrative examples of the invention shown below, light-sheet microscopy imaging generated ~4 TB data for a single mouse body vs. ~100 GB for single organs such as the lung. In these illustrative examples, the inventor used Vision4D software (Arivis) to stitch the 3D imaging stacks collected by ultramicroscopy, which is capable of stitching and segmenting TB-sized data from a complete mouse at cellular resolution. Other known computer programs for the analysis of microscopy images can also be used in accordance with the invention.

The inventor demonstrated here that advantageously, the methods of the invention are suitable for detecting and mapping cancer metastases in whole mouse bodies at the cellular level, allowing identification of the precise locations of single disseminated cancer cells. Importantly, the inventor has also shown that the methods of the invention allow re-probing of identified metastatic tissue with conventional antibodies, gene-expression profiling via e.g. RNAseq and proteomics (Mass spect).

Thus, according to the invention, the methods for preparing an animal tissue for fluorescence microscopy of the invention are advantageous in that they preserve proteins (functional epitopes) and DNA/RNA.

Therefore, the methods of the invention can enable further characterization and molecular screening of micrometastases and single tumor cells identified in distant organs. According to the invention, usage of molecular markers for specific subtypes of tumor cells such as cancer stem cells, or of inflammatory cells and extracellular matrix components from the tumor microenvironment, such as cancer associated fibroblasts, T cells and macrophages will help to determine their exact spatiotemporal distributions in tissues, e.g. whole rodent bodies, during metastasis.

Analysis of the Biodistribution of Biopharmaceutical Drugs According to the Invention While precise assessment of biopharmaceutical drug (e.g. antibody drug) biodistribution is critical for evaluating its specificity and utility for treatments such as tumor treatments, there have been no methods that can provide such information at the cellular level in the intact organism. Here, the inventor presents the methods of the invention (which are in exemplary embodiments also refered to as the "LuCiD" methods) as a novel tool that can be used to study not only the distribution of single tumor cells, but also of antibody based therapeutics. The illustrative examples of the invention demonstrate that the methods of the invention can allow identification of antibody-targeted tumor cells, in particular in metastases in different organs, including lungs, kidney, brain and liver. For example, the inventor surprisingly observed that while most micrometastases in the lungs were targeted by an anti-CA12 therapeutic antibody 6A10, some micrometastases distributed throughout the lungs and liver were not targeted by the antibody. Finally, the methods for analyzing of the invention are also advantageous in that they can also be used to detect binding of biopharmaceutical drugs (e.g. therapeutic antibodies) to non-target tissues (such as non-cancerous tissues in the case of cancer therapeutic antibodies) to indicate potential off-target effects. This has been exemplified in the non-limiting examples shown below in the whole body of a mouse and quantifications in organs are shown.

Analysis of the Biodistribution of Nanoparticles According to the Invention

In exemplary method for analyzing the biodistribution of nanoparticles, Nanoparticles (DNA origami or carbon nanotubes) have been conjugated to polymers such as PEG to increase the circulation time and stability. They are may also be tagged by mioties such as antibodies, peptides, aptamers for targeting. For example, CpG peptides can be used to target them to immune cells. Finally, they can also be conjugated to fluorochromes (e.g., Alexa or Atto dyes) for use in accordance with the methods of the present invention. The conjugated nanoparticles can be dissolved in PBS at 200 nM-2 μM concentrations. Then 100-200 μL of this solution is injected to mice either i.v. or i.p. Subsequently the mice are perfused as early as 3 hours (or longer). The biodistiburion of nanoparticles is assessed by the methods of the invention.

Thus, the invention provides an advantageous labeling and analysis pipeline. This pipeline, for instance, allows visualization and analysis of tumor micrometastases and antibody based therapies at single cell resolution in whole mouse bodies. Because the methods of the invention are time and cost efficient, they can be used to investigate various biomedical questions, e.g. biomedical questions related to various pathologies or developmental processes that affect the organism as a whole.

Accordingly, the present invention encompasses the following preferred embodiments:

1. A method for preparing an animal tissue for fluorescence microscopy, the method comprising the following steps:
   a) Optionally decalcifying a fixed animal tissue with a solution for decalcification;
   b) Optionally decolorizing the fixed animal tissue with a solution for the removal of heme;
   c) Labeling a target molecule in the fixed animal tissue with a labeling solution comprising a fluorochrome-containing labeling agent capable of binding to said target molecule, said labeling agent having a molecular weight of equal to or less than 100 kDa, to obtain a fixed animal tissue labeled with said fluorochrome-containing labeling agent;
      wherein the fixed animal tissue is treated with a permeabilization solution before said labeling of the target molecule in step c) and wherein the permeabilization solution and the labeling solution are different solutions;
      or wherein the fixed animal tissue is treated with a permeabilization solution during said labeling of the target molecule in step c) and wherein the permeabilization solution and the labeling solution are the same solution, and
   d) Clearing the fixed animal tissue labeled with said fluorochrome-containing labeling agent with a clearing solution comprising an organic solvent; so as to obtain said animal tissue for fluorescence microscopy.
2. The method according to item 1, wherein the method comprises step a).
3. The method according to item 1 or 2, wherein in step a), the solution for decalcification is selected from a solution that comprises EDTA and $NaHCO_3$, a solution that comprises formic acid, a solution that comprises $HNO_3$, or a solution that comprises HCl.
4. The method according to any one of the preceding items, wherein said fixed animal tissue is obtainable by fixation with a fixation solution comprising 4 wt % paraformaldehyde and optionally heparine.
5. The method according to any one of the preceding items, wherein the method comprises step b).
6. The method according to any one of the preceding items, wherein step b) is performed by perfusing the fixed animal tissue with said solution for the removal of heme.
7. The method according to any one of the preceding items, wherein said solution for the removal of heme is a heme-chelating solution.
8. The method according to any one of the preceding items, wherein in step b), said solution for the removal of heme comprises an aminoalcohol suitable for the removal of heme and optionally a detergent.
9. The method according to item 8, wherein said solution for the removal of heme comprises a detergent, and wherein said detergent is an ionic detergent, a non-ionic detergent, a zwitterionic detergent, a chaotropic detergent or a combination thereof.
10. The method according to item 9, wherein said detergent is an ionic detergent which is sodium dodecyl sulfate or deoxycholate, 11. The method according to item 9, wherein said detergent is a non-ionic detergent which is 4-(1,1,3,3-Tetramethylbutyl)phenyl-polyethylene glycol, t-Octylphenoxypolyethoxyethanol, Polyethylene glycol tert-octylphenyl ether or polyoxyethylene (20) sorbitan monolaurate.
12. The method according to item 9, wherein said detergent is a zwitterionic detergent which is 3-[(3-Cholamidopropyl)dimethylammonio]-1-propanesulfonate hydrate.
13. The method according to item 9, wherein said detergent is a chaotropic detergent which is urea.
14. The method according to any one of items 8-13, wherein said aminoalcohol is N,N,N',N'-tetrakis (2-hydroxypropyl)ethylenediamine, N-Butyldiethanolamine, N-Methyldiethanolamine, 4-(2-Hydroxyethyl)morpholine, N-Ethyldiethanolamine, 2-(Diisopropylamino)ethanol, 4-Methylmorpholine N-oxide or 1-(2-Hydroxyethyl)piperidine.
15. The method according to any one of items 8-14, wherein said aminoalcohol is N,N,N',N'-tetrakis (2-hydroxypropyl)ethylenediamine.
16. The method according to item 15, wherein the solution for the removal of heme is a 1:2 or 1:3 dilution of the following reagent, preferably in 0.1 M PBS: 25 wt % urea, 25 wt % N,N,N',N'-tetrakis (2-hydroxypropyl)ethylenediamine, 15 wt % Triton X-100 in 0.1 M PBS.
17. The method according to any one of the preceding items, wherein in step b), said solution for the removal of heme comprises an oxidizing reagent for the oxidation of heme.
18. The method according to item 17, wherein the oxidizing reagent for the oxidation of heme is benzyl peroxide, 3-chloroperoxybenzoic acid or magnesium monoperoxyphthallate hexahydrate.
19. The method according to item 17, wherein the oxidizing reagent for the oxidation of heme is benzyl peroxide.
20. The method according to any one of the preceding items, wherein the fluorochrome-containing labeling agent has a molecular weight of equal to or less than 60 kDa.
21. The method according to any one of the preceding items, wherein the fluorochrome-containing labeling agent has a molecular weight of equal to or less than 50 kDa.
22. The method according to any one of the preceding items, wherein the fluorochrome-containing labeling agent has a molecular weight of equal to or less than 40 kDa.
23. The method according to any one of the preceding items, wherein the fluorochrome-containing labeling agent has a molecular weight of equal to or less than 30 kDa.
24. The method according to any one of the preceding items, wherein the fluorochrome-containing labeling agent has a molecular weight of equal to or less than 20 kDa.
25. The method according to any one of the preceding items, wherein said fluorochrome is capable of emitting infrared or red fluorescence.
26. The method according to any one of the preceding items, wherein said fluorochrome is capable of emitting near-infrared or far-red fluorescence.
27. The method according to any one of items 1 to 26, wherein the emission maximum of said fluorochrome is at a wavelength of higher than 480 nm.
28. The method according to any one of items 1 to 26, wherein the emission maximum of said fluorochrome is at a wavelength of higher than 500 nm.
29. The method according to any one of items 1 to 26, wherein the emission maximum of said fluorochrome is at a wavelength of higher than 550 nm.
30. The method according to any one of items 1 to 26, wherein the emission maximum of said fluorochrome is at a wavelength of higher than 590 nm.
31. The method according to any one of items 1 to 26, wherein the emission maximum of said fluorochrome is at a wavelength of higher than 600 nm.
32. The method according to any one of items 1 to 26, wherein the emission maximum of said fluorochrome is at a wavelength of higher than 640 nm.
33. The method according to any one of items 1 to 26, wherein the emission maximum of said fluorochrome is at a wavelength of higher than 700 nm.
34. The method according to any one of items 1 to 26, wherein the emission maximum of said fluorochrome is in a wavelength range of between 640 nm and 700 nm.
35. The method according to any one of items 1 to 33, wherein the emission maximum of said fluorochrome is at a wavelength of lower than 1000 nm or lower than 900 nm.
36. The method according to any one of items 1 to 33, wherein the emission maximum of said fluorochrome is at a wavelength of lower than 800 nm.
37. The method according to any one of the preceding items, wherein the fluorochrome-containing labeling agent is an antibody fragment conjugated to said fluorochrome, said antibody fragment being capable of binding to said target molecule.
38. The method according to any one of the preceding items, wherein the fluorochrome-containing labeling agent is a nanobody conjugated to said fluorochrome, said nanobody being capable of binding to said target molecule.
39. The method according to any one of the preceding items, wherein step c) is performed by perfusing the fixed animal tissue with said labeling solution comprising the fluorochrome-containing labeling agent.
40. The method according to any one of the preceding items, wherein the fluorochrome-containing labeling agent is fluorescent dyes, said fluorescent dyes being capable of binding to said target molecule.
41. The method according to any one of the preceding items, wherein the fluorochome-containing labeling agent is fluorescent dyes, said fluorescent dye is Nissl, propidium iodide, methoxy-x04, Cresyl Violet acetate, Pyronin Y, Thiazin Red, lectin, DiI, Atto dyes, and To-pro3.
42. The method according to any one of the preceding items, wherein said organic solvent has a refractive index which deviates from the refractive index of the tissue of said animal by not more than 5%.
43. The method according to any one of the preceding items, wherein said clearing solution comprising the organic solvent has a refractive index which deviates from the refractive index of the tissue of said animal by not more than 2%.
44. The method according to any one of the preceding items, wherein said clearing solution comprising the organic solvent has a refractive index of between 1.500 and 1.600.
45. The method according to any one of the preceding items, wherein said clearing solution comprising the organic solvent has a refractive index of between 1.520 and 1.580.
46. The method according to any one of the preceding items, wherein said organic solvent comprises benzyl alcohol, benzyl benzoate, dibenzyl ether, ethyl 3-phenyl-2-propenoate, allyl 3-phenylacrylate, PEG (Mn=200-1000), PEGDA (Mn=200-1000), PEGMA (Mn=200-1000), 1-phenylnaphthalene and/or diphenyl ether.
47. The method according to any one of the preceding items, wherein said clearing solution comprising the organic solvent further comprises an antioxidant.
48. The method according to any one of the preceding items, wherein said clearing solution comprising the organic solvent consists of benzyl alcohol, benzyl benzoate and diphenyl ether at a volume ratio of from 4:8:3 to 10:20:3 and said antioxidant.
49. The method according to item 47 or 48, wherein said antioxidant is DL-alpha-tocopherol.
50. The method according to item 47 or 48 or 49, wherein said antioxidant is present in an amount of 0.4 vol % in said clearing solution.
51. The method according to any one of the preceding items, wherein step d) is performed by perfusing the fixed animal tissue labeled with said fluorochrome-containing labeling agent with said clearing solution comprising the organic solvent.
52. The method according to item 51, wherein the fixed animal tissue labeled with said fluorochrome-containing labeling agent is perfused with said clearing solution comprising the organic solvent for at least 6 hours.
53. The method according to item 51 or 52, wherein step d) further comprises, prior to perfusion with said clearing solution, a perfusion with an increasing gradient of a dehydration solution comprising a further organic solvent of 0 vol % to 100 vol %.
54. The method according to item 53, wherein said perfusion with said increasing gradient of a dehydration solution comprising said further organic solvent of 0 vol % to 100 vol % is followed by an delipidation solution comprising another organic solvent.
55. The method according to item 54, wherein said further organic solvent is tert-butanol, tetrahydrofuran (THF), methanol, ethanol or 1,4-Dioxane and wherein said perfusion with said increasing gradient is performed at a temperature above the melting temperature of said further organic solvent.
56. The method according to item 54 or 55, wherein said another organic solvent is dichoromethane, chloroform, methanol, hexane, butanol, ethyl acetate, tert-butyl methyl ether, and wherein said perfusion with said another organic solvent is performed at a temperature above the melting temperature of said another organic solvent.
57. The method according to any one of the preceding items, wherein said labeling solution and said permeabilization solution and said clearing solution are actively delivered by applying pressure, preferably by applying pressure with a pump.
58. The method according to any one of the preceding items, wherein said labeling of the target molecule with the labeling solution and said treatment with the permeabilization solution is performed by perfusion at a pressure of higher than 80 mmHg, preferably higher than 150 mmHg.
59. The method according to any one of the preceding items, wherein said labeling of the target molecule with the labeling solution and said treatment with the permeabilization solution is performed by perfusion at a pressure of between 220 and 240 mmHg, preferably at a pressure of 230 mmHg.
60. The method according to any one of the preceding items, wherein the fixed and decolorized animal tissue is treated with a permeabilization solution before said labeling of the target molecule in step c) and wherein the permeabilization solution and the labeling solution are different solutions.
61. The method according to item 60, wherein said permeabilization solution is a dehydration solution as defined in any one of items 54 or 55.
62. The method according to item 60, wherein said permeabilization solution is a delipidation solution as defined in any one of items 54 or 56.
63. The method according to item 60, wherein said permeabilization solution comprises acetic acid.
64. The method according to item 60, wherein said permeabilization solution comprises guanidine hydrochloride and/or sodium acetate.
65. The method according to any one items 1 to 59, wherein the fixed animal tissue is treated with a permeabilization solution during said labeling of the target molecule in step c) and wherein the permeabilization solution and the labeling solution are the same solution.
66. The method according to any one of the preceding items, wherein step b) is performed by perfusing the fixed animal tissue with said solution for the removal of heme at a pressure of higher than 80 mmHg, preferably higher than 150 mmHg.
67. The method according to any one of the preceding items, wherein step b) is performed by perfusing the fixed animal tissue with said solution for the removal of heme at a pressure of between 220 and 240 mmHg, preferably at a pressure of 230 mmHg.
68. The method according to any one of items 51 to 67, wherein perfusion in step d) is performed at a pressure of higher than 80 mmHg, preferably higher than 150 mmHg.
69. The method according to any one of items 51 to 67, wherein perfusion in step d) is performed at a pressure of between 220 and 240 mmHg, preferably at a pressure of 230 mmHg.
70. The method according to any one of the preceding items, wherein said animal tissue is from a mammal.
71. The method according to any one of the preceding items, wherein said animal tissue is from a non-human mammal or human.
72. The method according to any one of the preceding items, wherein said animal tissue is from a rodent.
73. The method according to any one of the preceding items, wherein said animal tissue is from a mouse.
74. The method according to any one of the preceding items, wherein said animal tissue is a whole mouse.
75. The method according to any one of items 1-71, wherein said animal tissue is pig brain.

76. The method according to any one of items 1 to 58, wherein said animal tissue is a whole organ or a part thereof.
77. The method according to any one of the preceding items, wherein said target molecule which is labeled by said labeling agent in step c) is a structure, preferably a protein, lipid, DNA or RNA, that is present in cells of said fixed animal tissue, more preferably a protein that is present in cells of said fixed animal tissue.
78. The method according to any one of the preceding items, wherein said animal tissue contains a cancer, and wherein said target molecule which is labeled by said labeling agent in step c) is a structure, preferably a protein, lipid, DNA or RNA, that is present in cells of said cancer, more preferably a protein that is present in cells of said cancer.
79. The method according to any one of the preceding items, wherein said animal tissue contains cancer metastases, and wherein said target molecule which is labeled by said labeling agent in step c) is a structure, preferably a protein, lipid, DNA or RNA, that is present in cells of said cancer, more preferably a protein that is present in cells of said cancer.
80. The method according to any one of the preceding items, wherein said animal has been treated with a biopharmaceutical drug, wherein said animal tissue contains said biopharmaceutical drug, and wherein said biopharmaceutical drug is said target molecule which is labeled by said labeling agent in step c), or wherein said biopharmaceutical drug has been labelled with a further fluorochrome in vitro, or wherein said biopharmaceutical drug that is fluorescent itself.
81. The method according to item 80, wherein the biopharmaceutical drug is a small molecule.
82. The method according to item 80, wherein the biopharmaceutical drug is a therapeutic protein.
83. The method according to item 80, wherein the biopharmaceutical drug is a therapeutic antibody.
84. The method according to any one of the preceding items, wherein said method is not a method for the treatment of the human or animal body by surgery or therapy and not a diagnostic method practised on the human or animal body.
85. The method according to any one of the preceding items, wherein said method is an ex vivo method.
86. The method according to any one of the preceding items, wherein the animal tissue for fluorescence microscopy obtained in step d) has a smaller volume than the fixed animal tissue used in step b).
87. The method according to item 86, wherein the animal tissue for fluorescence microscopy obtained in step d) has a 40% to 75% smaller volume than the fixed animal tissue used in step b).
88. An animal tissue obtainable by a method for preparing an animal tissue for fluorescence microscopy according to any one of items 1-87, wherein said animal tissue contains said target molecule labeled by said fluorochrome-containing labeling agent.
89. The animal tissue of item 88, wherein said animal tissue is a whole rodent, preferably a whole mouse.
90. The animal tissue of item 88, wherein said animal tissue is a whole organ or a part thereof.
91. The animal tissue of item 90, wherein said animal tissue is a whole mammalian organ.
92. The animal tissue of item 88, wherein said animal tissue is a tissue block of 2×2×2 cm in size.
93. The animal tissue according to any one of the preceding items, wherein in said animal tissue, said target molecules are labeled by said fluorochrome-containing labeling agent, and wherein all target molecules are detectable at single-cell resolution irrespective of their location in the animal tissue when analyzed by light-sheet fluorescence microscopy.
94. A method for analyzing an animal tissue according to any one of items 88 to 93, said method comprising a step of i) analyzing said tissue by fluorescence microscopy in order to detect the fluorescence of said fluorochrome in said animal tissue.
95. The method for analyzing according to item 94, wherein the method further comprises the step of ii) visualizing the detected fluorescence of said fluorochrome to obtain an image, preferably a three-dimensional image, of said animal tissue.
96. The method for analyzing according to item 95, wherein said image is an image having single cell resolution throughout said animal tissue.
97. The method for analyzing according to any one of the preceding items, wherein said animal tissue is not thicker than 20 cm, preferably not thicker than 10 cm, more preferably not thicker than 5 cm thick.
98. The method for analyzing according to any one of the preceding items, wherein said animal tissue is not thicker than 2 cm and is preferably between 1.5 to 2 cm thick.
99. The method for analyzing according to any one of the preceding items, wherein said method for analyzing further comprises, prior to step i), the method according to any one of items 1-87.
100. The method for analyzing according to any one of the preceding items, wherein said fluorescence microscopy is selected from the group consisting of light sheet fluorescence microscopy, epifluorescence microscopy, multiphoton microscopy and confocal fluorescence microscopy.
101. The method for analyzing according to any one of the preceding items, wherein said fluorescence microscopy is light sheet fluorescence microscopy.
102. The method for analyzing according to any one of the preceding items, wherein said method further comprises, after step i), the steps of iii) dissecting a tissue region of interest; iv) rehydrating the dissected tissue region of interest; and v) further analyzing the dissected tissue region of interest.
103. The method for analyzing according to item 102, wherein in step v), the dissected tissue region of interest is further analyzed by antibody-based immunostaining, or by gene-profiling which is preferably gene profiling by RNAseq, or by proteomics which is preferably proteomics by mass spectrometry.
104. The method for analyzing according to any one of items 102 or 103, wherein the dissected tissue region of interest comprises a metastasis, preferably a metastasis having a size of less than 200 tumor cells, more preferably a metastasis having a size of less than 100 tumor cells, still more preferably a metastasis having a size of less than 75 tumor cells, still more preferably a metastasis having a size of less than 50 tumor cells, and still more preferably a metastasis having a size of less than 25 tumor cells.
105. A method for the detection of metastases, wherein the method comprises a method for analyzing an animal tissue according to any one of the preceding items.
106. The method for the detection of metastases according to item 105, which is a method for the detection of metastases in said animal tissue at single-cell resolution throughout said animal tissue.

107. The method for the detection of metastases according to any one of the preceding items, wherein said animal tissue contains cancer metastases, and wherein the target molecule labeled by said labeling agent is a structure, preferably a protein, that is present in cells of said cancer.

108. A method for analyzing the biodistribution of a biopharmaceutical drug, wherein the method comprises a method for analyzing an animal tissue according to any one of the preceding items, wherein said animal has been treated with the biopharmaceutical drug as defined in item 80, wherein said animal tissue contains said biopharmaceutical drug, and wherein said biopharmaceutical drug is said target molecule which is labeled by said labeling agent.

109. The method according to item 108, wherein the biopharmaceutical drug is a therapeutic protein.

110. The method according to item 108, wherein the biopharmaceutical drug is a therapeutic antibody.

111. The method according to item 108, wherein the biopharmaceutical drug is a nanoparticle.

112. A method for analyzing the biodistribution of nanoparticles, wherein the method comprises a method for analyzing an animal tissue according to any one of the preceding items, wherein said animal has been treated with the nanoparticles, wherein said animal tissue contains said nanoparticles, and wherein said nanoparticles are said target molecule which is labeled by said labeling agent and/or are selected from fluorochrome-conjugated nanoparticles or nanoparticles which are fluorescent themselves.

113. The method for analyzing the biodistribution of nanoparticles according to item 112, wherein the nanoparticles carry a drug or are a drug.

114. A method for studying neurodegeneration, wherein the method comprises a method for analyzing an animal tissue according to any one of the preceding items, and wherein said animal tissue contains neurons.

115. The method for studying neurodegeneration according to item 114, wherein the neurons in said animal tissue have been fluorescently labelled, preferably by expression of a fluorescent protein.

116. The method for studying neurodegeneration according to any one of the preceding items, wherein the studying of neurodegeneration comprises the analysis of the blebbing of neuronal axons.

117. A method for studying neuroinflammation, wherein the method comprises a method for analyzing an animal tissue according to any one of the preceding items, and wherein said animal tissue contains neurons.

118. The method for studying neuroinflammation according to item 117, wherein immune cells in said animal tissue have been fluorescently labelled, preferably by expression of a fluorescent protein.

119. The method for studying neuroinflammation according to any one of the preceding items, comprising studying the activation of immune cells by analyzing the signal intensity and/or the cell numbers of the fluorescently labeled immune cells.

120. A method for studying meningeal lymphatic vessels, wherein the method comprises a method for analyzing an animal tissue according to any one of the preceding items, and wherein said animal tissue comprises preferably an intact mouse head.

121. The method for studying meningeal lymphatic vessels according to item 120, wherein said meningeal lymphatic vessels are fluorescently labeled, preferably by a marker protein or by a tracer such as ovalbumin, 122. The method for studying meningeal lymphatic vessels according to any one of the preceding items, wherein said meningeal lymphatic vessels contain said target molecule.

BRIEF DESCRIPTION OF THE DRAWINGS

FIG. 3: Visualization and quantification of metastases in an intact whole mouse body with low tumor load (a,b) Normal and high exposure bioluminescence images of a low tumor load mouse before LuCiD. The primary tumor and the metastasis at the axillary lymph node (A.L.N.) by are marked by arrows in (a). (c-f) Epifluorescence images of a LuCiD-processed mouse showing greater details of tumor metastases compared to bioluminescence including a number of lung micrometastases that are undetectable by bioluminescence (e), even smaller than 20 mm (arrowheads in e). (g,h) 3D reconstruction of the entire mouse after light-sheet microscopy imaging in ventral and lateral views, respectively. All the tumors/metastases in the mouse body are segmented (some marked by arrows). (i) Quantification of all metastases in the entire mouse based on their size (cell number) and quantity. (j) 2D distribution map of tumor metastases in the entire mouse body. The size of the spots represents the volume of tumor metastases. The relative depths are of marked regions are indicated at the right side. (k) 3D segmentation of the tumor metastases detected in the lungs showing tumor cells (white dots) autofluorescence background. (l) 3D scatter plot of all metastases in the lungs shown in (k), representing their size and location.

In the whole CNS (a) and single cell zoom views (b-d), chronic activation of immune cells is evident along the pyramidal axonal track. Note that detailed cell morphology is visible after nanoboosting by LuCiD (c, arrowheads). (e) An unlesioned spinal cord view from the age-matched control CX3CR1-GFP mouse. Note the even distribution of microglia and absence of accumulation in the middle.

Figure 15:
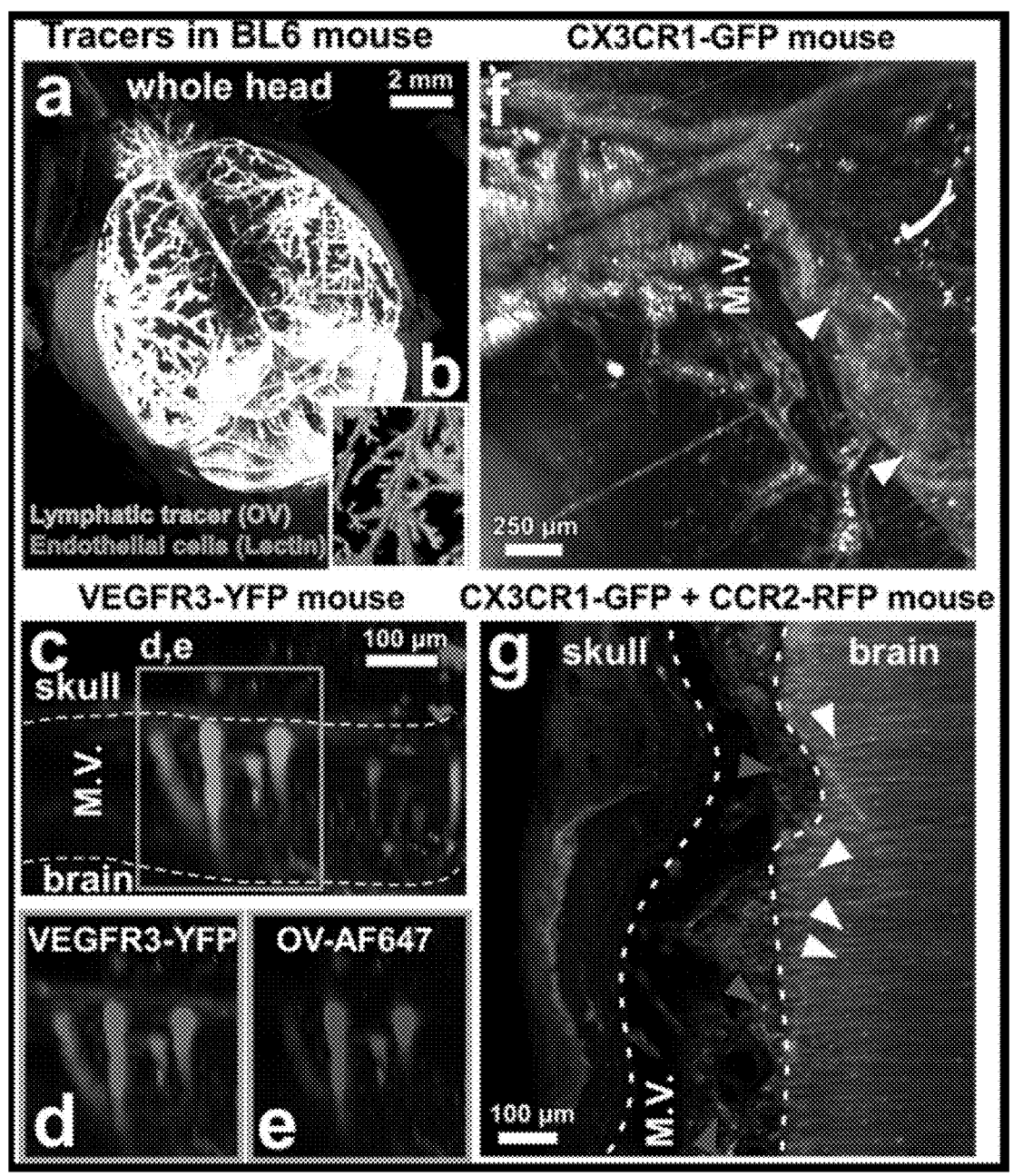

FIG. 15: LuCiD used to study brain lymphatic vessels in intact mouse bodies (a-e) Perivascular distribution of lymphatic vessels labeled by Ovalbumin (OV)-Alexa 647 in intact mouse heads (with the skull) after whole-body clearing and imaging along with endothelial cell labeling (Lectin-FITC) in BL6 mouse (a, b) or in VEGFR3-YFP transgenic mouse (c-e). Note the co-localization of VEGFR3 signal (d) and ovalbumin tracer (e), both marking the brain lymphatic vessels (c-e). Imaging immune cells in meningeal vessels in intact heads of CX3CR1-GFP mouse (f, arrowheads) and in CX3CR1-GFP+CCR2-RFP double transgenic mouse (g, arrowheads in between dashed-lines). Note the exclusion of RFP+(arrowheads in between dashed-lines) macrophages/monocytes from the brain (microglia marked by arrowheads in the brain region, right side of dashed-lines), whose infiltration will be traced upon injury. M.V.: meningeal vessels.

Figure 16:
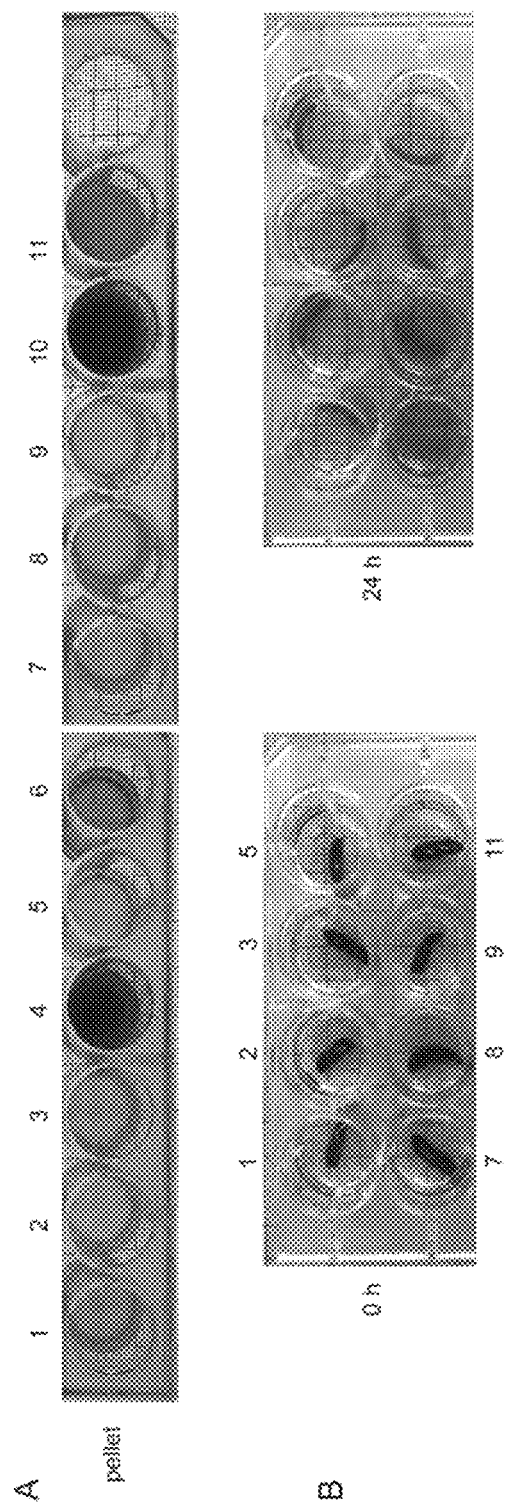

FIG. 16: Screening of aminoalcohols with mice blood and spleen for decolorization 11 different aminoalcohols were mixed with PFA fixed mice blood and centrifuged. (a) The colorless pellets indicate the red heme was decolorized. (b) The decolorization effect of 8 good candidates with mice spleen was further tested. Mice spleens were all decolorized. Images are shown at 0 hr and after 24 h incubation with the indicated aminoalcohols, respectively. The aminoalcohols shown in the Figure were as follows: 1. Quadrol, 2. N-Butyldiethanolamine, 3. N-Methyldiethanolamine, 4. N,N-Dimethylmethyleneiminium chloride, 5. 1,3-Bis(dimethylamino)-2-propanol, 6. 4-(2-Hydroxyethyl)morpholine, 7. N-tert-Butyldiethanolamine, 8. N-Ethyldiethanolamine, 9. 2-(Diisopropylamino)ethanol, 10. 4-Methylmorpholine N-oxide, and 11. 2-(Dibutylamino)ethanol.

Figure 17:

FIG. 17: Clearing of pig brain (a) Dissected fresh pig brain. (b) Decolorized pig brain after 24 h incubation with the 2-(Diisopropylamino)ethanol. (c) The transparency of pig brain after clearing.

Figure 18:
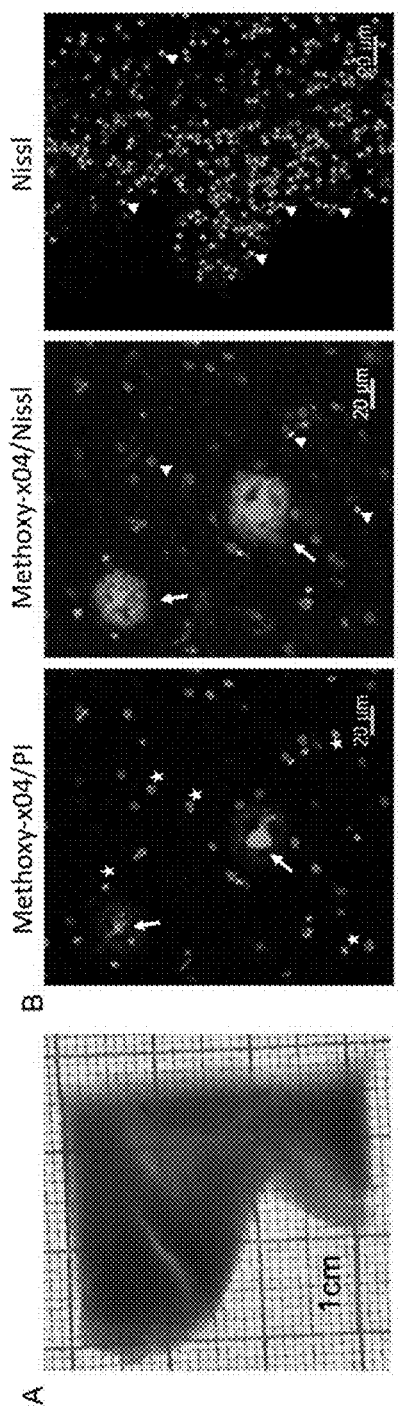

FIG. 18: Clearing and labeling of big human brain samples (a) The transparency of human brain with the size of 3 cm×3 cm×1 cm after clearing. (b) Fluorescent confocal images show the plaques and cells in cleared human brain. (arrows: Methoxy-x04; stars: propidium iodide; arrowheads: Nissl)

DETAILED DESCRIPTION OF THE INVENTION

Definitions and General Techniques

Unless otherwise defined below, the terms used in the present invention shall be understood in accordance with their common meaning known to the person skilled in the art.

All publications, patents and patent applications cited herein are hereby incorporated by reference in their entirety for all purposes. These publications, patents and patent applications referred to herein are identified by the name of their first author and the year of publication. For each of the references which are identified in this way, the respective corresponding reference including the specific source of the publication (e.g. the name and the volume of the scientific journal, etc.) can be found in the section entitled "references".

The materials, methods, and examples are illustrative only and are not intended to be limiting, unless otherwise specified.

The term "fluorochrome" as used herein is not particularly limited. For example, the fluorochrome may be a fluorescent protein or a synthetic compound such as a synthetic organic compound. Preferably, fluorochromes used according to the invention are capable of emitting fluorescence in the red or infrared range, more preferably in the far-red or near-infrared range. Preferred wavelengths for the emission maximum of fluorochromes used according to the invention are as indicated in the preferred embodiments of the present invention. Non-limiting examples of fluorochromes which are capable of emitting fluorescence in the far-red or near-infrared range, and which can be used in accordance with the present invention, are known in the art and have been reviewed, for example, in Hong et al (2017), Near-infrared fluorophores for biomedical imaging. Nature Biomedical Engineering 1, 0010, which is incorporated by reference in its entirety for all purposes. Fluorochromes which are capable of emitting fluorescence in the far-red or near-infrared range, and which can be used in accordance with the present invention, are commercially available and preferably include, for instance, ATTO dyes such as ATTO Rho13, ATTO 594, ATTO 610, ATTO 620, ATTO Rho14, ATTO 633, ATTO 647, ATTO 647N, ATTO 655, ATTO Oxa12, ATTO 665, ATTO 680, ATTO 700, ATTO 725, and ATTO 740 and Alexa Fluor® dyes such as Alexa Fluor® 568, Alexa Fluor® 594, Alexa Fluor® 610, Alexa Fluor® 633, Alexa Fluor® 635, Alexa Fluor® 647, Alexa Fluor® 660, Alexa Fluor® 680, Alexa Fluor® 700, Alexa Fluor® 750 and Alexa Fluor® 790. Dyes with emission maxima at 488 nm, 555 nm and 568 nm are also known in the art and can also be used in the methods of the invention.

The animal tissues that can be used in the methods of the present invention are not particularly limited. They can be from any animal species. In preferred embodiments of the present invention, the animal tissue can be a tissue from a non-human mammal or from a human. Preferably, the animal tissue from the non-human mammal is from a rodent, more preferably from a mouse. Still more preferably, the animal tissue is a whole mouse. In preferred embodiments in accordance with the invention, the animal tissue can be a whole organ or a part thereof, preferably a human organ or part thereof. In preferred embodiments in accordance with all other embodiments of the invention, the animal tissue may contain recombinantly expressed fluorescent proteins (e.g. GFP, YFP and mCherry), which can be used as target molecules. For example, in preferred embodiments in accordance with the invention, the animal from which the animal tissue has been obtained can be an animal (e.g. a mouse) that has been transplanted with cancer cells expressing such recombinant fluorescent proteins.

The decolorizing step of the methods for preparing of the invention uses a fixed animal tissue. In preferred embodiments in accordance with the invention, the method for preparing of the invention starts with the decolorizing step and does not comprise the fixation of the animal tissue. Accordingly, in preferred embodiments, all methods of the invention can preferably be a method which is not a method for the treatment of the human or animal body by surgery or therapy and not a diagnostic method practised on the human or animal body. In related preferred embodiments in accordance with all other embodiments of the invention, the methods of the invention is are ex vivo methods. Thus, the methods of the invention can preferably be carried out outside a living animal.

Fixed animal tissues which are suitable for the methods of the invention can readily be identified by a person skilled in the art. For example, for PFA fixation, mice can be deeply anesthetized using a combination of midazolam, medetomidine and fentanyl (MMF) (e.g. 1 mL/100 g of body mass for mice; i.p.) before intracardial perfusion with heparinized 0.1 M PBS (10 U/mL of Heparin, Ratiopharm; 100-125 mmHg pressure using a Leica Perfusion One system) for 5-10 minutes at room temperature until the blood is washed out. This procedure can be followed by fixation, e.g. with 4% paraformaldehyde (PFA), for instance in 0.1 M PBS (pH 7.4) (Morphisto, 11762.01000) for 10-20 minutes. If vasculature staining is desired, the animal tissues such as mice (e.g. whole mice) can be intracardially perfused with 20 ml of PBS (without Heparin) containing 0.5 mg of FITC-conjugated Lectin (EY Laboratories, F-2101-5), before proceeding with PFA fixation. Alternatively, for PaXgene fixation, the mice can be deeply anesthetized using a combination of midazolam, medetomidine and fentanyl (MMF) (e.g. 1 mL/100 g of body mass for mice; i.p.) before intracardial perfusion with heparinized 0.1 M PBS (10 U/mL of Heparin, Ratiopharm; 100-125 mmHg pressure using a Leica Perfusion One system) for 5-10 minutes at room temperature until the blood is washed out. This procedure can be followed by fixation via injection of 40-50 ml of PaXgene fixation solution. If storage of PaXgene fixed animal is needed before further processing, the tissues are kept in PaXgene stable solution. If vasculature staining is desired, the animal tissues such as mice (e.g. whole mice) can be intracardially perfused with 20 ml of PBS (without Heparin) containing 0.5 mg of FITC-conjugated Lectin (EY Laboratories, F-2101-5), before proceeding with PFA fixation. Subsequently, the skin can be carefully removed or left intact if the animal is nude (no furs) and the bodies can be post-fixed in 4% PFA for 1 day at 4° C. and transferred to 0.1 M PBS. The method of the invention can be started immediately or whole mouse bodies can be stored, preferably in PBS at 4° C. for up to 4 weeks or in PBS containing 0.05% sodium azide (Sigma, 71290) for up to 6 months.

As used herein, terms such as "an animal tissue for fluorescence microscopy" are meant to indicate that the respective animal tissue is suitable for fluorescence microscopy.

Similarly, the term "for the removal of heme" in connection with a solution refers to any solution that is suitable for the removal of heme. In accordance with the invention, the removal of heme is not limited to a particular mechanism as long as it removes heme from the tissue and/or decolorizes the heme. For example, aminoalcohols suitable for the removal of heme such as N,N,N',N'-tetrakis (2-hydroxypropyl)ethylenediamine can be used, e.g. as indicated in the preferred embodiments. Such aminoalcohols compete with hemoglobin for heme binding and can thus be used to remove heme from the hemoglobin in the tissue and from the tissue. Alternatively, benzyl peroxide can be used.

The term "fluorochrome-containing labeling agent" as used in accordance with the invention is not particularly limited as long as it is suitable to label target molecules in the decolorized fixed animal tissue, is capable of binding to said target molecule and has a molecular weight of equal to or less than 100 kDa. In preferred embodiments, the fluorochrome-containing labeling agent is an antibody fragment conjugated to said fluorochrome, more preferably a nanobody (also known as single-domain antibody) conjugated to said fluorochrome. Antibody fragments other than single-domain antibodies that can be used in accordance with the invention are also known in the art and include, for example Fab, F(ab'), monospecific $Fab_2$, bispecific $Fab_2$, scFv, bispecific diabody and trispecific triabody, scFv-Fc, minibody and hcIgG molecules.

As used herein, the term "target molecule" refers to any target molecule in the tissue. It is understood that for a given application of the methods of the invention such as biomedical applications, appropriate target molecules can be selected. These target molecules can, for instance, be endogenous molecules of the animal (e.g. marker proteins for diseases such as cancer) or recombinant molecules such as recombinant proteins. For example, in preferred embodiments in accordance with the invention, if the animal from which the animal tissue has been obtained is an animal (e.g. a mouse) that has been transplanted with cancer cells expressing such recombinant fluorescent proteins, such a fluorescent protein can be a target molecule.

It is also to be understood that the term "labeling a target molecule" as used herein includes the possibility that more than one target molecule can be labelled by the methods of the invention. Thus, in preferred embodiments in accordance with the invention, more than one target molecule is labelled, e.g. two or three target molecules. For example, in preferred embodiments in accordance with the invention, if the animal from which the animal tissue has been obtained is an animal (e.g. a mouse) that has been transplanted with cancer cells expressing such recombinant fluorescent proteins, such a fluorescent protein can be first target molecule, and a biopharmaceutical drug against cancer (e.g. a therapeutic antibody against cancer) that has been administered to said animal can be a second target molecule. Thus, in preferred embodiments such as the present embodiment, the method for the detection of metastases according to the invention and the method for analyzing the biodistribution of a biopharmaceutical drug can be carried out together.

As used herein, the term "perfusion at a pressure of" refers to the pressure which is measurable at the entry point of the tissue. The pressure can be measured by any methods known in the art. Preferably, the pressure is measured with an manometer, more preferably with a Kkmoon Digital Manometer Pressure Gauge Manometer (HT-1891). When using the Kkmoon Digital Manometer Pressure Gauge Manometer (HT-1891), a 2 heads connector (B. Braun Discofix® C Dreiwegehahn, 16494C) can be inserted to the pumping channel and connected to the manometer. The pumping channel can be set with transcardiac perfusion needle (Leica, 39471024) and the pressure can be measured (when the readouts are stable) at the pumping speed used for the method.

A "permeabilization solution" as referred to herein means a solution that is suitable for permeabilization of the animal tissue. Such solutions are known in the art and can readily be selected by a person skilled in the art and include, for instance, suitable detergents for permeabilization such as Triton X-100. Preferably, the permeabilization solution used in accordance with the invention further comprises an agent suitable to extract the cholesterol from biological membranes. Such agents suitable to extract the cholesterol from biological membranes include, for instance, methyl-β-cyclodextrin. Preferably, the permeabilization solution used in accordance with the invention further comprises an agent to loosen the collagen network, e.g. trans-1-acetyl-4-hydroxy-L-proline. It is to be understood that if a permeabilization solution is used in a particular step of the methods of the invention, this does not exclude that other solutions, e.g. solutions used in prior steps of the method may also contribute to the permeabilization and improve permeabilization. For instance, the solution for the removal of heme can be a solution that contributes to the permeabilization.

Measurements of tissue volumes according to the invention can be made by any suitable methods known in the art. Preferably, such volumes are measured by measuring the volume displacement of liquids by the tissue, e.g. in a suitable cylinder.

A "clearing solution" as referred to herein means a solution that is suitable for the clearing of the animal tissue. Such solutions are not particularly limited as long as they contain an organic solvent. It is understood that such organic solvents can readily be selected by a skilled person such that they are compatible with the methods of the invention, e.g. based on their electromagnetic absorption/emission spectra (in particular their lack of fluorescent emission in the visible, red and near-infrared range). Preferably, the clearing solution comprising the organic solvent has a refractive index that is similar to the tissue (e.g. the bones) of said animal, as reflected in the preferred embodiments. Such clearing solutions are particularly advantageous for the clearing of the tissue. Examples of preferred organic solvents that can be used in such clearing solutions of the invention are, for instance, a solvent comprising benzyl alcohol, benzyl benzoate and diphenyl ether, a solvent comprising ethyl cinnamate and a solvent comprising allyl cinnamate.

Methods for measuring the refractive index are well-known in the art. The refractive index values referred to herein are values which have been measured at room temperature (i.e. 25° C.) and normal atmospheric pressure (i.e. 760 mmHg).

A "further organic solvent" as referred to in connection with the present invention is not particularly limited. It is understood that such solvent will be selected by the skilled person such that they are suitable for dehydration. Examples of such solvents are THF, dichloromethane and 1,4-Dioxane. For example, according to the invention, a preferred perfusion with an increasing gradient of a further organic solvent of 0 vol % to 100 vol % can be a perfusion with a gradient of 0 vol % to 100 vol % THF, followed by an incubation with dichloromethane. Alternatively, in all embodiments in accordance with the invention, dichloromethane can be replaced by 1,4-Dioxane.

An additional improvement in accordance with all other embodiments of the invention can be achieved by the addition of a decalcification step. Such a step will further improve the clearing of bones. Decalcification chemicals are known and include, for example, solutions comprising EDTA, preferably further comprising $NaHCO_3$. Such a decalcification step is performed prior to the decolorization step, or if no decolorization step is performed, prior to the labeling step.

The term "present in cells" as used herein in connection with structures refers to structures which are present in said cells. This term does not mean that the structure must be present inside the cell but also includes the possibility that the structure is present on the surface of said cell.

The term "therapeutic antibody" as used herein refers to any therapeutic antibodies and therapeutic antibody fragments as known in the art. Further, the term is not limited to the therapeutic antibodies and therapeutic antibody fragments as such but also includes conjugates such as antibody drug conjugates.

As referred to herein, the term "small molecule" has the meaning known in the art. Typically, a small molecule to be used in accordance with the invention has a molecular weight of <900 daltons.

In accordance with the present invention, each occurrence of the term "comprising" may optionally be substituted with the term "consisting of".

The present invention is illustrated by the following non-limiting Examples:

EXAMPLES

Unless stated otherwise, the following methods were used in the Examples:

Mice, Xenograft Experiments and Injection of Therapeutic Antibody

Female NSG (NOD/SCID/IL2 receptor gamma chain knockout) mice were obtained from Jackson Laboratory and housed at the animal facility of the Helmholtz Center Munich. All animal experiments were conducted according to institutional guidelines of the Ludwig Maximilian University of Munich and Helmholtz Center Munich after approval of the Ethical Review Board of the Government of Upper Bavaria (Regierung von Oberbayern, Munich, Germany). All data are reported according to the ARRIVE criteria. MDA-MB-231 breast cancer cells transduced with a lentivirus expressing mCherry and enhanced Firefly luciferase (Vick et al., 2015) were counted, filtered through a 100 µm filter and resuspended in RPMI 1640 medium. $2 \times 10^6$ cells per mouse were injected transdermally in a volume of 50 µl into the $4^{th}$ left mammary fat pad. Tumor growth was monitored by bioluminescence measurement (photons/second) of the whole body using an IVIS Lumina II Imaging System (Caliper Life Sciences) as described (Gondi et al., 2013). Briefly, mice were anesthetized with isoflurane, fixed in the imaging chamber and imaged 15 minutes after Luciferin injection (150 mg/kg; i.p.). Bioluminescence signal was quantified using the Living Image software 4.2 (Caliper). 9 weeks after tumor cell injections, mice showing either low, mid or high metastasis signals from luminescence measurements (FIG. 9) were assigned to different experimental procedures including injection of a human carbonic anhydrase (CA) XII-specific antibody (6A10) (Battke et al., 2011), vasculature staining, boosting of endogenous mCherry fluorescence, immunolabeling and clearing, as described below. 48 hours before perfusion mice were injected into the tail vein with 20 µg of 6A10 antibody conjugated with Alexa-568 or Alexa-647.

Resection Model

NMRI nu/nu mice were obtained from Janvier and animal experiments were conducted according to the institutional guidelines and were approved by the veterinary department of the regional council in Darmstadt, Germany. Prior to the injection of tumor cells animals were anesthetized with 100 mg/kg ketamine and 10 mg/kg xylazine in 0.2 ml 0.9% NaCl solution. For mammary fat pad transplantation, anesthetized mice were placed on the back and under aseptic conditions a small (~1 cm long) incision in the skin was made in the right lower quadrant of the abdomen to expose the mammary fat pad. Next, an injection of 50 µl of a tumor cell suspension containing $4 \times 10^6$ MDA-231-Br cells (Yoneda et al., 2001) per animal was administered in the mammary fat pad and the wound was closed with application of Michel clips. For estimating the tumor volume measurements were taken with a caliper, and the volume calculated according to the following formula: $V_t(a \times b^2)/2$, where a represents the length of the tumor (the longest measurement), and b—the tumor width, measured perpendicularly to a. At the end of the experiment (either when the tumor volume reached 2 $cm^3$ or when other symptoms requiring termination were observed, e.g. cachexia, ulcer formation, etc.) animals were sacrificed by deep anesthesia and perfused with 4% PFA. For experiments with tumor resection animals were anesthetized as described above and an incision in the skin starting approximately 2-3 mm away from the tumor was made under aseptic conditions. In order to expose better the tumor, skin covering it was gently retracted. Next, major tumor-supplying arteries were identified and closed by thermocoagulation using a cautery unit. In order to achieve a complete removal of the tumor the surrounding mammary fat pad was cut at least 2 mm away from the tumor. Any minor bleeding observed during the tumor resection was stopped by thermocoagulation. Subsequently, the skin wound was closed with application of Michel clips. In the postoperative period animals were administered analgesia (Rimadyl) for one week after the operation and observed for the next several weeks. At the end of the experiment, animals were sacrificed by deep anesthesia and perfused with 4% PFA.

Perfusion and Tissue Processing

Mice were deeply anesthetized using a combination of midazolam, medetomidine and fentanyl (MMF) (1 mL/100 g of body mass for mice; i.p.) before intracardial perfusion with heparinized 0.1 M PBS (10 U/mL of Heparin, Ratiopharm; 100-125 mmHg pressure using a Leica Perfusion One system) for 5-10 minutes at room temperature until the blood was washed out, resulting in death of the mice, followed by 4% paraformaldehyde (PFA) in 0.1 M PBS (pH 7.4) (Morphisto, 11762.01000) for 10-20 minutes. For vasculature staining, mice were intracardially perfused with 20 ml of PBS (without Heparin) containing 0.5 mg of FITC-conjugated Lectin (EY Laboratories, F-2101-5), before proceeding with PFA fixation. For the NGS mice the skin was carefully removed and the bodies were post-fixed in 4% PFA for 1 day at 4° C. and transferred to 0.1 M PBS. NMRI nu/nu mice were post-fixed in the same way without the removal of the skin. The LuCiD pipeline was started immediately or whole mouse bodies were stored in PBS at 4° C. for up to 4 weeks or in PBS containing 0.05% sodium azide (Sigma, 71290) for up to 6 months.

uDISCO Whole-Body Clearing

The uDISCO protocol to clear whole body of mice was already described in details in ref (Pan et al., 2016). In brief, a transcardial-circulatory system was established involving a peristaltic pump (ISMATEC, REGLO Digital MS-4/8 ISM 834; reference tubing, SC0266). Two channels from the pump were set for the circulation through the heart into the vasculature: the first channel pumped the clearing solution into the mouse body and the second channel collected the solution exiting the mouse body and recirculated the solution back to the original bottle. For the outflow tubing of the first channel, which injected the solution into the heart, the tip of a syringe (cut from a 1 ml syringe-Braun, 9166017V) was used to connect the perfusion needle (Leica, 39471024) to the tubing. Meanwhile, the inflow tubing of the second channel, which recirculated the clearing solutions, was fixed to the glass chamber containing the mouse body. The amount of solutions for circulation depended on the capacity of the clearing glass chamber. For example, if the maximum volume of glass chamber is 400 ml, 300 ml of volume of solution was used for circulation.

All clearing steps were performed in a fume hood. Firstly, the mouse body was put in glass chamber and the perfusion needle was inserted into the heart through the same hole that was used for PFA perfusion. Then, after covering the chamber with aluminum foil the transcardial circulation was started with a pressure of 230 mmHg (60 rpm on the ISMATEC pump). The mouse bodies were perfused for 6 hours with the following gradient of tert-butanol: 30 Vol %, 50 Vol %, 70 Vol %, 90 Vol % (in distilled water), 100 Vol % twice, and finally with the refractive index matching solution BABB-D4 containing 4 parts BABB (benzyl alcohol+benzyl benzoate 1:2, Sigma, 24122 and W213802), 1 part diphenyl ether (DPE) (Alfa Aesar, A15791) and 0.4% Vol vitamin E (DL-alpha-tocopherol, Alfa Aesar, A17039), for at least 6 hours until achieving transparency of the bodies. As the melting point of tert-butanol is between 23 to 26° C., a heating mat set at 35-40° C. was used for the two rounds of 100% tert-butanol circulation to prevent the solution from solidifying.

Decolorization and Whole-Body Immunostaining

The following nanobodies and dyes were used for whole body immunostaining: Atto647N conjugated anti RFP/mCherry nanobooster (Chromotek, rba647n-100), Atto594 conjugated anti RFP/mCherry nanobooster (Chromotek, rba594-100), Hoechst 33342 (Thermo Fisher Scientific, 21492H), Propidium iodide (PI, Sigma, P4864) and FITC conjugated Lectin (EY Laboratories, F-2101-5).

In order to remove remaining blood and heme after PFA perfusion, the animals were subjected to a round of perfusion with decolorization solution before immunostaining. The decolorization solution was made as 1:3 dilution of CUBIC reagent 1 (Susaki et al., 2014) in 0.1 M PBS. CUBIC reagent 1 was prepared mixing 25 wt % urea (Roth, 3941.3), 25 wt % N,N,N',N'-tetrakis (2-hydroxypropyl)ethylenediamine (Sigma, 122262), 15% Triton X-100 (AppliChem, A4975,1000) in 0.1 M PBS. The same transcardial-circulatory system involving the peristaltic pump used by uDISCO was established to perfuse the mice during decolorization and immunostaining steps, except that 0.20 µm syringe filters (Sartorius 16532) were connected to the tubing, which efficiently prevented accumulation of dye aggregates into the sample and a high pressure of pumping was kept at ~230 mmHg. After post-fixation and PBS washing, the mice were perfused with 0.1 M PBS overnight at room temperature, then the animals were perfused with the decolorization solution for 2 days at room temperature, exchanging with fresh solution every 12 hours. Subsequently the animals were perfused for 2 days at room temperature with 300 mL of immunostaining solution containing 1.5% goat serum (Gibco, 16210072), 0.5% Triton X-100, 0.5 mM of Methyl-beta-cyclodextrin (Sigma, 332615), 0.2% trans-1-Acetyl-4-hydroxy-L-proline (Sigma, 441562), 0.05% Sodium Azide (Sigma, 71290), 25 µL of nano-booster (stock concentration 0.5-1 mg/ml), 1 mg of Lectin-FITC, 10 µg/mL Hoechst and/or 350 µL of propidium iodide (stock concentration 1 mg/mL) in 0.1 M PBS. Then the mice were perfused with washing solution (1.5% goat serum, 0.5% Triton X-100, 0.05% of sodium azide in 0.1 M PBS) for 12 hours twice at room temperature and at the end with 0.1 M PBS for 12 hours twice at room temperature.

3DISCO Whole-Body Clearing

For whole body passive clearing using 3DISCO, mice were incubated at room temperature in the dehydration and clearing solutions inside a glass chamber kept with gentle rotation on top of a shaking rocker (IKA, 2D digital) inside a fume hood, which is sufficient to render the tissue transparent. For dehydration, mice bodies were incubated in 300 ml of the following gradient of tetrahydrofuran THF (Sigma, 186562) in distilled water (6-12 hours for each step): 50 Vol % THF, 70 Vol % THF, 80 Vol % THF, 100 Vol % THF and again 100 Vol % THF; then mice were incubated for 1 hour in dichloromethane (Sigma, 270997), and finally in BABB. During all incubation steps, the glass chamber was sealed with parafilm and covered with aluminum foil.

Rehydration and Immunostaining of Cleared Metastatic Tissue after LuCiD

The following antibodies were used for rehydrated tissue: anti-Firefly Luciferase (dilution 1:2000, Abcam, ab21176), anti-Panendothelial Cell antigen MECA-32 (dilution 1:25, BD Biosciences, 550563), anti-a-Smooth Muscle Actin (aSMA) (dilution 1:500, SIGMA C6198), AlexaFluor 568 goat anti-rat IgG (H+L) (dilution 1:400, Life Technologies, A11077), AlexaFluor 647 goat anti-rabbit IgG (H+L) (dilution 1:400, Life Technologies, A21245), AlexaFluorPlus 555 Goat anti-Rabbit IgG (H+L) (dilution 1:400, A32732), AlexaFluor 488 goat anti-rabbit IgG (H+L) (dilution 1:400, Life Technologies, A11034).

After identification of metastases in the lungs of LuCiD-processed mice, lung tissue was dissected and rehydrated by applying the reverse gradient of tert-butanol used for uDISCO clearing, as follows (6 hours each at 37° C. with gentle shaking): 100 Vol % twice, 90 Vol %, 70 Vol %, 50 Vol %, 30 Vol % and 0.1 M PBS twice at room temperature. Rehydrated samples were incubated in 0.1 M PBS containing 0.2% gelatin, 0.5% Triton X-100, 0.05% sodium azide and 5% normal goat serum for 1 day at 37° C. (Belle et al., 2014). 1 mm sections were then incubated with the primary antibodies diluted in the same solution overnight at 37° C., washed twice in PBS and incubated with secondary antibodies for 4 hours at 37° C.

Epifluorescence Stereomicroscopy Imaging

Cleared whole mouse bodies were fixed in the original clearing chamber and were imaged with Zeiss AxioZoom EMS3/SyCoP3 fluorescence stereomicroscope using a 1× long working distance air objective lens (Plan Z 1×, 0.25 NA, Working distance (WD)=56 mm). The magnification was set as 7× and imaging areas were selected manually to cover the entire mouse bodies. The images were taken with GFP, RFP and Cy5 filters and files were exported as RGB images which were further stitched using Adobe Photoshop CS6. For zoom-in images with high magnification, scanning was taken by up to 112× from the same microscope.

Light-Sheet Microscopy Imaging

Single plane illuminated (light-sheet) image stacks were acquired using a Ultramicroscope II (LaVision BioTec), featuring an axial resolution of 4 µm. For low magnification whole-body screening of tumor and antibody signals a 1× Olympus air objective coupled to an Olympus MVX10 zoom body was used, which provides zoom-out and -in ranging from 0.63× up to 6.3×. Using 1× objective, a field of view of 2×2.5 cm was imaged, covering the entire width of the mouse body. Tile scans with 60% overlap along the longitudinal y-axis of the mouse body were obtained from ventral and dorsal surfaces up to 13 mm in depth, covering the entire volume of the body using a z-step of 10 µm. Exposure time was 150 ms, laser power was 3 to 4 mW (70% to 95% of the power level) and the light-sheet width was kept at maximum. After tile imaging of the sample within the entire field of view, scanned regions were cut using a thin motorized dental blade (0.2 mm) (Dremel, 8200) for further imaging. After low magnification imaging of the whole body, individual organs (including lungs, liver, kidneys, brain, spleen, intestines and bones) were dissected and imaged individually using high magnification objectives (Olympus 4×/0.28 NA [WD=10 mm] and Zeiss 20×/0.1 NA [WD 4=mm]) coupled to an Olympus revolving zoom body unit (U-TVCAC) kept at 1×. High magnification tile scans (4×4) were acquired using 20% overlap and the light-sheet width was reduced to obtain maximum illumination in the field of view keeping the same NA.

Confocal Microscopy Imaging

Cleared specimens such as dissected tissues, pieces of organs or whole organs were placed on 35 mm glass bottom petri dishes (MatTek, P35G-0-14-C), then the samples were covered with one or two drops of the refractive index matching solution such as BABB or BABB-D14. Sealing of this mounting chamber was not necessary. The samples were imaged with an inverted laser-scanning confocal microscopy system (Zeiss, LSM 880) using a 40× oil immersion lens (Zeiss, EC Plan-Neofluar 40×11.30 Oil DIC M27) and a 25× water immersion long-working distance objective lens (Leica, NA 0.95, WD=2.5 mm), the latter one was mounted on a custom mounting thread. The z-step size was 1-2.50 µm.

Reconstructions of Whole-Mouse Body Scans

Epifluorescence (2D montage of whole mouse):

The collected epifluorescence images were stitched semi-automatically using Adobe Photoshop photomerge function (File\automate\photomerge). The different channels were stitched separately and merged in Adobe Photoshop to generate the composite images.

Light-Sheet Microscopy (3D Montage of Whole Mouse):

Light-sheet microscope stacks using ImSpector (LaVision BioTec GmbH) were acquired as 16-bit grayscale TIFF images for each channel separately. The stacks were first aligned and fused together with Vision4D (Arivis AG). Further image processing was done mostly in Fiji (ImageJ2): first, the autofluorescence channel (imaged in 488 excitation) was equalized for a general outline of the mouse body. The organs were segmented manually by defining the regions of interests (ROIs). Data visualization was done with Amira (FEI Visualization Sciences Group), Imaris (Bitplane AG), Vision4D in both volumetric and maximum intensity projection color mapping.

Quantifications

Figure 1:
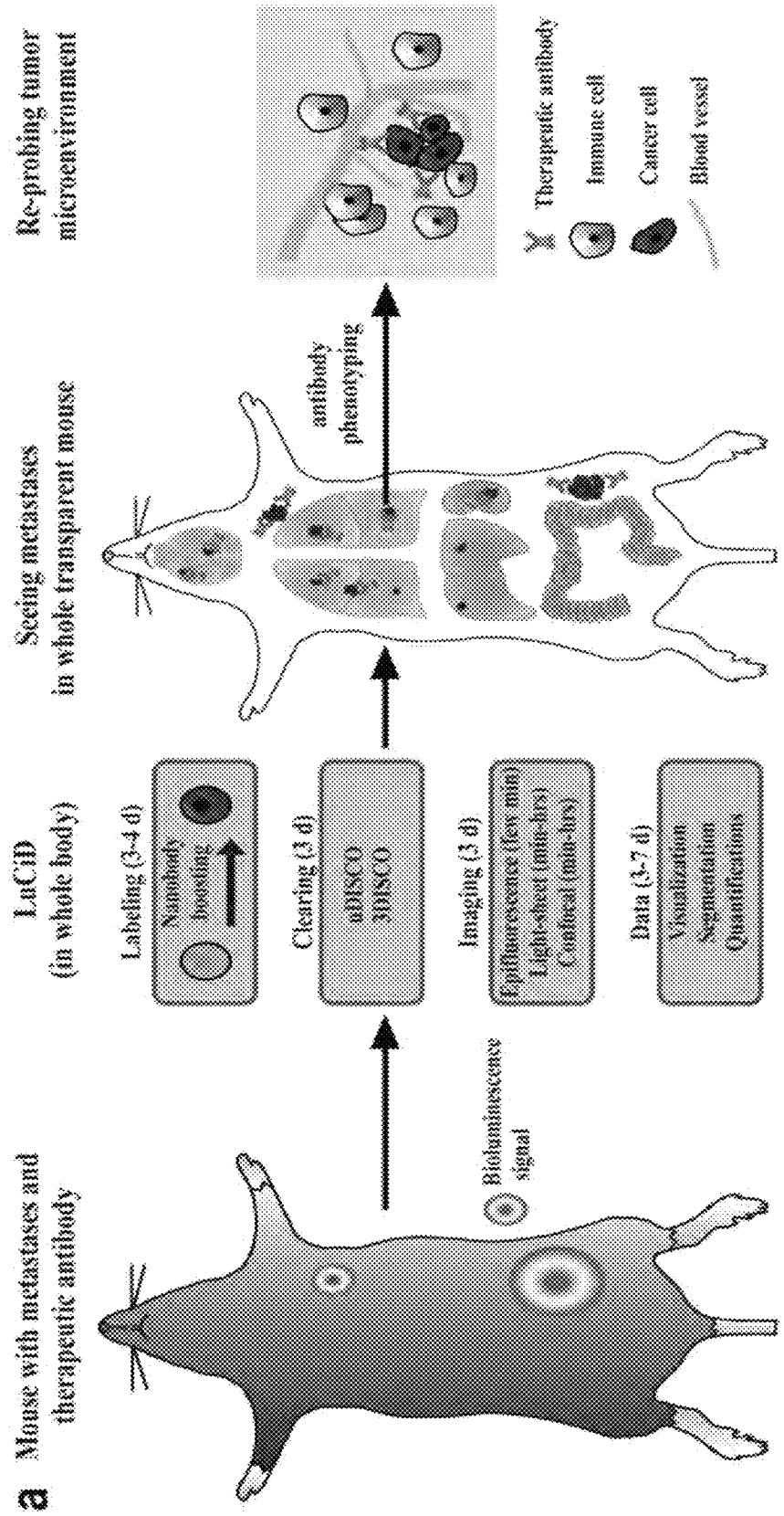
FIG. 1: LuCiD pipeline and the advantages of nanoboosting for deep-tissue fluorescence imaging (a) The steps of the LuCiD pipeline on adult mouse body. Specific regions containing the cancer cells of interest can be dissected, rehydrated, further characterized by the antibody labeling. (b) Demonstration of tissue penetration of the light at different imaging wavelengths: the same liver region (without any labeling) of a cleared mouse imaged in green (ex: 470 nm) (left), red (ex: 561 nm) (middle) and far-red channels (ex: 640) (right) using light-sheet microscopy. (c) Fluorescence signal intensity profiles normalized over the maximum intensity of the region indicated by the dashed line in (b). (d-f) Representative light-sheet images of mCherry expressing tumor metastasis in the lungs of unlabeled cleared mice (d), metastasis boosted with anti-mCherry nanobody conjugated to Atto594 (e) or anti-mCherry nanobody conjugated to Atto647N (f). (g) Plots of signal intensity profiles along the dashed lines in panels (n=3 metastases per mouse from each channel). (h) Fluorescence signal intensity profiles normalized over the background of the data in (g). (i) Example of deep-tissue imaging of tumor metastasis in the brain in the far-red spectrum in see-through mice after LuCiD. The tumor micrometastasis (arrowheads) is visible several millimeters deep in the brain tissue.

Fluorescence and Normalized Fluorescence Signal Profile Plots:

The calculation of the fluorescence signal profile plots over the maximum peak was used to better compare deep tissue optical imaging of the far-red channel over the red and especially the green channel due to less scattering, autofluorescence and absorption of light in the far-red channel. After taking the same z-stack in three different channels (excitation 470 nm, 561 nm and 647 nm) of a liver sample with light-sheet microscope, the same z-plane from different channels was opened in Fiji software. The same straight line was drawn across the organ from one side to the other in the different channels and the signal intensity profile defined by the line was measured. All the values of the plot were then normalized as percentage over the maximum peak of the profile and they were shown in the representative line chart (FIG. 1D).

To compare the reduction of the background and the improvement of the signal over background ratio (SBR) when the imaging channel was moved to far-red or near far-red, lung metastases were imaged expressing mCherry with excitation 545/561 nm, lung metastases labeled with anti-mCherry nanobody conjugated with Atto594 and imaged with excitation 590 nm, and lung metastases labeled with anti-mCherry nanobody conjugated with Atto647N and imaged with excitation 640 nm (n=9 tumors per each experimental group which consisted of 3 animals per each imaging modality). First, the fluorescence signal profile plots of all these metastases were calculated: the tumor z-plane images were taken with light-sheet microscope, opened in Fiji and a straight line of about 300-350 pixels was drawn across the tumor including also the region of tissue surrounding the tumor, which was considered as background. The signal profile was measured from the defined straight lines and all the values of the plot from a representative animal per each experimental group were shown in a representative line chart (FIG. 1G). In the end, the normalized plots represented by chart FIG. 1H were calculated by normalizing the plots of lung metastases obtained as described above over the average signal intensity of the respective surrounding background.

Figure 10:
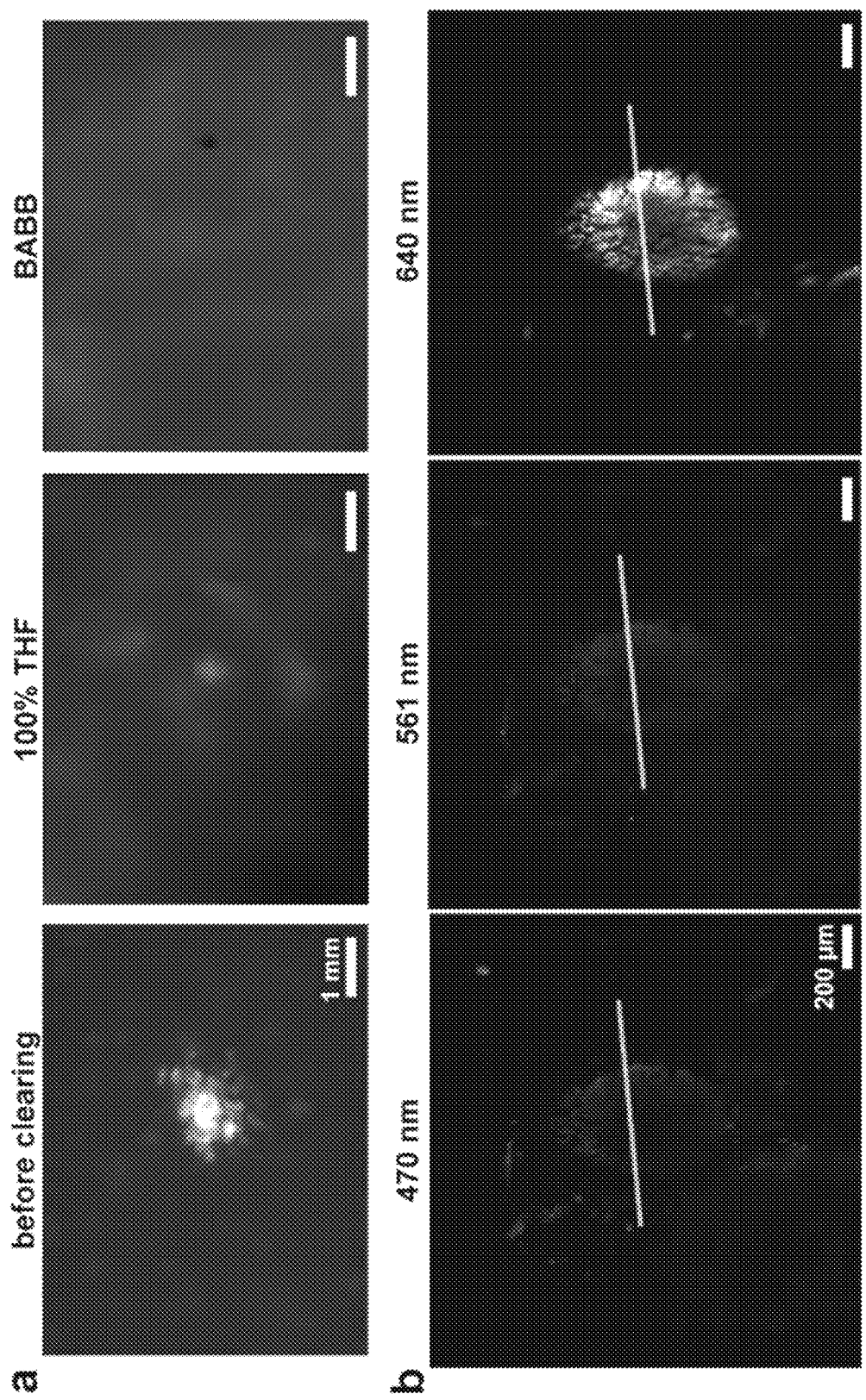
FIG. 10: Elimination of endogenously expressed mCherry signal from tumors by using a modified 3DISCO protocol: combination of decolorization step+immunostaining+3DISCO clearing (a) Tumor metastases in lungs were imaged by fluorescence stereomicroscope before and after a modified 3DISCO clearing, showing that the endogenously expressed mCherry signal was eliminated. (b) Light-sheet microscopy images of primary tumor with background imaged in green (ex: 470 nm) (left), mCherry signal imaged in red (ex: 561 nm) (middle), and boosted signal (Atto647N) imaged in far-red channels (ex: 640) (right). (c) Plots of signal intensity profiles along the white lines of panel b (n=3 mice). (d) Background normalized fluorescence signal profiles of the data in c, showing that after modified 3DISCO clearing, the endogenous mCherry signal was depleted to a similar level as the background.
Figure 11:
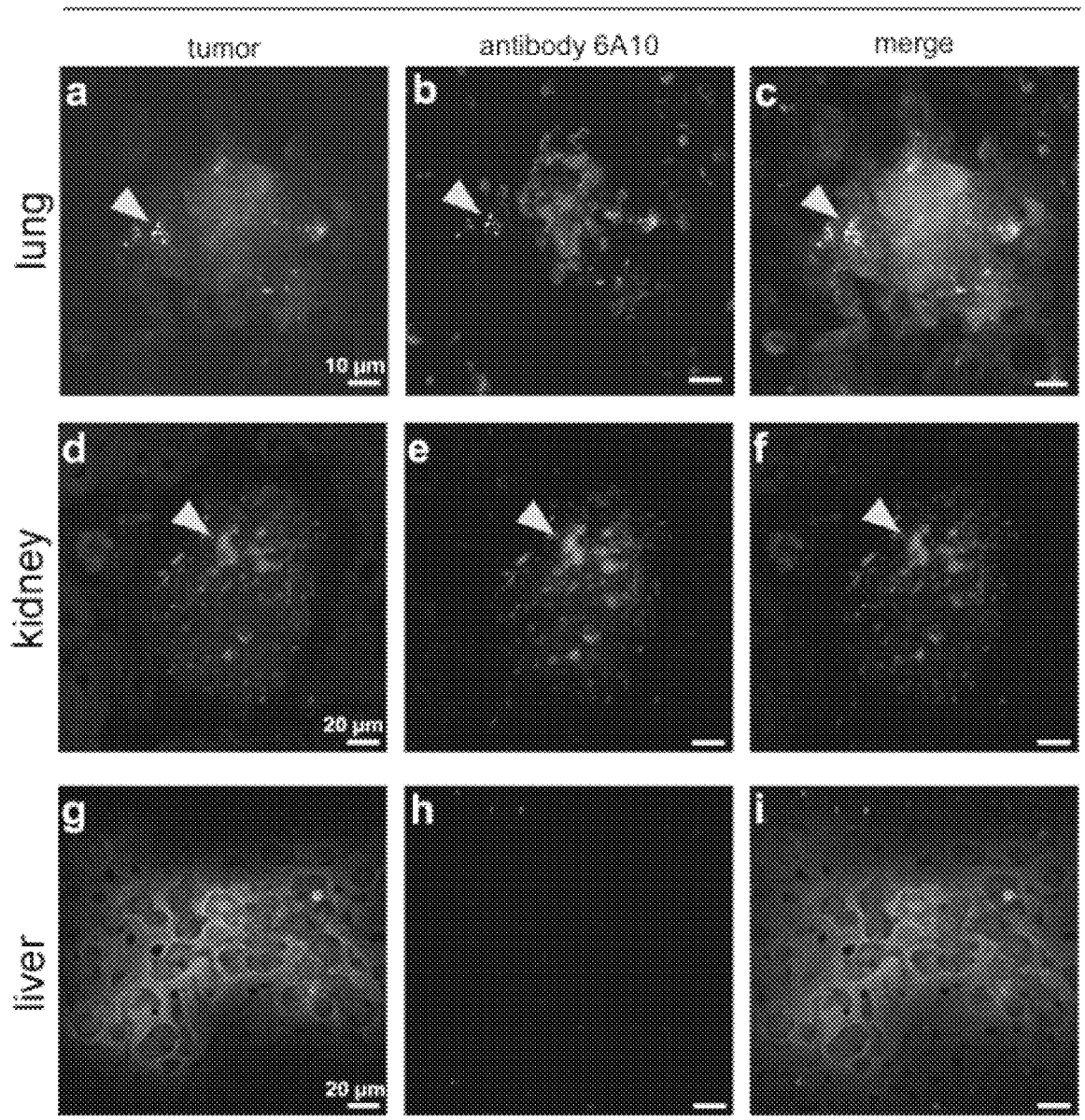
FIG. 11: Colocalization of antibody 6A10 signal with nanobody signal shown by confocal microscopy (a-i) Confocal images of metastases in the lung (a-c), kidney (d-f), and liver (g-i) of an animal labeled with an anti-mCherry nanobody conjugated to Atto647 (a,d,g) and treated with therapeutic antibody 6A10 conjugated to Alexa568 (b,e,h). The colocalization of the metastases with the antibody 6A10 are shown (c,f,i, arrowhead). (j-n) Confocal images of a single cancer cell in the lung of an animal labeled with an anti-mCherry nanobody conjugated to Atto594 (k) and treated with therapeutic antibody 6A10 conjugated to Alexa647 (l). Hoechst nuclear staining is shown in (j). The colocalization of the tumors with the nuclear staining (m) and with the antibody 6A10 (n) is shown. The boxes are high magnification images or the respective regions indicated by the dashed boxes.

To compare the signal-to-background ratio (SBR) in FIG. 10C-D, the samples were labeled with anti-mCherry nanobody conjugated with Atto647N and primary tumors were imaged with excitation 470 nm, 561 nm and 640 nm respectively. Fluorescence signal intensity profiles and background normalized profiles for each channel were plotted with the same strategy as described above.

Tumor Size and Therapeutic Antibody Binding:

To quantify size and numbers of tumors in large data sets, the inventor developed a custom-made script in python, which partitions the data into small 3D cubes (chunks) and processes them separately. Each separate chunk was then quantified using Fiji. Due to the non-linear relation between the size of data and the processing speed (increasing data size will drastically decrease processing speed), smaller data sets will yield much faster processing speed and additionally, different data packages can be distributed over multiple processors to be managed in parallel to further accelerate the overall process. The output of the parallel processors was merged using python scripts. Among many, the final results included the measurements of the volume, surface, radius, and coordinates of the tumors. To quantify the number of cells in each tumor, the size of several isolated single cells (~1700 $\mu m^3$) was measured and the total numbers in metastases were estimated based on volumetric interpolation. The accuracy of the estimations was confirmed by the number of nuclei (PI or Hoechst labeled) inside the example micrometastases. The histogram of the tumors was generated by Python (Matplotlib) representing the frequency of the metastases with the same number of cancer cells. To analyze biodistribution of the therapeutic antibody, first, the segmented tumor channel was applied as a mask in to the antibody channel and the specific signals were segmented. This allowed us to quickly determine the fraction of the micrometastases that were targeted and not targeted by the therapeutic antibody. To determine the antibodies that were not targeting the tumors, the signal appearing only in the antibody channel but not in the tumor channel was segmented.

Example 1: Whole-Body Immunolabeling of Adult Mice

The inventor set out to develop an immunostaining approach for labeling cancer cells expressing commonly used fluorescent proteins in entire adult mouse bodies. The inventor reasoned that nanobodies would be best suited to achieve a complete immunolabeling of whole adult mice because of their small size (12-15 kDa compared to ~150 kDa for conventional antibodies) (Muyldermans, 2013; Yang et al., 2014). To deliver nanobodies conjugated to bright Atto dyes (called nano-boosters) throughout the entire body, the inventor developed a permeabilization solution containing Triton X-100, methyl-β-cyclodextrin (to extract the cholesterol from biological membranes), and trans-1-acetyl-4-hydroxy-L-proline (to loosen the collagen network) (Hama et al., 2015). The inventor circulated this permeabilization solution throughout the mouse body via a high-pressure peristaltic pump (230 mmHg compared to 80-150 mmHg of standard mouse cardiac perfusion) (Gage et al., 2012; Ghanavati et al., 2014), which facilitated the delivery of nano-boosters deep into the tissues via the cardiovascular system. To further reduce the background in blood-dense organs such as liver, whole mouse bodies were treated with aminoalcohols (Tainaka et al., 2014) before the whole-body immunolabeling step. After rendering the mice transparent, intact bodies were imaged by standard epifluorescence and light-sheet microscopy. The collected images were stitched for unbiased visualization of cells of interest in intact see-through mice (FIG. 1A).

The inventor opted to use nanobodies conjugated with far-red dyes to boost the signal coming from the cancer cells because light traveling through biological tissues scatters less in these spectra (Hong et al., 2017) and it can reach the inner core of large organs, such as the liver without being blocked at the surface (FIG. 1B,C). To exploit LuCiD in tumor metastasis, human mammary carcinoma cells (MDA-MB-231 cells, expressing mCherry and firefly luciferase) were transplanted into the mammary fat pad of NOD scid gamma (NSG) female mice and the tumors were allowed to grow and metastasize over 6-10 weeks (FIG. 7A) (Gondi et al., 2013; lorns et al., 2012). Then the animals were transcardially perfused using standard PFA fixation before applying the LuCiD protocol. First, the fluorescence signal in transparent mice was assessed after boosting the endogenous mCherry signal in tumor cells with anti-mCherry nanobodies conjugated to Atto-594 or Atto-647N dyes. The inventor found that nano-boosters specifically labeled the tumor cells and enhanced the signal-to-background ratio up to 20 times compared to the endogenous mCherry signal (FIG. 1D-H and FIG. 7B-G). Owing to the significant enhancement in signal strength and to the advantages of imaging in the far-red range, where the light penetrates in deep tissues with little scattering, tumor micrometastases were readily detected even in deep tissue regions, such as the middle of the brain (FIG. 1I, arrowhead). To further confirm the specificity of LuCiD whole-body immunolabeling, the following controls were performed: 1) control mice were stained without a tumor transplant, thereby lacking mCherry expression, and no labeling in any of the analyzed organs was found (FIG. 8A); 2) the transparent tissues from primary tumors and lung metastases were rehydrated and stained again using a specific anti-luciferase antibody, which confirmed that endogenous mCherry fluorescence co-localized with both the nano-booster and the luciferase signals (FIGS. 7B-D and 8B).

Figure 2:
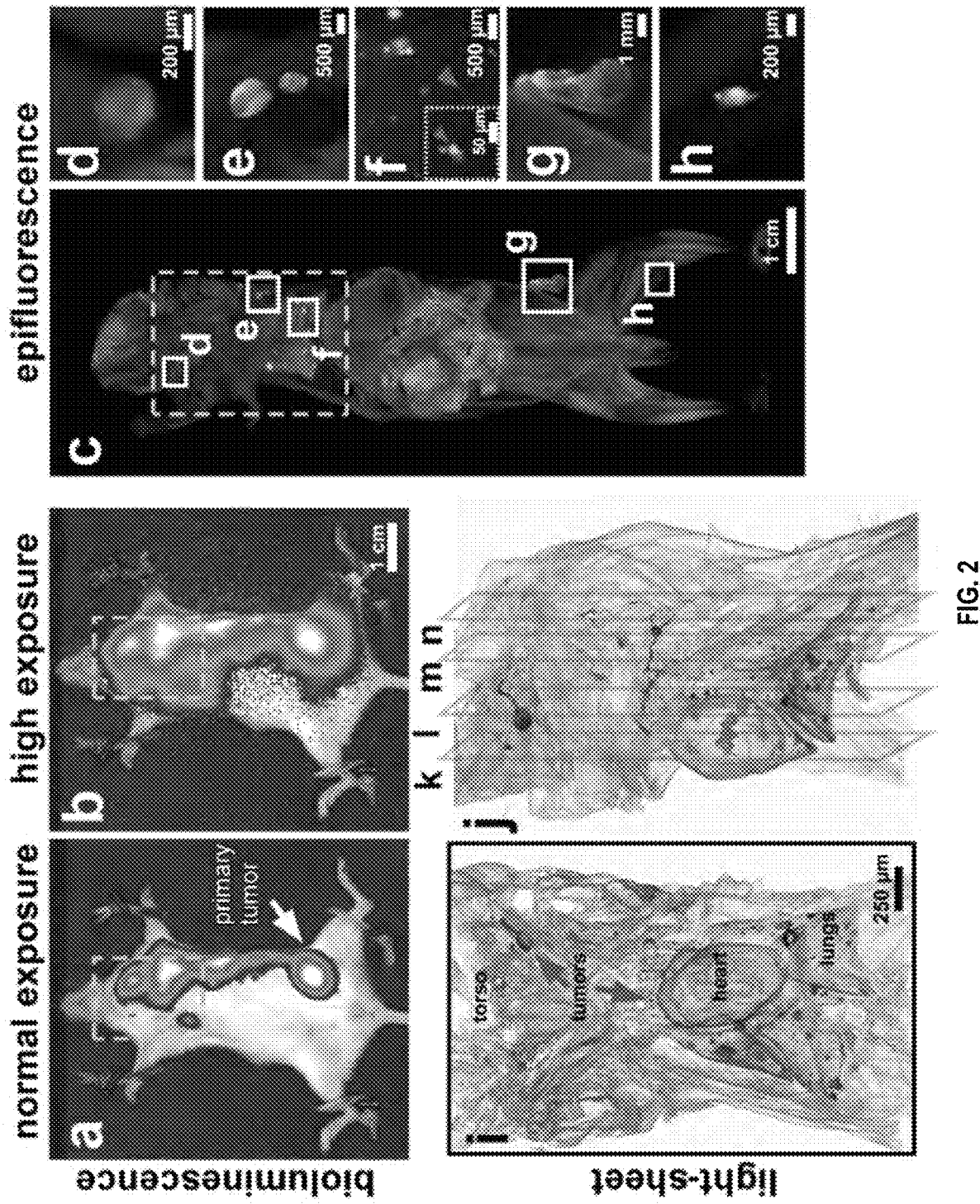
FIG. 2: Visualization of metastases in an intact whole mouse body with high tumor load (a,b) Normal and high exposure bioluminescence images of a mouse with high tumor load before LuCiD processing. (c-h) Epifluorescence images of the same mouse after LuCiD processing show greater details of metastases (dashed rectangle) compared to bioluminescence, including small micrometastases that can be readily detected in the lungs (f) (arrowheads) and in the leg (h), in addition to the primary tumor (g) and major metastases that are visible in bioluminescence (d and e) as a bulk signal. (i,j) Frontal and lateral views of the 3D segmentation obtained from the light-sheet imaging data corresponding to the dashed-ractangle region indicated in (a-c). For simplicity, only a few organs are segmented: the heart and the lungs; the tumors are in shown in black. (k-n) Original light-sheet microscopy data (500 µm projections) showing tumors from the sagittal planes indicated in (j). (o-q) High resolution light-sheet microscopy images (single planes) showing single tumor cells (boxed region in o) and nuclei (labeled with propidium iodide (PI) in p) detected by LuCiD. See also FIG. 7-9.
Figure 9:
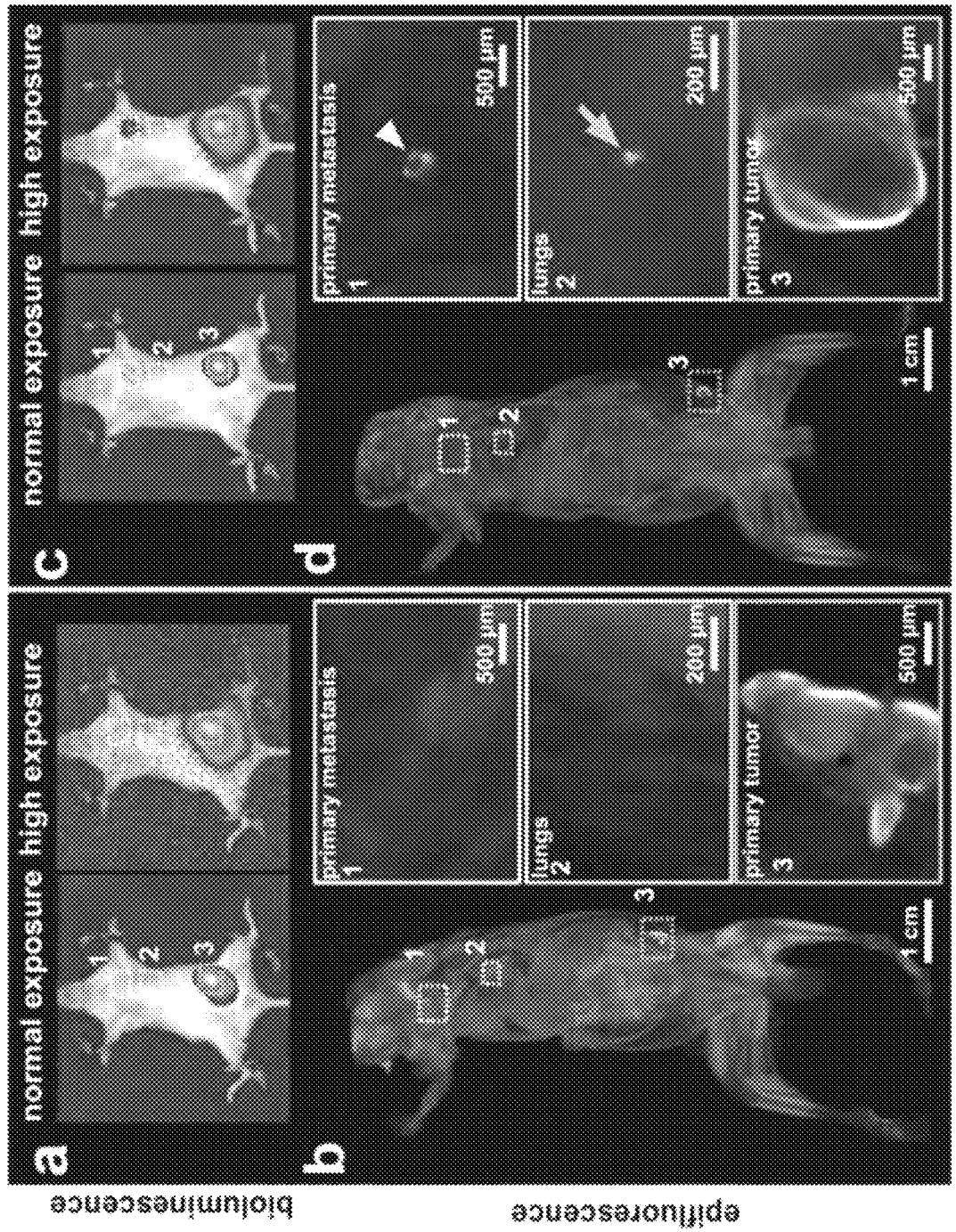
FIG. 9: Comparison between bioluminescence and epifluorescence imaging in low and high tumor load mice (a-d) It was found that bioluminescence imaging with normal exposure is not sensitive to detect all the metastases in low tumor load mice. For example, mice in a,b and c,d had very similar bioluminescence images with normal exposure. Applying LuCiD on these mice, the inventor found no tumor metastasis in one case (a,b) and a large metastasis (arrowheads) in axillary lymph nodes (c,d, boxed region 1) using a stereo-fluorescent microscope. Although the signal from the primary tumor is strong in both normal and high exposure bioluminescence images (c,d, boxed region 3), metastasis in lungs (arrow) (c,d, boxed region 2)) are not visible. In epifluorescence images, the tumors (A647 labeled) are shown in white. (e-h) In mice with high tumor load, the bioluminescence imaging provides a bulk heat map of metastatic distribution. In contrast, LuCiD resolved single micrometastasis in the whole mouse bodies even with a stereo-fluorescent microscope. Especially in the lungs, even the micrometastasis with a diameter smaller than 20 μm could be resolved in intact mice.

Example 2: Detection of Cancer Metastasis at Single Cell Level in See-Though Mice Many preclinical studies on cancer metastasis employ mouse models, in which the growth of cancer cells is observed at the primary site and distal body regions using methods such as magnetic resonance imaging (MRI), computed tomography (CT), positron emission tomography (PET), single photon emission computed tomography (SPECT), or ultrasound and bioluminescence imaging (Condeelis and Weissleder, 2010; Massoud and Gambhir, 2003, 2007; Ntziachristos, 2010; Pichler et al., 2008; Timpson et al., 2011). While these methods provide crucial longitudinal information on the size of the primary tumor and large metastases, they typically can resolve structures larger than 50 µm (~75 cells), hence they do not have the resolution to detect smaller micrometastases consisting of fewer cells. Since the detection of smaller sized tumor cell clusters, which may represent dormant cancer cells or incipient metastatic nodules, is critical, the inventor used LuCiD to study cancer metastasis in whole-mouse bodies. In order to compare LuCiD to conventional imaging methods, bioluminescence images in mice transplanted with human mammary carcinoma cells were acquired to determine the level of detectable tumor metastasis before LuCiD. The mice with low and high tumor loads were analyzed based on the bioluminescence imaging as follows: mice with no metastasis (FIG. 9A) or metastasis restricted to only a single body region represented the low tumor load category (FIG. 9C), while mice with metastases to more than a single body region represented the high tumor load category (FIG. 2A,B and FIG. 9E,G). In line with previous findings using a similar model of MDA-MB-231 cell injection into the mammary fat pad, the inventor always detected the earliest large metastasis at the axillary lymph node by bioluminescence (FIG. 9) (lorns et al., 2012). After bioluminescence assessment, LuCiD was applied as follows: the whole mouse bodies were PFA-fixed, decolorized, immunolabeled using anti-mCherry nano-boosters conjugated to Atto-647N and cleared using the DISCO whole-body approach (Pan et al., 2016). First the entire transparent mouse bodies from high tumor load mice were visualized using a standard epifluorescence stereomicroscope (FIG. 2C-H). As expected, it is possible to readily see both the primary tumor (FIG. 2G) and the major metastases at the axillary lymph node (FIG. 2E), which were also detected by bioluminescence imaging (FIG. 2A,B), albeit as a bulk signal, lacking information on real size and shape. By contrast, LuCiD also allowed the visualization of several micrometastases in the lungs with conventional epifluorescence imaging, which were not visible in bioluminescence (compare FIG. 2F, red arrowheads, and the region marked by a purple rectangle in FIG. 2A,B). Thus, epifluorescence imaging, which can be completed within minutes, already provides greater detail and sensitivity compared to bioluminescence imaging (FIG. 9).

Figure 12:
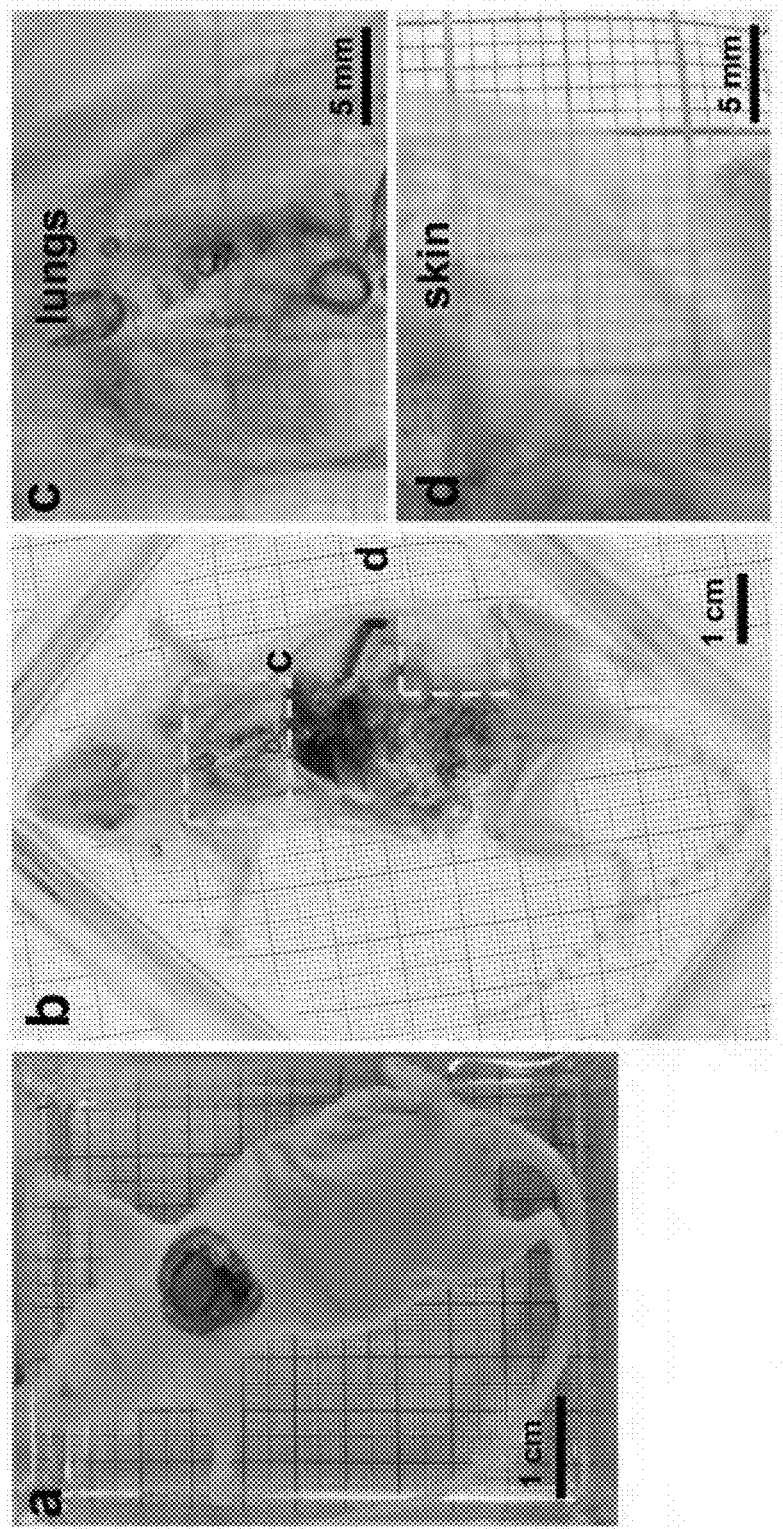
FIG. 12: Analysis of lung metastasis in a tumor resection model 8 weeks after transplantation of MDA-231 cells into the mammary fat pad, the primary tumor was resected at a volume <1.5 cm$^3$ and 5 weeks later the mice were perfused for LuCiD workflow. (a-d) Appearance of nude mice before (a) and after (b-d) whole body clearing. Notice that lungs (c) and skin (d) become completely transparent after clearing. (e) 3D segmentation of the tumor metastases in the lungs of a mouse with tumor resection. (f) Quantification of all metastases in the lungs shown in (e) indicating their size distribution.

Next, high-resolution 3D images were e collected from the intact mouse using a single plane laser-scanning lightsheet microscope (Pan et al., 2016) to detect micrometastases throughout the body in the high tumor load mice. The scanned tiles were stitched and the tumors were segmented. In the chest area, one could see various metastases not only in the lungs (segmented region in FIG. 2I,J) and lymph nodes, but also at the base of the neck and surrounding tissues (FIG. 2I-N). Importantly, light-sheet microscopy scanning allowed us to visualize micrometastases down to the single cell level in the intact mouse body (FIG. 2O-Q). Next, low tumor load mice were imaged using LuCiD. Again, epifluorescence imaging already showed greater details of tumor metastasis (FIG. 3C-F) compared to bioluminescence imaging (FIG. 3A,B). Using light-sheet microscopy in the low tumor load mice, large macrometastasis in the axillary lymph node were detected and hundreds of micrometastases of varying sizes throughout the body were detected, especially in the lungs (FIG. 3G-J). Zooming into the lungs of the intact mouse, the inventor could image metastases at the cellular level and extract information on their size and spatial locations (FIG. 3K,L). For instance, in the lungs shown in FIG. 3I-L ~1490 micrometastases were detected, of which 62.2% were smaller than 75 cells, which could not be imaged by standard methods including bioluminescence. Interestingly, the micrometastases were randomly distributed throughout the lungs regardless their size, suggesting independent colonization at multiple sites. To demonstrate the applicability of LuCiD pipeline in a different tumor model, primary mammary fat pad tumors were resected after they reached a volume <1.5 cm$^3$, and the mice were observed for another ~8 weeks. This resection model resembles more closely the clinical setting and is not limited by the growth of the primary tumor, providing additional time for the spread and growth of metastases. Indeed, there was a 4-fold increased number of metastases in this model compared to unresected animals (FIG. 12, FIG. 3I). Interestingly, the inventor found that 88.5% of micrometastases in the lungs were smaller than 75 cells (FIG. 12), suggesting that there was a continuous reseeding of new micrometastases, possibly by circulating tumor cells. Thus, LuCiD reveals cellular details of tumor metastasis in entire intact mouse bodies.

Example 3: Assessment of Therapeutic Antibody Using LuCiD

Figure 4:
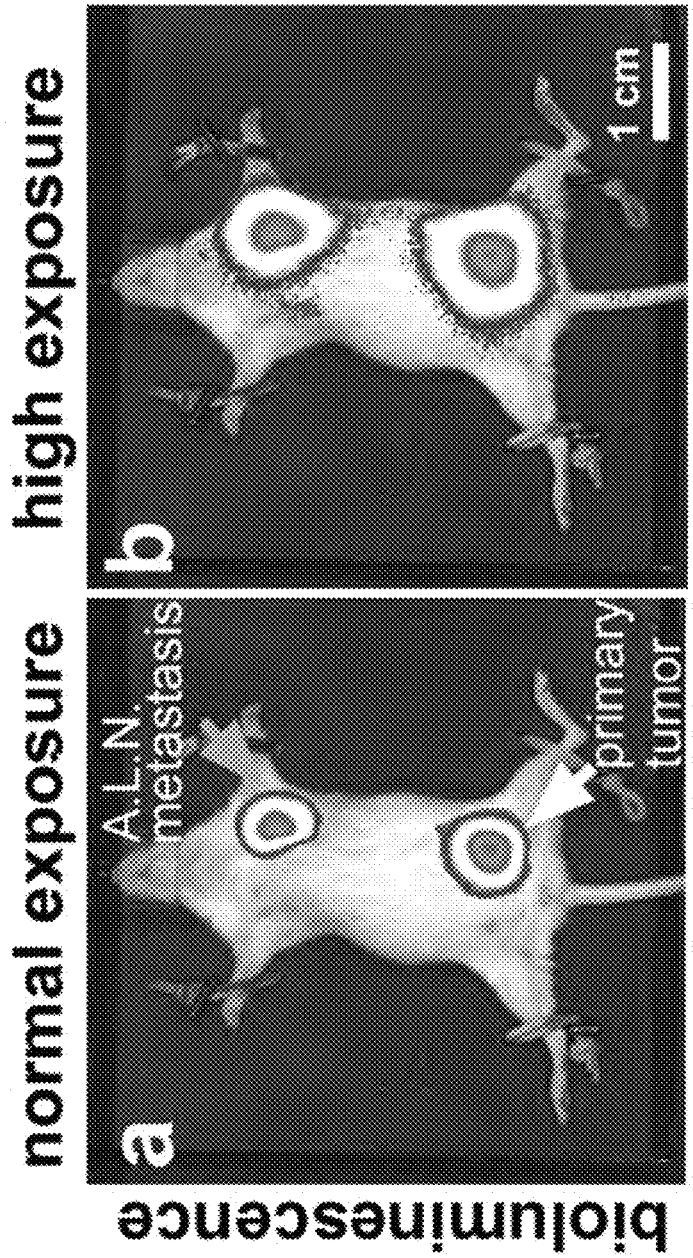
FIG. 4: Visualization of metastases and therapeutic antibody through an intact whole mouse body (a,b) Normal and high exposure bioluminescence images of a low tumor load mouse injected with therapeutic antibody 6A10 conjugated to Alexa 568 before LuCiD. Note that only tumors with the luciferase signal can be seen (not the therapeutic antibody). (c-g) Epifluorescence images of a LuCiD-processed mouse show details of both tumor metastases and antibody 6A10 distributions. While most of the micrometastases appear to be targeted by the antibody (e, arrow), there are some that are not (f, arrow). (h,i) 3D reconstruction of an entire mouse after light-sheet microscopy imaging in ventral and lateral views, respectively. All the tumors in the mouse body are segmented and overlaid with the antibody (merge shown as white signal). (j) High magnification view of the boxed area in (h), showing greater details of tumor micrometastases. (k-m) Details of antibody targeting of the boxed region in (j): (k) tumor channel, (l) antibody channel, and (m) is the merge. See also FIGS. 10 and 11.
Figure 5:
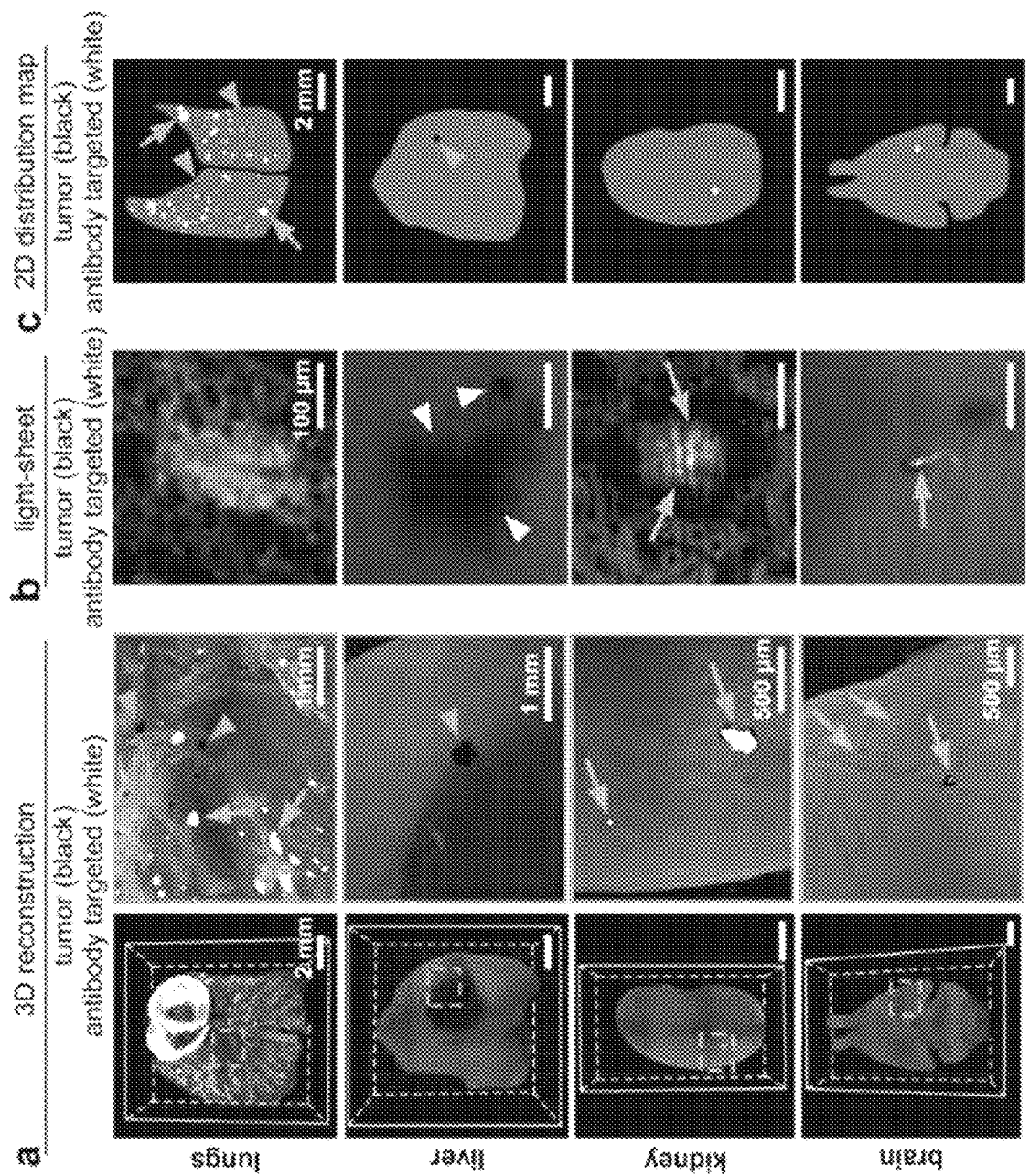
FIG. 5: High resolution light-sheet imaging of individual organs bearing metastases (a) 3D visualization of lungs, liver, kidney and brain. The segmented tumors are shown in (black) by arrowheads, the tumors that were targeted by the therapeutic antibody (conjugated to Alexa568) are shown by arrows (white). (b) Original high resolution light-sheet microscopy images of single metastases in relevant organs showing the overlap of tumor cells and therapeutic antibody (white) in lungs, kidney and brain. (c) 2D distribution map and (d) Quantification of therapeutic antibody targeted vs. untargeted micrometastases in different organs. (e) Quantification of antibody biodistribution in organs: therapeutic antibody bound to tumors vs. non-tumor host mouse tissue. Values are mean±s.e.m.; n=3 mice.

Monoclonal antibodies targeting key tumor cell antigens are among the most promising tumor therapies that have emerged over the last two decades. A number of tumor-targeting monoclonal antibodies have become part of the standard treatment for various solid and hematological malignancies and many more are in early or late stage of clinical development (Pandey and Mahadevan, 2014). Typically, therapeutic antibodies are raised against tumor-associated antigens that are overexpressed by cancer cells. Once these antibodies are injected, they are distributed throughout the body to target the cancer cells. However, so far there has been no methodology to determine the distribution of therapeutic antibodies in the entire body at cellular resolution. Here, the inventor employed LuCiD to assess biodistribution of the therapeutic monoclonal antibody 6A10 directed against human CA12 (Battke et al., 2011). CA12 is overexpressed in various types of cancers and blocking its activity with the antibody 6A10 reduces tumor growth (Gondi et al., 2013). 20 μg of 6A10 conjugated to Alexa-568 (with tumor signal boosted with Atto-647N) or conjugated to Atto-647N (with tumor signal boosted with Atto-594) were injected intravenously 9 weeks after transplantation of MDA-MB-231 cells, and the mice were perfused 2 days after the antibody injection for LuCiD analysis. Because Alexa-568 excitation/emission spectra overlaps with the endogenous mCherry signal of cancer cells, the inventor used a modified 3DISCO protocol-combination of decolorization step+immunostaining+3DISCO clearing- to completely quench the endogenous mCherry signal in mice injected with Alexa-568 conjugated 6A10 antibody (FIG. 10) (Pan et al., 2016). Again, the endpoint bioluminescence imaging of mice showed detectable signal only at the primary tumor and axillary lymph node in low tumor load mice (FIG. 4A,B). To assess whether LuCiD enabled simultaneous imaging of both tumor cells and biodistribution of the therapeutic antibody 6A10, the inventor first used epifluorescence microscopy and observed accumulation of the antibody 6A10 at the primary tumor (FIG. 4C,G) and the metastasis at the axillary lymph node (FIG. 4C,D). Focusing on the lungs it was possible to see micrometastases that were targeted by the antibody 6A10 (FIG. 4E, white arrow) and others that were not (FIG. 4F, arrow). Next, high-resolution light-sheet microscopy images of tumor metastases and the conjugated antibody 6A10 in the whole body of intact see-through mice were obtained to assess the complete distribution of the tumors that were targeted (FIG. 4H-M). The inventor found that in the kidney and the brain all tumor micrometastases were targeted by 6A10, while in the liver and lungs only 75% and 81% were respectively targeted (FIG. 5A-D, FIG. 12). In addition, 5% of antibody-binding sites in the kidney, 27% in the liver, and ~40% in the lungs and brain were unspecific (non-tumor bearing host tissues) (FIG. 5E). Overall, this analysis demonstrates that the methods of the invention provide a powerful platform to track the biodistribution of therapeutic antibodies along with micrometastases in intact mouse bodies.

Figure 6:
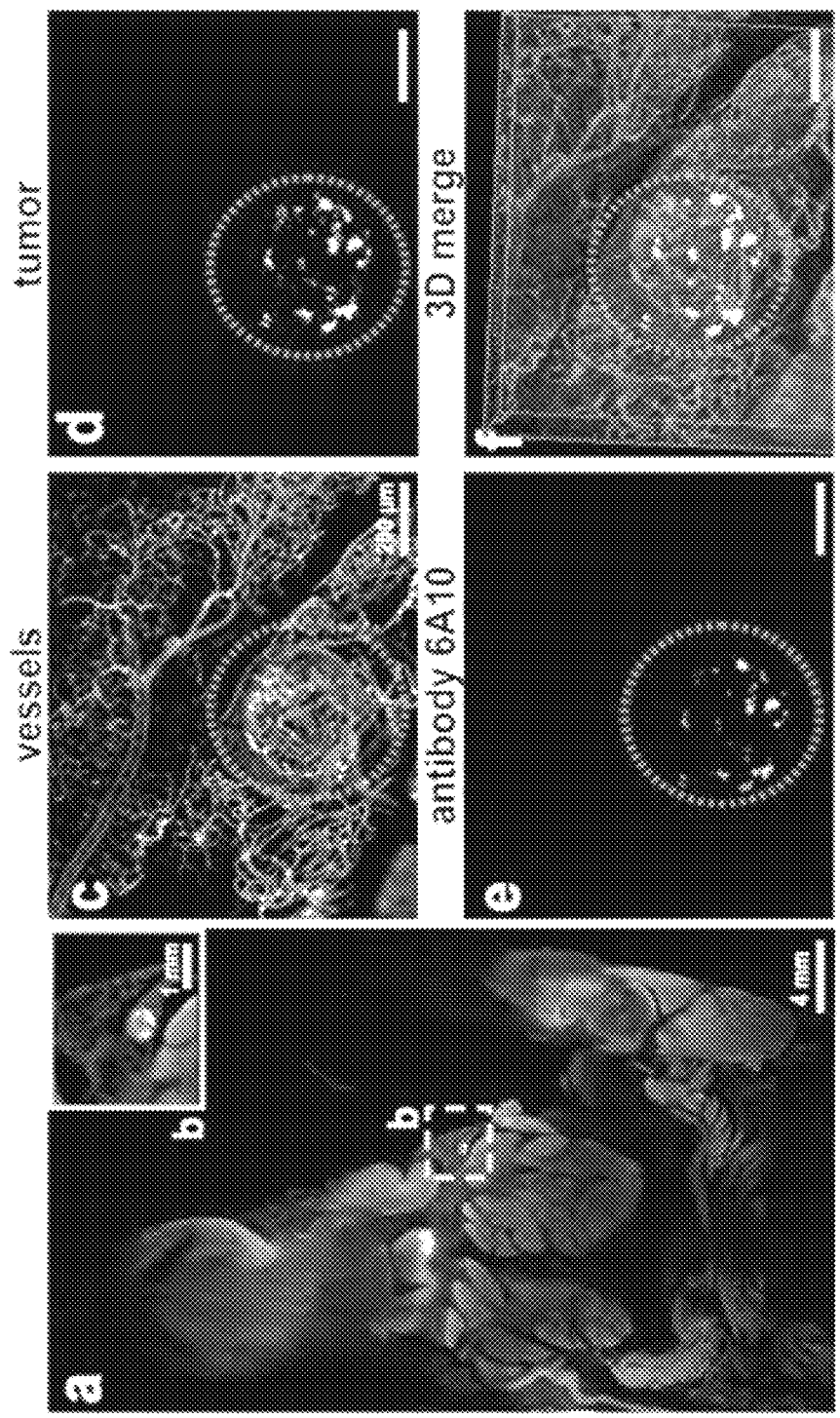
FIG. 6: Visualization of the tumor vasculature and reprobing of the tumor microenvironment To study the details of the vascular tumor microenvironment and therapeutic antibody distribution, the vasculature of a low tumor load mouse was labeled via lectin perfusion. (a,b) Light-sheet microscopy scanning through the mouse torso showed a small cluster of tumors that was not visible in bioluminescence (dashed rectangle). (c-f) High-magnification light-sheet microscopy image of the region shown in (b). Lectin labeled vessels are shown in (c), the tumors are in (d) and the therapeutic antibody 6A10 (injected 2 days before clearing) in (e). (f) is the 3D merge of the 3 channels shown in (c-e). Note that most of the tumors are targeted by the therapeutic antibody within this highly vascularized tumor microenvironment. (g-n) Confocal microscopy images of lung metastatic tissue after whole body labeling, clearing and imaging of tumor cells with LuCiD. The identified metastatic lung tissue was rehydrated and immunolabeling analysis of the tumor microenvironment was performed using markers of tumor associated fibroblasts (a-smooth muscle actin; aSMA) (g-j) and vascular endothelial cells (MECA-32) (k-n).
Figure 7:
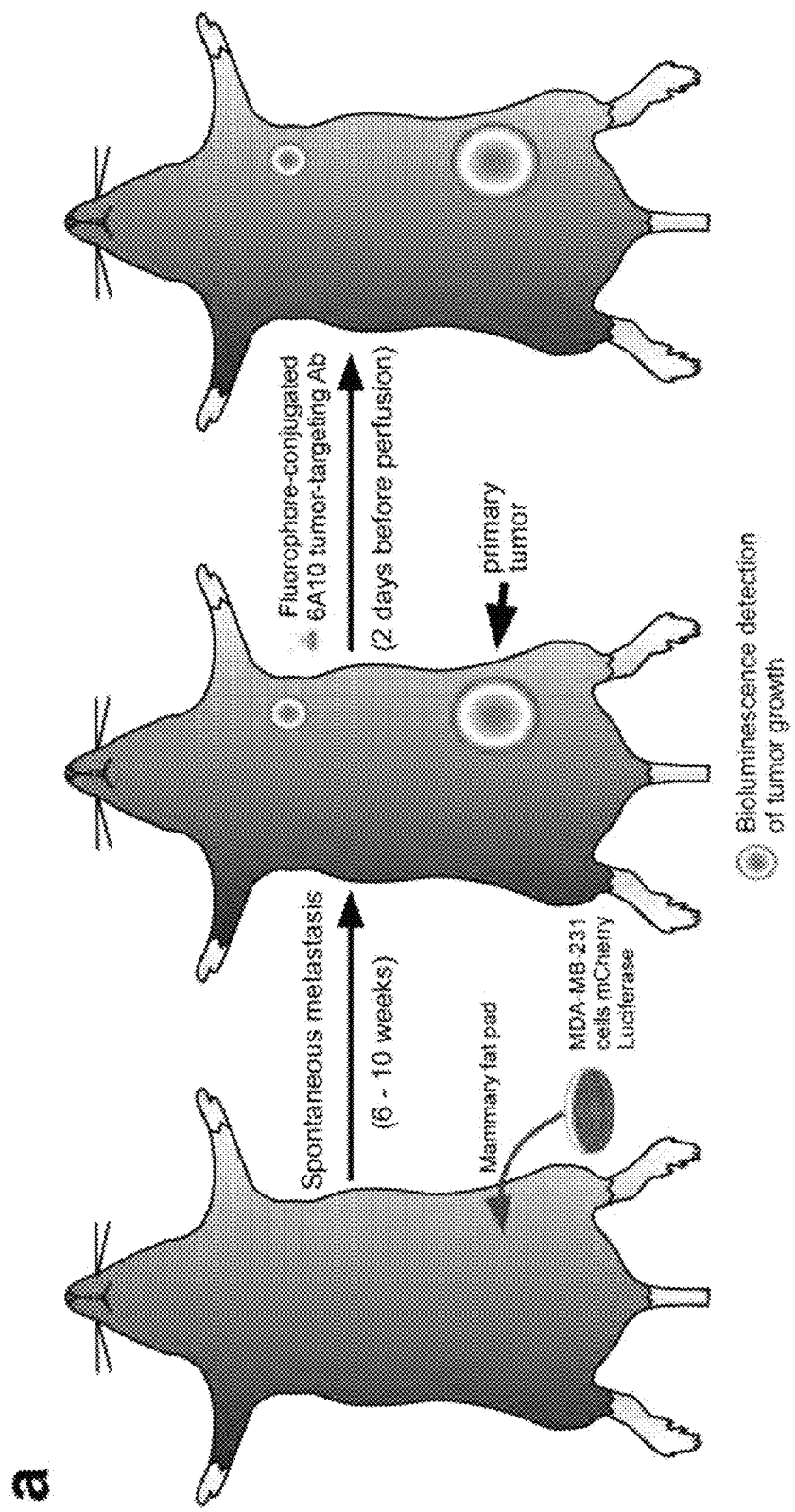
FIG. 7: Experimental design of tumor transplantation, specificity of antibody labeling and tumor morphology characterization (a) Illustration of the experimental workflow for tumor transplantation. (b) A mouse whole-body after LuCiD pipeline. (c-e) Confocal images of endogenous mCherry signal of tumor (c) in the lung, which is labeled with an anti-mCherry nano-booster conjugated to Atto647N (d). The merge is shown in e. (f-h) Confocal images of a metastasis in the lung of an animal labeled with an anti-mCherry nano-booster conjugated to Atto647N (f, arrowhead) and propidium iodide (PI) (g, arrowhead). The merge of the two channels is shown in (h, arrowhead).
Figure 8:
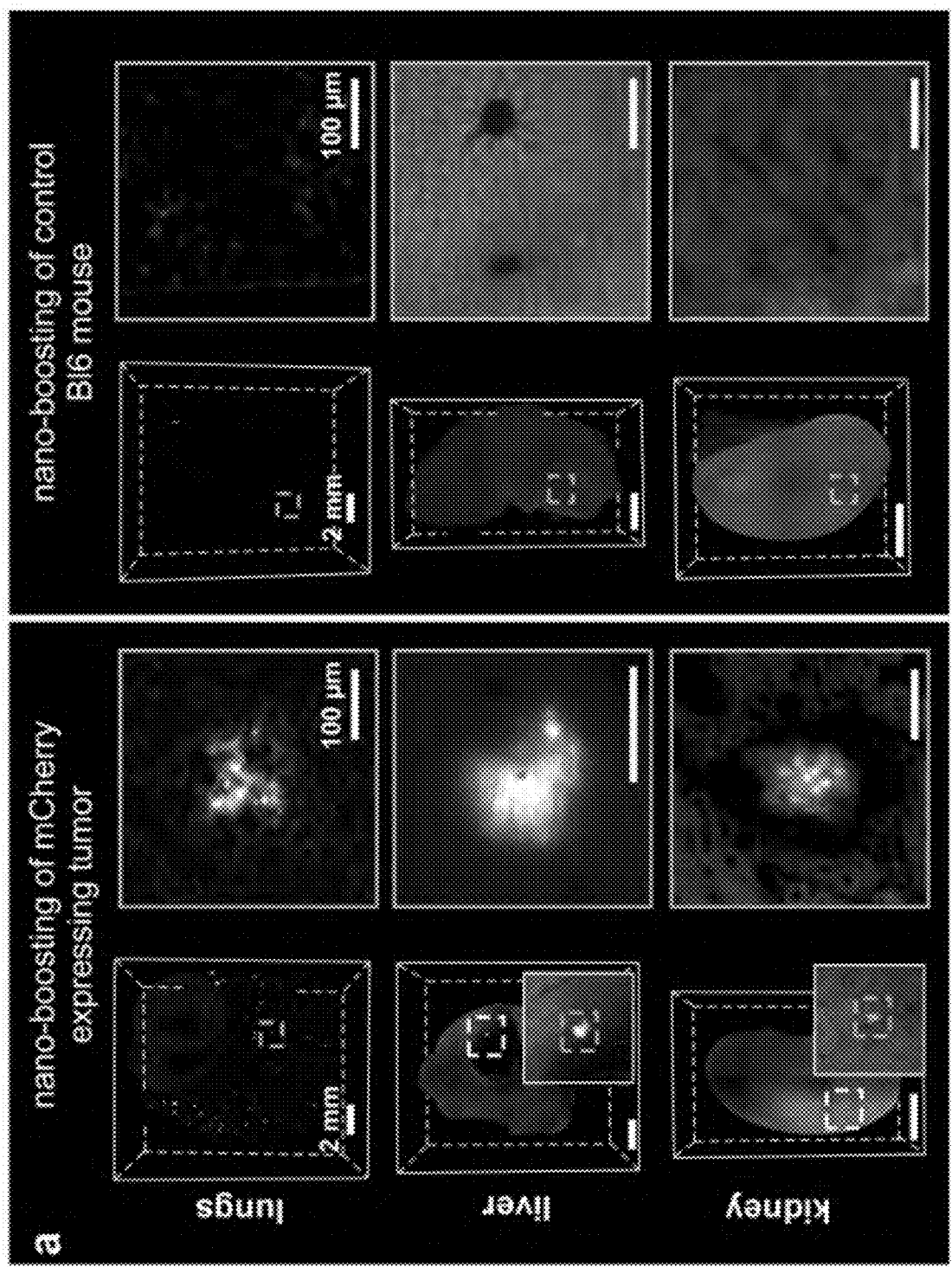
FIG. 8: Confirmation of nano-booster staining specificity in mCherry expressing tumor mice (a) Comparison between a high tumor load (mCherry expressing) animal and a C57BL/6N control animal, which were both boosted with anti-mCherry nanobody conjugated to Atto647N (white), showing absence of unspecific signal in organs from the C57BL/6N control. Light-sheet microscopy images of the indicated regions in organs from the BL6 control, showing the absence of specific signal. Note that the background (gray) is enhanced to demonstrate the absence of signal in high-magnification images. (b) Confocal images of 647-boosted tumor micrometastases in lung tissue was immunolabeled with anti-firefly luciferase antibody after rehydration of the cleared tissue, and cell nuclei were labeled with Hoechst.

Example 4: 3D Visualization of Tumor Vasculature and Phenotyping the Tumor Microenvironment Both primary tumors and metastases depend on blood vessels for their supply with oxygen and metabolites. In addition, the tumor vasculature provides a conduit for the dissemination of tumor cells to distant sites, for the influx of immune cells into the tumor, and for the delivery of therapeutics (Welti et al., 2013). Furthermore, blood vessel-derived angiocrine signals can form specialized vascular niches that regulate diverse aspects of tumor biology including proliferation, invasion, self-renewal or therapy resistance (Butler et al., 2010). The inventor used LuCiD to characterize the metastatic tumor vasculature by concomitant visualization of tumor cells, therapeutic antibody and blood vessels in intact mice. Whole mouse body imaging of a low tumor load mouse by light-sheet microscopy identified micrometastases that are distant from the primary tumor and the major metastatic sites (FIG. 6A,B). Next, the inventor collected high-resolution light-sheet microscopy images from intact mice to visualize vascular structures in the metastatic region (FIG. 6C-F). The inventor also found that the therapeutic antibody reached the majority of tumor micrometastases in this vessel-rich region (FIG. 6D-F).

To be able to further characterize small micrometastases detected throughout the body, it would be critical to perform immunolabeling on the defined regions of interests after the LuCiD pipeline. To this end, metastatic lung tissue imaged by LuCiD was rehydrated, by reversing the uDISCO protocol. Subsequently, they were immunostained using the cancer associated fibroblast marker alpha-smooth muscle actin (aSMA) (FIG. 6G-J) and the vascular endothelial cell marker MECA-32 (FIG. 6K-N). These results demonstrated that LuCiD enables further phenotyping of selected tissues via antibody labeling.

Figure 13:
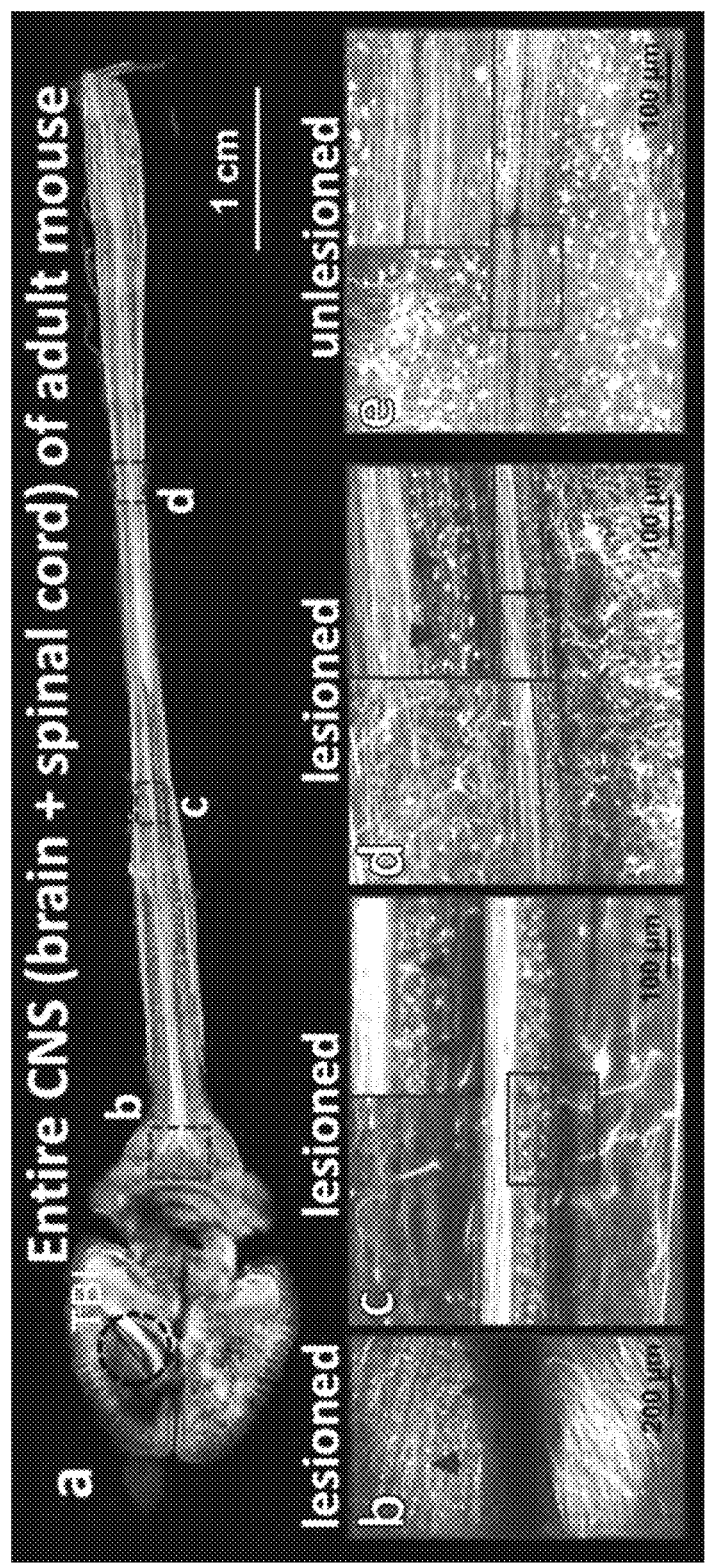
FIG. 13: LuCiD used to study Neurodegeneration in adult mouse CNS (a) The whole CNS from a GFP-M mouse (2 months post-TBI) was cleared and imaged. Degeneration of the pyramidal axonal track is evident throughout the CNS (b-d). Note that the detailed morphology of dystrophic neurons is visible at every region (b-d, arrowheads). (e) An unlesioned spinal cord view from the age-matched control GFP-M mouse. Note the presence of descending intact axons (box).

Example 5: The Methods of the Invention can be Used to Assess the Details of Neurodegeneration in the Whole CNS of Mice To study chronic neurodegeneration in the entire CNS of mice, the inventor performed traumatic brain injury (TBI) on Thy-1 GFP-M mouse line, in which a subset of neurons express GFP. The inventor used a closed-head (intact skull) TBI model on mice because it better imitates human injury cases compared to the open-skull models. The TBI on somatosensory motor cortex of the mice was induced by controlled cortical impact (CCI) model of TBI ("Impact One" device, Leica), which allows the induction of highly reproducible mild and moderate TBI, as the inventor recently described (Erturk et al., 2016). The following parameters were used: pistol speed 6.5 m/s, impact duration 350 msec., and impact depth 2.0 mm. This TBI fractures the skull and induces a hole visible by MRI within 2-3 weeks. 2 months after TBI, the inventor perfused the mice, applied the LuCiD pipeline to boost the GFP signal using anti-GFP nanobody conjugated to Atto647N in whole mouse. Subsequently, intact central nervous system of the mouse were imaged using light-sheet microscopy. The inventor discovered degeneration of descending pyramidal motor axons from brain to spinal cord (FIG. 13). Degeneration of the axons was evident by the fragmentation (blebbing) in boxed regions (FIG. 13B-D) compared to spinal cord from an unlesioned mouse (FIG. 13E). Note that, similar experiments could be done by visualizing endogenous GFP without boosting (Pan et al., 2016), however, boosting of GFP provides 1) more details compared to endogenous GFP because dyes are brighter, 2) it stabilizes the GFP signal (no bleaching overtime) that detailed high-resolution images can be collected via prolonged high-magnification scans, and 3) boosting in far-red using anti-GFP nanobody tagged with A647N helps to image samples in far-red channel where the autofluorescence is much less compared to green (488 nm) channel.

Example 6: The Methods of the Invention can be Used to Analyze for the Presence of a Chronic Neuroinflammation in the Whole CNS of Mice Inflammation has been considered to have multiple facets, both reparative and destructive, depending on the time after injury, type of immune cells involved, and tissue location. In addition to knowing which types of inflammatory cells must be targeted and when (acute, chronic, or both), one also needs to know where exactly they should be targeted. The latter question remains largely unclear.

Figure 14:
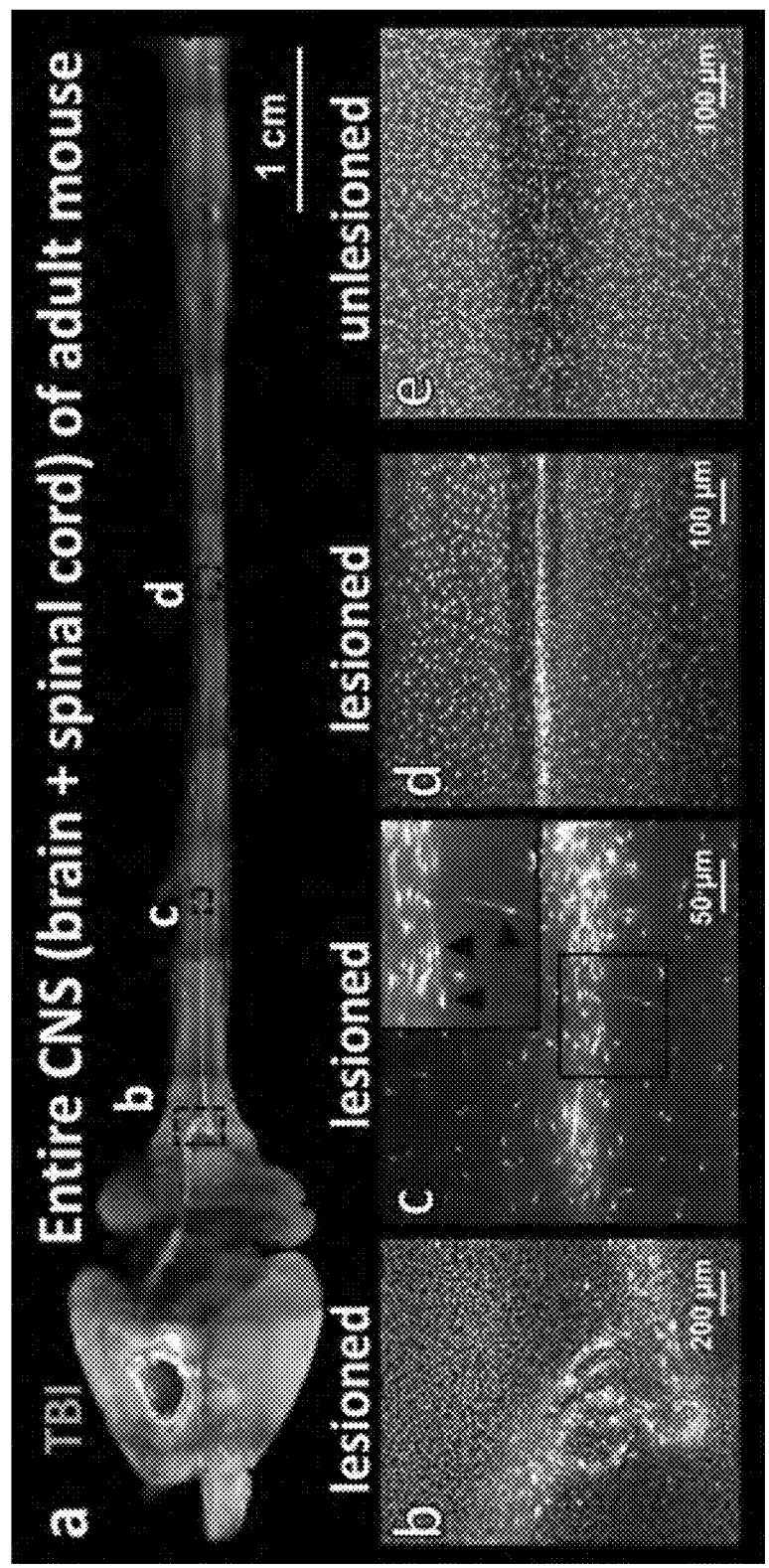
FIG. 14: Activated microglial macrophages in CX3CR1-GFP mouse (4 months post-TBI) after whole body anti-GFP nanobody labeling by LuCiD.

Our data using LuCiD demonstrate the occurrence of neuroinflammation not only in the brain, but also throughout the whole spinal cord (FIG. 14). Here, the inventor induced a closed-head TBI as described above (FIG. 13) on CX3CR1-GFP mice, in which macrophages/microglia and some monocytes are labelled with GFP. 4 months after the TBI, the animals underwent whole body LuCiD using anti-GFP nanobody labeling to enhance the GFP signal. Note that the activation of immune cells along the descending motor axons are evident as seen by increased in signal intensity and cell numbers on the degenerating motor tracks (FIG. 13). It is also noteworthy to mention that immune cells could be labelled using nanobodies against endogenous proteins of immune cells. This observation suggests that TBI induces a widespread chronic inflammatory response, which seems to surround not only the injured brain region but also the spinal cord and potentially even peripheral organs. Studies suggest that infiltrating blood-borne immune cells exacerbate the disease progression (Wilson et al., 2010). Our own data show that there is a chronic presence of lymphocytes in the injured mouse brain, even months after injury (Erturk et al., 2016). How they find their way into the brain (or survive within) after such a long time remains a mystery.

Example 7: The Methods of the Invention can be Used to Study Meningeal Lymphatic Vessels in Whole Transparent Mice The lymphatic system, which connects various lymphatic organs in the body, is crucial for immune responses (Janeway et al., 1997). It circulates the lymphocytes and other white blood cells throughout the body. Until recently, the brain was considered to be devoid of any lymphatic connections (Ransohoff and Engelhardt, 2012). Recently, the meningeal lymphatic vessels covering the dural sinuses between skull and the brain of a mouse were discovered (Louveau et al., 2015). These meningeal vessels carry immune cells (Louveau et al., 2015), which potentially are ready to invade the brain. However, how these meningeal lymphatic vessels of the brain could contribute to the pathology of TBI (or other diseases) is unclear. As brain lymphatic vessels are located directly between the skull and the brain, they are destroyed when the brain is harvested for standard histology. Therefore, they can only be studied in intact heads such as using LuCiD technology. Using various labeling methods, the inventor demonstrated that LuCiD allows imaging meningeal lymphatic vessels in the intact mouse heads (FIG. 14). One can label the meningeal lymphatic vessels via 1) tracers such as injection of the Ovalbumin-Alexa647 into cisterna magna or intranasally (which then drains into lymphatic vessels, resulting in specific labeling of lymphatic vessels) (FIG. 14A), 2) using transgenic reporter mice such as VEGFR3-YFP mice (Calvo et al., 2011) (FIG. 14B-E), and 3) antibody labeling of intact mouse heads using specific markers such as Lyve-1 (Louveau et al., 2015). Subsequently, one can image cells/molecules of interest in the intact mouse heads. For example, the inventor successfully imaged immune cell populations in CX3CR1-EGFP mice (FIG. 14F) and CX3CR1-EGFP x CCR2-RFP (FIG. 14G) double transgenic mice.

Example 8: Screening of Aminoalcohols with Mice Blood and Spleen for Decolorization In order to identify additional solutions for decolorization, firstly it was studied if aminoalcohols can directly decolorize blood. 11 different aminoalcohols were mixed with PFA fixed mice blood and centrifuged. The colorless pellets indicate the red heme was decolorized (FIG. 16, panel (a)). Accordingly, the decolorization effect of 8 good candidates with mice spleen was further tested. As shown in FIG. 16, panel (b), mice spleens were all decolorized. Images are shown at 0 hr and after 24 h incubation with the indicated aminoalcohols, respectively. The aminoalcohols shown in the Figure were as follows: 1. Quadrol, 2. N-Butyldiethanolamine, 3. N-Methyldiethanolamine, 4. N,N-Dimethylmethyleneiminium chloride, 5. 1,3-Bis(dimethylamino)-2-propanol, 6. 4-(2-Hydroxyethyl)morpholine, 7. N-tert-Butyldiethanolamine, 8. N-Ethyldiethanolamine, 9. 2-(Diisopropylamino)ethanol, 10. 4-Methylmorpholine N-oxide, and 11. 2-(Dibutylamino)ethanol.

Example 9: Clearing of Pig Brain and Clearing and Labeling of Big Human Brain Samples The methods of the invention were also applied to whole organs of large animals including pigs and humans.

In particular, a method according to the invention was used for the decolorizing and clearing of pig brain. FIG. 17 (a) shows dissected fresh pig brain, and FIG. 17 (b) shows decolorized pig brain after 24 h incubation with the 2-(Diisopropylamino)ethanol. Finally, FIG. 17 (c) shows the transparency of pig brain after clearing. These results demonstrate that the decolorizing and clearing step of the methods of the invention can be applied to large animals including pigs.

Next, a method according to the invention was also used for the clearing and labeling of big human brain samples. In particular, FIG. 18 (a) shows the transparency of human brain with the size of 3 cm×3 cm×1 cm after clearing. FIG. 18(b) shows fluorescent confocal images showing the plaques and cells in cleared human brain. These results demonstrate that the clearing and labeling according to the methods of the invention can be applied to big human brain samples, and that these cleared and labeled samples can be analyzed by fluorescence microscopy. The inventor has also found experimentally that whole human brain can be decolorized and cleared. Further, it is expected that fluorescent imaging can be applied to the imaging of whole human brain prepared according to the present invention.

INDUSTRIAL APPLICABILITY

The methods and products of the present invention are industrially applicable and can, for instance, be used to test biopharmaceutical drugs such as therapeutic antibodies.

REFERENCES

Battke, C., Kremmer, E., Mysliwietz, J., Gondi, G., Dumitru, C., Brandau, S., Lang, S., Vullo, D., Supuran, C., and Zeidler, R. (2011). Generation and characterization of the first inhibitory antibody targeting tumour-associated carbonic anhydrase XII. Cancer Immunol Immunother 60, 649-658.

Belle, M., Godefroy, D., Couly, G., Malone, S. A., Collier, F., Giacobini, P., and Chedotal, A. (2017). Tridimensional Visualization and Analysis of Early Human Development. Cell 169, 161-173 e112.

Belle, M., Godefroy, D., Dominici, C., Heitz-Marchaland, C., Zelina, P., Hellal, F., Bradke, F., and Chedotal, A. (2014). A simple method for 3D analysis of immunolabeled axonal tracts in a transparent nervous system. Cell Rep 9, 1191-1201.

Butler, J. M., Kobayashi, H., and Rafii, S. (2010). Instructive role of the vascular niche in promoting tumour growth and tissue repair by angiocrine factors. Nat Rev Cancer 10, 138-146.

Calvo, C. F., Fontaine, R. H., Soueid, J., Tammela, T., Makinen, T., Alfaro-Cervello, C., Bonnaud, F., Miguez, A., Benhaim, L., Xu, Y., et al. (2011). Vascular endothelial growth factor receptor 3 directly regulates murine neurogenesis. Genes Dev 25, 831-844.

Chung, K., Wallace, J., Kim, S. Y., Kalyanasundaram, S., Andalman, A. S., Davidson, T. J., Mirzabekov, J. J., Zalocusky, K. A., Mattis, J., Denisin, A. K., et al. (2013). Structural and molecular interrogation of intact biological systems. Nature 497, 332-337.

Condeelis, J., and Weissleder, R. (2010). In vivo imaging in cancer. Cold Spring Harb Perspect Biol 2, a003848.

de Jong, M., Essers, J., and van Weerden, W. M. (2014). Imaging preclinical tumour models: improving translational power. Nat Rev Cancer 14, 481-493.

Erturk, A., Mentz, S., Stout, E. E., Hedehus, M., Dominguez, S. L., Neumaier, L., Krammer, F., Llovera, G., Srinivasan, K., Hansen, D. V., et al. (2016). Interfering with the Chronic Immune Response Rescues Chronic Degeneration After Traumatic Brain Injury. J Neurosci 36, 9962-9975.

Erturk, A., Becker, K., Jahrling, N., Mauch, C. P., Hojer, C. D., Egen, J. G., Hellal, F., Bradke, F., Sheng, M., and Dodt, H. U. (2012). Three-dimensional imaging of solvent-cleared organs using 3DISCO. Nat Protoc 7, 1983-1995.

Erturk, A., Mauch, C. P., Hellal, F., Forstner, F., Keck, T., Becker, K., Jahrling, N., Steffens, H., Richter, M., Hubener, M., et al. (2011). Three-dimensional imaging of the unsectioned adult spinal cord to assess axon regeneration and glial responses after injury. Nat Med 18, 166-171.

Gabanyi, I., Muller, P. A., Feighery, L., Oliveira, T. Y., Costa-Pinto, F. A., and Mucida, D. (2016). Neuro-immune Interactions Drive Tissue Programming in Intestinal Macrophages. Cell 164, 378-391.

Gage, G. J., Kipke, D. R., and Shain, W. (2012). Whole animal perfusion fixation for rodents. J Vis Exp.

Ghanavati, S., Yu, L. X., Lerch, J. P., and Sled, J. G. (2014). A perfusion procedure for imaging of the mouse cerebral vasculature by X-ray micro-CT. J Neurosci Methods 221, 70-77.

Gondi, G., Mysliwietz, J., Hulikova, A., Jen, J. P., Swietach, P., Kremmer, E., and Zeidler, R. (2013). Antitumor efficacy of a monoclonal antibody that inhibits the activity of cancer-associated carbonic anhydrase XII. Cancer Res 73, 6494-6503.

Hama, H., Hioki, H., Namiki, K., Hoshida, T., Kurokawa, H., Ishidate, F., Kaneko, T., Akagi, T., Saito, T., Saido, T., et al. (2015). ScaleS: an optical clearing palette for biological imaging. Nat Neurosci 18, 1518-1529.

Hama, H., Kurokawa, H., Kawano, H., Ando, R., Shimogori, T., Noda, H., Fukami, K., Sakaue-Sawano, A., and Miyawaki, A. (2011). Scale: a chemical approach for fluorescence imaging and reconstruction of transparent mouse brain. Nat Neurosci 14, 1481-1488.

Holliger, P., and Hudson, P. J. (2005). Engineered antibody fragments and the rise of single domains. Nat Biotechnol 23, 1126-1136.

Hong, G., Antaris, A. L., and Dai, H. (2017). Near-infrared fluorophores for biomedical imaging. Nature Biomedical Engineering 1, 0010.

Iorns, E., Drews-Elger, K., Ward, T. M., Dean, S., Clarke, J., Berry, D., El Ashry, D., and Lippman, M. (2012). A new mouse model for the study of human breast cancer metastasis. PloS one 7, e47995.

Janeway, C. A., Travers, P., Walport, M., and Shlomchik, M. J. (1997). Immunobiology: the immune system in health and disease, Vol 1 (Current Biology).

Ke, M. T., Fujimoto, S., and Imai, T. (2013). See DB: a simple and morphology-preserving optical clearing agent for neuronal circuit reconstruction. Nat Neurosci 16, 1154-1161.

Lambert, A. W., Pattabiraman, D. R., and Weinberg, R. A. (2017). Emerging Biological Principles of Metastasis. Cell 168, 670-691.

Louveau, A., Smirnov, I., Keyes, T. J., Eccles, J. D., Rouhani, S. J., Peske, J. D., Derecki, N. C., Castle, D., Mandell, J. W., Lee, K. S., et al. (2015). Structural and functional features of central nervous system lymphatic vessels. Nature 523, 337-341.

Massague, J., and Obenauf, A. C. (2016). Metastatic colonization by circulating tumour cells. Nature 529, 298-306.

Massoud, T. F., and Gambhir, S. S. (2003). Molecular imaging in living subjects: seeing fundamental biological processes in a new light. Genes Dev 17, 545-580.

Massoud, T. F., and Gambhir, S. S. (2007). Integrating noninvasive molecular imaging into molecular medicine: an evolving paradigm. Trends Mol Med 13, 183-191.

Murray, E., Cho, J. H., Goodwin, D., Ku, T., Swaney, J., Kim, S. Y., Choi, H., Park, Y. G., Park, J. Y., Hubbert, A., et al. (2015). Simple, Scalable Proteomic Imaging for High-Dimensional Profiling of Intact Systems. Cell 163, 1500-1514.

Muyldermans, S. (2013). Nanobodies: natural single-domain antibodies. Annu Rev Biochem 82, 775-797.

Ntziachristos, V. (2010). Going deeper than microscopy: the optical imaging frontier in biology. Nat Methods 7, 603-614.

Pan, C., Cai, R., Quacquarelli, F. P., Ghasemigharagoz, A., Lourbopoulos, A., Matryba, P., Plesnila, N., Dichgans, M., Hellal, F., and Erturk, A. (2016). Shrinkage-mediated imaging of entire organs and organisms using uDISCO. Nat Methods.

Pandey, M., and Mahadevan, D. (2014). Monoclonal antibodies as therapeutics in human malignancies. Future Oncolz 10, 609-636.

Pichler, B. J., Wehrl, H. F., and Judenhofer, M. S. (2008). Latest advances in molecular imaging instrumentation. J Nucl Med 49 Suppl 2, 5S-23S.

Ransohoff, R. M., and Engelhardt, B. (2012). The anatomical and cellular basis of immune surveillance in the central nervous system. Nat Rev Immunol 12, 623-635.

Renier, N., Adams, E. L., Kirst, C., Wu, Z., Azevedo, R., Kohl, J., Autry, A. E., Kadiri, L., Umadevi Venkataraju, K., Zhou, Y., et al. (2016). Mapping of Brain Activity by Automated Volume Analysis of Immediate Early Genes. Cell 165, 1789-1802.

Renier, N., Wu, Z., Simon, D. J., Yang, J., Ariel, P., and Tessier-Lavigne, M. (2014). iDISCO: a simple, rapid method to immunolabel large tissue samples for volume imaging. Cell 159, 896-910.

Susaki, E. A., Tainaka, K., Perrin, D., Kishino, F., Tawara, T., Watanabe, T. M., Yokoyama, C., Onoe, H., Eguchi, M., Yamaguchi, S., et al. (2014). Whole-brain imaging with single-cell resolution using chemical cocktails and computational analysis. Cell 157, 726-739.

Tainaka, K., Kubota, S. I., Suyama, T. Q., Susaki, E. A., Perrin, D., Ukai-Tadenuma, M., Ukai, H., and Ueda, H. R.

(2014). Whole-body imaging with single-cell resolution by tissue decolorization. Cell 159, 911-924.

Timpson, P., McGhee, E. J., and Anderson, K. I. (2011). Imaging molecular dynamics in vivo—from cell biology to animal models. J Cell Sci 124, 2877-2890.

Tuchin, V. V. (2016). Editor's Introduction: Optical Methods for Biomedical Diagnosis.

Tuchin, V. V., and Tuchin, V. (2007). Tissue optics: light scattering methods and instruments for medical diagnosis, Vol 642 (SPIE press Bellingham).

Vick, B., Rothenberg, M., Sandhofer, N., Carlet, M., Finkenzeller, C., Krupka, C., Grunert, M., Trumpp, A., Corbacioglu, S., Ebinger, M., et al. (2015). An advanced preclinical mouse model for acute myeloid leukemia using patients' cells of various genetic subgroups and in vivo bioluminescence imaging. PloS one 10, e0120925.

Welti, J., Loges, S., Dimmeler, S., and Carmeliet, P. (2013). Recent molecular discoveries in angiogenesis and antiangiogenic therapies in cancer. J Clin Invest 123, 3190-3200.

Wilson, E. H., Weninger, W., and Hunter, C. A. (2010). Trafficking of immune cells in the central nervous system. J Clin Invest 120, 1368-1379.

Yang, B., Treweek, J. B., Kulkarni, R. P., Deverman, B. E., Chen, C. K., Lubeck, E., Shah, S., Cai, L., and Gradinaru, V. (2014). Single-cell phenotyping within transparent intact tissue through whole-body clearing. Cell 158, 945-958.

Ye, L., Allen, W. E., Thompson, K. R., Tian, Q., Hsueh, B., Ramakrishnan, C., Wang, A. C., Jennings, J. H., Adhikari, A., Halpern, C. H., et al. (2016). Wiring and Molecular Features of Prefrontal Ensembles Representing Distinct Experiences. Cell 165, 1776-1788.

Yoneda, T., Williams, P. J., Hiraga, T., Niewolna, M. & Nishimura, R. A bone-seeking clone exhibits different biological properties from the MDA-MB-231 parental human breast cancer cells and a brain-seeking clone in vivo and in vitro. J Bone Miner Res 16, 1486-1495, doi:10.1359/jbmr.2001.16.8.1486 (2001).

Zipfel, W. R., Williams, R. M., Christie, R., Nikitin, A. Y., Hyman, B. T., and Webb, W. W. (2003). Live tissue intrinsic emission microscopy using multiphoton-excited native fluorescence and second harmonic generation. Proc Natl Acad Sci USA 100, 7075-7080.

The invention claimed is:

1. A method for preparing an animal tissue for fluorescence microscopy, the method comprising the following steps:
a) optionally decalcifying a fixed animal tissue with a solution for decalcification;
b) optionally decolorizing the fixed animal tissue with a solution for the removal of heme;
c) labeling a target molecule in the fixed animal tissue with a labeling solution comprising a fluorochrome-containing labeling agent capable of binding to said target molecule, said labeling agent having a molecular weight of equal to or less than 100 kDa, to obtain a fixed animal tissue labeled with said fluorochrome-containing labeling agent;
wherein the fixed animal tissue is treated with a permeabilization solution before said labeling of the target molecule in step c) and wherein the permeabilization solution and the labeling solution are different solutions;
or wherein the fixed animal tissue is treated with a permeabilization solution during said labeling of the target molecule in step c) and wherein the permeabilization solution and the labeling solution are the same solution, and
d) clearing the fixed animal tissue labeled with said fluorochrome-containing labeling agent with a clearing solution comprising an organic solvent; so as to obtain said animal tissue for fluorescence microscopy;
wherein said permeabilization solution comprises methyl-β-cyclodextrin and/or trans-1-acetyl-4-hydroxy-L-proline,
wherein said animal tissue is a whole mouse, and
wherein the fluorochrome-containing labeling agent is an antibody fragment conjugated to said fluorochrome, said antibody fragment being capable of binding to said target molecule, or
wherein the fluorochrome-containing labeling agent is a nanobody conjugated to said fluorochrome, said nanobody being capable of binding to said target molecule.

2. The method according to claim 1, wherein:
(i) the method comprises step a);
(ii) in step a), the solution for decalcification is selected from a solution that comprises EDTA and NaHCO3, a solution that comprises formic acid, a solution that comprises HNO3, or a solution that comprises HCl;
(iii) said fixed animal tissue is obtainable by fixation with a fixation solution comprising 4 wt % paraformaldehyde and optionally heparine;
(iv) the method comprises step b);
(v) step b) is performed by perfusing the fixed animal tissue with said solution for the removal of heme;
(vi) said solution for the removal of heme is a heme-chelating solution;
(vii) in step b), said solution for the removal of heme comprises an aminoalcohol suitable for the removal of heme and optionally a detergent; and/or
(viii) said solution for the removal of heme comprises a detergent, and wherein said detergent is an ionic detergent, a non-ionic detergent, a zwitterionic detergent, a chaotropic detergent, or a combination thereof.

3. The method according to claim 2, wherein
the ionic detergent is sodium dodecyl sulfate or deoxycholate,
the non-ionic detergent is 4-(1,1,3,3-Tetramethylbutyl) phenyl-polyethylene glycol, t-Octylphenoxypolyethoxyethanol, Polyethylene glycol tert-octylphenyl ether or polyoxyethylene (20) sorbitan monolaurate,
the zwitterionic detergent is 3-[(3-Cholamidopropyl)dimethylammonio]-1-propanesulfonate hydrate, and
the chaotropic detergent is urea.

4. The method according to claim 2, wherein said aminoalcohol suitable for the removal of heme and optionally a detergent is N,N,N',N'-tetrakis (2-hydroxypropyl) ethylenediamine, N-Butyldiethanolamine, N-Methyldiethanolamine, 4-(2-Hydroxyethyl) morpholine, N-Ethyldiethanolamine, 2-(Diisopropylamino) ethanol, 4-Methylmorpholine N-oxide or 1-(2-Hydroxyethyl) piperidine.

5. The method according to claim 4, wherein the solution for the removal of heme is a 1:2 or 1:3 dilution of a reagent comprising 25 wt % urea, 25 wt % N,N,N',N'-tetrakis (2-hydroxypropyl) ethylenediamine, and 15 wt % Triton X-100 in 0.01 M PBS.

6. The method according to claim 1, wherein:
(A) in step b), said solution for the removal of heme comprises an oxidizing reagent for the oxidation of heme, and wherein the oxidizing reagent for the oxidation of heme is optionally selected from benzyl peroxide, 3-chloroperoxybenzoic acid or magnesium monoperoxyphthallate hexahydrate;

(B) the fluorochrome-containing labeling agent has a molecular weight of equal to or less than 60 kDa, equal to or less than 50 kDa, equal to or less than 40 kDa, equal to or less than 30 kDa, or equal to or less than 20 kDa;

(C) said fluorochrome is capable of emitting infrared or red fluorescence;

(D) said fluorochrome is capable of emitting near-infrared or far-red fluorescence;

(E) the emission maximum of said fluorochrome is at a wavelength of higher than 480 nm, higher than 500 nm, higher than 550 nm, higher than 590 nm, higher than 600 nm, higher than 640 nm, or higher than 700 nm, or the emission maximum of said fluorochrome is in a wavelength range of between 640 nm and 700 nm;

(F) the emission maximum of said fluorochrome is at a wavelength of lower than 1000 nm, lower than 900 nm or lower than 800 nm;

(G) step c) is performed by perfusing the fixed animal tissue with said labeling solution comprising the fluorochrome-containing labeling agent;

(H) the fluorochrome-containing labeling agent is fluorescent dyes, said fluorescent dyes being capable of binding to said target molecule;

(I) the fluorochome-containing labeling agent is fluorescent dyes, said fluorescent dye is Nissl, propidium iodide, methoxy-x04, Cresyl Violet acetate, Pyronin Y, Thiazin Red, lectin, DiI, a fluorochrome-containing fluorescent dye for emitting fluorescence in the far-red or near-infrared range, and To-pro3;

(J) said organic solvent has a refractive index which deviates from the refractive index of the tissue of said animal by not more than 5%;

(K) said clearing solution comprising the organic solvent has a refractive index which deviates from the refractive index of the tissue of said animal by not more than 2%;

(L) said clearing solution comprising the organic solvent has a refractive index of between 1.500 and 1.600 or a refractive index of between 1.520 and 1.580;

(M) said organic solvent comprises benzyl alcohol, benzyl benzoate, dibenzyl ether, ethyl 3-phenyl-2-propenoate, allyl 3-phenylacrylate, PEG (Mn=200-1000), PEGDA (Mn=200-1000), PEGMA (Mn=200-1000), 1-phenylnaphthalene and/or diphenyl ether;

(N) said clearing solution comprising the organic solvent further comprises an antioxidant;

(O) said clearing solution comprising the organic solvent consists of benzyl alcohol, benzyl benzoate and diphenyl ether at a volume ratio of from 4:8:3 to 10:20:3 and said antioxidant;

(P) step d) is performed by perfusing the fixed animal tissue labeled with said fluorochrome-containing labeling agent with said clearing solution comprising the organic solvent, wherein optionally:

P1) the fixed animal tissue labeled with said fluorochrome-containing labeling agent is perfused with said clearing solution comprising the organic solvent for at least 6 hours;

and/or

P2) step d) further comprises, prior to perfusion with said clearing solution, a perfusion with an increasing gradient of a dehydration solution comprising a further organic solvent of 0 vol % to 100 vol %, wherein optionally, said perfusion with said increasing gradient of a dehydration solution comprising said further organic solvent of 0 vol % to 100 vol % is followed by an delipidation solution comprising another organic solvent, and wherein said further organic solvent is optionally tert-butanol, tetrahydrofuran (THF), methanol, ethanol or 1,4-Dioxane and wherein said perfusion with said increasing gradient is performed at a temperature above the melting temperature of said further organic solvent, and/or wherein said another organic solvent is dichoromethane, chloroform, methanol, hexane, butanol, ethyl acetate, tert-butyl methyl ether, and wherein said perfusion with said another organic solvent is performed at a temperature above the melting temperature of said another organic solvent;

(Q) said labeling solution and said permeabilization solution and said clearing solution are actively delivered by applying pressure;

(R) said labeling of the target molecule with the labeling solution and said treatment with the permeabilization solution is performed by perfusion at a pressure of higher than 80 mmHg;

(S) said labeling of the target molecule with the labeling solution and said treatment with the permeabilization solution is performed by perfusion at a pressure of between 220 and 240 mmHg;

(T) the fixed and decolorized animal tissue is treated with a permeabilization solution before said labeling of the target molecule in step c) and wherein the permeabilization solution and the labeling solution are different solutions, wherein said permeabilization solution is optionally a dehydration solution as defined in R2 or a delipidation solution as defined in R2, or said permeabilization solution optionally comprises acetic acid, or guanidine hydrochloride and/or sodium acetate;

(U) the fixed animal tissue is treated with a permeabilization solution during said labeling of the target molecule in step c) and wherein the permeabilization solution and the labeling solution are the same solution;

(V) step b) is performed by perfusing the fixed animal tissue with said solution for the removal of heme at a pressure of higher than 80 mmHg; and/or (W) step b) is performed by perfusing the fixed animal tissue with said solution for the removal of heme at a pressure of between 220 and 240 mmHg.

7. The method of claim 6, wherein the method is a method according to steps (P) to (W), and wherein perfusion in step d) is performed at a pressure of higher than 80 mmHg, or wherein perfusion in step d) is performed at a pressure of between 220 and 240 mmHg.

8. The method according to claim 7, wherein perfusion in step d) is performed at a pressure of higher than 150 mmHg, or wherein perfusion in step d) is performed at a pressure of 230 mmHg.

9. The method according to claim 6, wherein said clearing solution comprising the organic solvent comprises DL-alpha-tocopherol in an amount of 0.4 vol % in said clearing solution.

10. The method according to claim 6, wherein actively delivering said labeling solution and said permeabilization solution and said clearing solution by applying pressure comprises applying pressure with a pump.

11. The method according to claim 6, wherein said labeling of the target molecule with the labeling solution and said treatment with the permeabilization solution is performed by perfusion at a pressure of higher than 150 mmHg.

12. The method according to claim 6, wherein said labeling of the target molecule with the labeling solution and said treatment with the permeabilization solution is performed by perfusion at a pressure of 230 mmHg.

13. The method according to claim 6, wherein step b) is performed by perfusing the fixed animal tissue with said solution for the removal of heme at a pressure of higher than 150 mmHg and/or wherein step b) is performed by perfusing the fixed animal tissue with said solution for the removal of heme at a pressure of 230 mmHg.

14. The method according to claim 1, wherein:
(1) said target molecule which is labeled by said labeling agent in step c) is a structure, which is a protein, lipid, DNA or RNA that is present in cells of said fixed animal tissue;
(2) said animal tissue contains a cancer, and wherein said target molecule which is labeled by said labeling agent in step c) is a structure, which is a protein, lipid, DNA or RNA that is present in cells of said cancer;
(3) said animal tissue contains cancer metastases, and wherein said target molecule which is labeled by said labeling agent in step c) is a structure, which is a protein, lipid, DNA or RNA that is present in cells of said cancer;
(4) said animal has been treated with a biopharmaceutical drug, wherein said animal tissue contains said biopharmaceutical drug, and wherein said biopharmaceutical drug is said target molecule which is labeled by said labeling agent in step c), or wherein said biopharmaceutical drug has been labelled with a further fluorochrome in vitro, or wherein said biopharmaceutical drug that is fluorescent itself, and wherein the biopharmaceutical drug is optionally a small molecule, a therapeutic protein, or a therapeutic antibody;
(5) said method is not a method for the treatment of the human or animal body by surgery or therapy and not a diagnostic method practiced on the human or animal body;
or
(6) the animal tissue for fluorescence microscopy obtained in step d) has a smaller volume than the fixed animal tissue used in step b), and wherein the animal tissue for fluorescence microscopy obtained in step d) has a 40% to 75% smaller volume than the fixed animal tissue used in step b).

15. A method for analyzing an animal tissue comprising: preparing an animal tissue for fluorescence microscopy by
a) optionally decalcifying a fixed animal tissue with a solution for decalcification;
b) optionally decolorizing the fixed animal tissue with a solution for the removal of heme;
c) labeling a target molecule in the fixed animal tissue with a labeling solution comprising a fluorochrome-containing labeling agent capable of binding to said target molecule, said labeling agent having a molecular weight of equal to or less than 100 kDa, to obtain a fixed animal tissue labeled with said fluorochrome-containing labeling agent;
wherein the fixed animal tissue is treated with a permeabilization solution before said labeling of the target molecule in step c) and wherein the permeabilization solution and the labeling solution are different solutions;
or wherein the fixed animal tissue is treated with a permeabilization solution during said labeling of the target molecule in step c) and wherein the permeabilization solution and the labeling solution are the same solution, and
d) clearing the fixed animal tissue labeled with said fluorochrome-containing labeling agent with a clearing solution comprising an organic solvent; so as to obtain said animal tissue for fluorescence microscopy;
wherein said permeabilization solution comprises methyl-β-cyclodextrin and/or trans-1-acetyl-4-hydroxy-L-proline; and
i) analyzing said tissue by fluorescence microscopy in order to detect the fluorescence of said fluorochrome in said animal tissue, wherein said animal tissue contains said target molecule labeled by said fluorochrome-containing labeling agent,
wherein said animal tissue is a whole mouse, and
wherein the fluorochrome-containing labeling agent is an antibody fragment conjugated to said fluorochrome, said antibody fragment being capable of binding to said target molecule, or
wherein the fluorochrome-containing labeling agent is a nanobody conjugated to said fluorochrome, said nanobody being capable of binding to said target molecule.

16. The method for analyzing according to claim 15, wherein
(A) the method further comprises the step of ii) visualizing the detected fluorescence of said fluorochrome to obtain an image of said animal tissue; and/or
(B) said fluorescence microscopy is selected from the group consisting of light sheet fluorescence microscopy, epifluorescence microscopy, multi-photon microscopy and confocal fluorescence microscopy;
(C) said fluorescence microscopy is light sheet fluorescence microscopy; and/or
(D) said method further comprises, after step i), the steps of iii) dissecting a tissue region of interest; iv) rehydrating the dissected tissue region of interest; and v) further analyzing the dissected tissue region of interest.

17. The method according to claim 16, wherein said image is a three-dimensional image and/or an image having single cell resolution throughout said animal tissue.

18. The method according to claim 16, wherein the method is a method according to (D), and wherein
(D1) in step v), the dissected tissue region of interest is further analyzed by antibody-based immunostaining, or by gene-profiling which is gene profiling by RNAseq, or by proteomics; and/or
(D2) the dissected tissue region of interest comprises a metastasis having a size of less than 200 tumor cells.

19. The method according to claim 18, wherein the dissected tissue region of interest comprises a metastasis having a size of less than 25 tumor cells.

20. A method for the detection of metastases, wherein the method comprises a method for analyzing an animal tissue according to claim 15, wherein optionally,
(i) said method for the detection of metastases is a method for the detection of metastases in said animal tissue at single-cell resolution throughout said animal tissue; and/or
(ii) said animal tissue contains cancer metastases, and wherein the target molecule labeled by said labeling agent is a structure that is present in cells of said cancer.

21. The method according to claim 20, wherein the method is a method according to (ii), and wherein the target molecule is a protein.

22. A method for analyzing the biodistribution of a biopharmaceutical drug, wherein the method comprises a method for analyzing an animal tissue according to claim 15, wherein said animal has been treated with a biopharmaceutical drug which is said target molecule and which is labeled by said labeling agent in step c), or has been labelled with a further fluorochrome in vitro, or is fluorescent itself, and/or is optionally a small molecule, a therapeutic protein, or a therapeutic antibody;

wherein said animal tissue contains said biopharmaceutical drug, and wherein said biopharmaceutical drug is said target molecule which is labeled by said labeling agent, and wherein optionally,
(i) the biopharmaceutical drug is a therapeutic protein;
(ii) the biopharmaceutical drug is a therapeutic antibody; or
(iii) the biopharmaceutical drug is a nanoparticle.

23. A method for analyzing the biodistribution of nanoparticles, wherein the method comprises a method for analyzing an animal tissue according to claim 15, wherein said animal has been treated with the nanoparticles, wherein said animal tissue contains said nanoparticles, and wherein said nanoparticles are said target molecule which is labeled by said labeling agent and/or are selected from fluorochrome-conjugated nanoparticles or nanoparticles which are fluorescent themselves, wherein the nanoparticles optionally carry a drug or are a drug.

24. A method for studying neurodegeneration, wherein the method comprises a method for analyzing an animal tissue according to claim 15, and wherein said animal tissue contains neurons, wherein optionally,
(i) the neurons in said animal tissue have been fluorescently labelled ; and/or
(ii) the studying of neurodegeneration comprises the analysis of the blebbing of neuronal axons.

25. A method for studying neuroinflammation, wherein the method comprises a method for analyzing an animal tissue according to claim 15, and wherein said animal tissue contains neurons, wherein optionally,
(i) immune cells in said animal tissue have been fluorescently labelled and/or
(ii) the method for studying neuroinflammation comprises studying the activation of immune cells by analyzing the signal intensity and/or the cell numbers of the fluorescently labeled immune cells.

26. The method according to claim 25, wherein the method is a method according to (i), and wherein the immune cells have been fluorescently labelled by expression of a fluorescent protein.

27. A method for studying meningeal lymphatic vessels, wherein the method comprises a method for analyzing an animal tissue according to claim 15, and wherein optionally
(i) said meningeal lymphatic vessels are fluorescently labeled, preferably by a marker ; and/or
(ii) said meningeal lymphatic vessels contain said target molecule.

28. The method according to claim 27, wherein said animal tissue comprises an intact mouse head.

29. The method according to claim 27, wherein the method is according to (i), and wherein the meningeal lymphatic vessels are fluorescently labelled by a marker protein or by a tracer.

30. The method according to claim 29, wherein the tracer is ovalbumin.

* * * * *

UNITED STATES PATENT AND TRADEMARK OFFICE
CERTIFICATE OF CORRECTION

| | | |
|---|---|---|
| PATENT NO. | : 12,492,973 B2 | Page 1 of 1 |
| APPLICATION NO. | : 16/620293 | |
| DATED | : December 9, 2025 | |
| INVENTOR(S) | : Ali Erturk et al. | |

It is certified that error appears in the above-identified patent and that said Letters Patent is hereby corrected as shown below:

In the Claims

Claim 27, Column 44, Line 21, delete ", preferably by a marker"

Signed and Sealed this
Sixth Day of January, 2026

John A. Squires
*Director of the United States Patent and Trademark Office*